US009695579B2

(12) United States Patent
Herbert et al.

(10) Patent No.: US 9,695,579 B2
(45) Date of Patent: Jul. 4, 2017

(54) AUTOMATIC FAUCETS

(71) Applicant: Sloan Valve Company, Franklin Park, IL (US)

(72) Inventors: Kay Herbert, Winthrop, MA (US); Xiaoxiong Mo, Lexington, MA (US); Jeff Krull, Naperville, IL (US); Jean F. Daher, Auburn, MA (US); Qiaohong Chen, Lexington, MA (US); Ronald J. Vish, West Roxbury, MA (US); Fatih Guler, Winchester, MA (US); Xu Wang, Vernon Hills, IL (US); Stanley O Thompson, New Boston, NH (US); David L. Carpenter, Jaffrey, NH (US)

( * ) Notice: Subject to any disclaimer, the term of this patent is extended or adjusted under 35 U.S.C. 154(b) by 181 days.

(21) Appl. No.: 13/987,914

(22) Filed: Sep. 16, 2013

(65) Prior Publication Data

US 2014/0174556 A1    Jun. 26, 2014

Related U.S. Application Data

(63) Continuation of application No. PCT/US2012/000150, filed on Mar. 15, 2012.

(Continued)

(51) Int. Cl.
*F16K 21/00* (2006.01)
*E03C 1/05* (2006.01)

(52) U.S. Cl.
CPC .............. *E03C 1/057* (2013.01); *F16K 21/00* (2013.01); *Y10T 137/1842* (2015.04); *Y10T 137/8376* (2015.04)

(58) Field of Classification Search
CPC ....................................................... E03C 1/057

(Continued)

(56) References Cited

U.S. PATENT DOCUMENTS

| 2,438,207 A | 3/1948 | Derby ............................... 4/304 |
| 2,507,966 A | 5/1950 | Filliung ............................. 4/303 |

(Continued)

FOREIGN PATENT DOCUMENTS

| DE | 10320636 | 5/2003 | .............. F16K 11/00 |
| JP | 20088248474 | 10/2008 | .............. E03C 1/05 |
| WO | WO 01/20204 | 3/2001 | .............. E03C 1/04 |

OTHER PUBLICATIONS

PCT/US2012/000150 Search Report, dated, Jun. 29, 2012.
PCT/US2012/000150 Written Opinion, dated Jun. 29, 2012.

*Primary Examiner* — Marina Tietjen
*Assistant Examiner* — Seth W Mackay-Smith
(74) *Attorney, Agent, or Firm* — Ivan David Zitkovsky

(57) ABSTRACT

An automatic faucet includes a housing constructed to receive at least one water inlet conduit and having a spout for delivering water. The automatic faucet includes a valve module, a sensor module, a battery module, a turbine module, and a control module. The valve module includes a valve controlled by an electromagnetic actuator for controlling the water flow from the spout. The sensor module is constructed to provide sensor data influenced by a user. The control module is constructed to control opening and closing of the valve by providing signals to the electromagnetic actuator. The control module is also constructed to receive sensor data from the sensor module and execute a sensing algorithm. The control module is also constructed to execute a power management algorithm for managing electrical power generated by the water turbine and provided to and from the battery.

30 Claims, 54 Drawing Sheets

Related U.S. Application Data

(60) Provisional application No. 61/574,345, filed on Jul. 31, 2011, provisional application No. 61/465,213, filed on Mar. 15, 2011.

(58) Field of Classification Search
USPC ........ 137/607, 801; 236/12.11, 12.12, 12.15, 236/46 A, 46 C; 251/129.04; 340/573.1; 4/623
See application file for complete search history.

(56) References Cited

U.S. PATENT DOCUMENTS

| | | | |
|---|---|---|---|
| 2,603,794 A | 7/1952 | Bokser | 4/304 |
| 2,619,986 A | 12/1952 | Goepfrich et al. | 251/129.17 |
| 2,842,400 A | 7/1958 | Booth et al. | 239/569 |
| 3,022,450 A | 2/1962 | Chase, Jr. | 361/194 |
| 3,098,635 A | 7/1963 | Delaporte et al. | 251/54 |
| 3,151,340 A | 10/1964 | Teshima | 251/129.04 |
| 3,314,081 A | 4/1967 | Atkins et al. | 4/304 |
| 3,369,205 A | 2/1968 | Hamrick | 335/177 |
| 3,379,214 A | 4/1968 | Weinberg | 137/625.5 |
| 3,406,941 A | 10/1968 | Ichimori et al. | 251/129.01 |
| 3,429,333 A | 2/1969 | Schoepe et al. | 137/315.08 |
| 3,480,787 A | 11/1969 | Johansen | 250/221 |
| 3,487,477 A | 1/1970 | Classen | 4/668 |
| 3,575,640 A | 4/1971 | Ishikawa | 361/181 |
| 3,576,277 A | 4/1971 | Blackmon | 227/1 |
| 3,606,241 A | 9/1971 | Bornholdt | 251/52 |
| 3,638,680 A | 2/1972 | Kopp | 137/606 |
| 3,639,920 A | 2/1972 | Griffin et al. | 4/623 |
| 3,670,167 A | 6/1972 | Forbes | 250/221 |
| 3,724,001 A | 4/1973 | Ichimori et al. | 4/623 |
| 3,740,019 A | 6/1973 | Kessell et al. | 251/129.17 |
| 3,799,198 A | 3/1974 | Kijimoto | 137/624.11 |
| 3,802,462 A | 4/1974 | Trösch | 137/556 |
| 3,812,398 A | 5/1974 | Kozel et al. | 251/331 |
| 3,814,376 A | 6/1974 | Reinicke | 251/65 |
| 3,821,967 A | 7/1974 | Sturman et al. | 137/624.15 |
| 3,863,196 A | 1/1975 | Hilles | 367/96 |
| 4,010,769 A | 3/1977 | De Lorenzo et al. | 137/312 |
| 4,097,786 A | 6/1978 | Lund | 318/282 |
| 4,107,046 A | 8/1978 | Corder | 210/282 |
| 4,116,377 A | 9/1978 | Andersson et al. | 236/12.1 |
| 4,141,091 A | 2/1979 | Pulvari | 4/313 |
| 4,179,691 A | 12/1979 | Keller | 340/567 |
| 4,207,466 A | 6/1980 | Drage et al. | 250/338.1 |
| 4,223,698 A | 9/1980 | Reinicke | 137/595 |
| 4,225,111 A | 9/1980 | Stahle | 251/87 |
| 4,229,811 A | 10/1980 | Salem | 367/93 |
| 4,231,287 A | 11/1980 | Smiley | 92/94 |
| 4,241,759 A | 12/1980 | Billeter | 137/636.4 |
| 4,280,680 A | 7/1981 | Payne | 251/175 |
| 4,282,430 A | 8/1981 | Hatten et al. | 250/221 |
| 4,295,485 A | 10/1981 | Waterfield | 137/74 |
| 4,295,653 A | 10/1981 | Coles | 277/320 |
| 4,304,391 A | 12/1981 | Yamaguchi | 251/129.05 |
| 4,309,781 A | 1/1982 | Lissau | 4/304 |
| 4,383,234 A | 5/1983 | Yatsushiro et al. | 335/253 |
| 4,402,095 A | 9/1983 | Pepper | 4/623 |
| 4,408,745 A | 10/1983 | Swiers et al. | 251/357 |
| 4,457,452 A | 7/1984 | Symmons | 222/20 |
| 4,488,702 A | 12/1984 | Lapeyre | 251/46 |
| 4,505,450 A | 3/1985 | Saarem et al. | 251/24 |
| 4,505,451 A | 3/1985 | Jonas | 251/285 |
| 4,520,516 A | 6/1985 | Parsons | 4/623 |
| 4,539,474 A | 9/1985 | Takahata | 250/221 |
| 4,543,991 A | 10/1985 | Fuchs | 137/595 |
| 4,570,899 A | 2/1986 | Kingham | 251/51 |
| 4,597,895 A | 7/1986 | Bartlett | 252/392 |
| 4,604,735 A | 8/1986 | Parsons | 367/93 |
| 4,606,085 A | 8/1986 | Davies | 4/623 |
| 4,609,178 A | 9/1986 | Baumann | 251/229 |
| 4,645,094 A | 2/1987 | Acklin et al. | 222/52 |
| 4,651,777 A | 3/1987 | Hardman | 137/487.5 |
| 4,653,534 A | 3/1987 | Chung-Shan | 137/624.12 |
| 4,669,653 A | 6/1987 | Avelov | 236/12.13 |
| 4,681,141 A | 7/1987 | Wang | 137/607 |
| 4,709,728 A | 12/1987 | Ying-Chung | 137/636.4 |
| 4,713,847 A | 12/1987 | Oldfelt et al. | 4/316 |
| 4,717,237 A | 1/1988 | Austin | 385/101 |
| 4,762,273 A | 8/1988 | Gregory et al. | 251/129.04 |
| 4,767,922 A | 8/1988 | Stauffer | 250/221 |
| 4,796,662 A | 1/1989 | Hoffmann et al. | 137/596.16 |
| 4,823,414 A | 4/1989 | Piersimoni et al. | 4/623 |
| 4,823,825 A | 4/1989 | Buchl | 137/1 |
| 4,826,129 A | 5/1989 | Fong et al. | 251/129.04 |
| 4,826,132 A | 5/1989 | Moldenhauer | 251/129.17 |
| 4,836,641 A | 6/1989 | Priaroggia | 385/100 |
| 4,839,039 A * | 6/1989 | Parsons | A47K 5/1217 137/551 |
| 4,887,032 A | 12/1989 | Hetrick | 324/207.16 |
| 4,894,698 A | 1/1990 | Hijikigawa et al. | 257/254 |
| 4,894,874 A | 1/1990 | Wilson | 4/623 |
| 4,901,750 A | 2/1990 | Nicklas et al. | 137/270 |
| 4,902,887 A | 2/1990 | Everett, Jr. | 250/221 |
| 4,910,487 A | 3/1990 | Kleinhappl | 335/234 |
| 4,911,401 A | 3/1990 | Holcomb et al. | 251/30.03 |
| 4,915,347 A | 4/1990 | Iqbal et al. | 251/30.03 |
| 4,921,208 A | 5/1990 | La Marca | 251/30.04 |
| 4,932,430 A | 6/1990 | Fernstrom | 137/85 |
| 4,938,384 A | 7/1990 | Pilolla et al. | 222/50 |
| 4,941,219 A | 7/1990 | Van Marcke | 4/623 |
| 4,944,487 A | 7/1990 | Holtermann | 251/129.17 |
| 4,953,141 A | 8/1990 | Novak et al. | 367/108 |
| 4,953,236 A | 9/1990 | Lee et al. | 4/668 |
| 4,962,790 A | 10/1990 | Chou et al. | 137/599.08 |
| 4,972,070 A | 11/1990 | Laverty, Jr. | 250/221 |
| 4,977,929 A | 12/1990 | Chinnock et al. | 137/863 |
| 4,988,074 A | 1/1991 | Najmolhoda | 251/129.08 |
| 4,989,277 A | 2/1991 | Tsutsui et al. | 4/367 |
| 4,991,819 A | 2/1991 | Laube | 251/35 |
| 4,998,673 A | 3/1991 | Pilolla | 239/67 |
| 5,025,516 A | 6/1991 | Wilson | 4/623 |
| 5,032,812 A | 7/1991 | Banick et al. | 335/17 |
| 5,062,164 A | 11/1991 | Lee et al. | 4/623 |
| 5,062,453 A | 11/1991 | Saadi et al. | 137/624.11 |
| 5,074,520 A | 12/1991 | Lee et al. | 251/40 |
| 5,092,560 A | 3/1992 | Chen | 251/30.03 |
| 5,095,944 A | 3/1992 | Hochstrasser | 137/607 |
| 5,109,885 A | 5/1992 | Tauscher | 137/554 |
| 5,111,846 A | 5/1992 | Hochstrasser et al. | 137/607 |
| 5,125,621 A | 6/1992 | Parsons et al. | 251/30.03 |
| 5,127,625 A | 7/1992 | Kleinhappl | 251/129.17 |
| 5,169,118 A | 12/1992 | Whiteside | 251/30.03 |
| 5,172,193 A | 12/1992 | Payne et al. | 356/445 |
| 5,181,538 A | 1/1993 | Manganaro | 137/607 |
| 5,188,337 A | 2/1993 | Mertens et al. | 251/129.17 |
| 5,199,639 A | 4/1993 | Kobayashi et al. | 239/11 |
| 5,202,666 A | 4/1993 | Knippscheer | 340/573.1 |
| 5,224,509 A | 7/1993 | Tanaka et al. | 137/315.03 |
| 5,244,179 A | 9/1993 | Wilson | 251/30.03 |
| 5,245,024 A | 9/1993 | Scarpa et al. | 536/56 |
| 5,251,188 A | 10/1993 | Parsons et al. | 367/140 |
| 5,255,398 A | 10/1993 | Flynn et al. | 4/496 |
| 5,265,594 A | 11/1993 | Olsson et al. | 128/204.18 |
| 5,265,843 A | 11/1993 | Kleinhappl | 251/129.17 |
| 5,295,654 A | 3/1994 | Laube | 251/35 |
| 5,299,592 A | 4/1994 | Swanson | 137/59 |
| 5,329,965 A | 7/1994 | Gordon | 137/599.07 |
| 5,339,859 A | 8/1994 | Bowman | 137/337 |
| 5,362,026 A | 11/1994 | Kobayashi et al. | 251/30.02 |
| 5,375,811 A | 12/1994 | Reinicke | 251/129.16 |
| 5,408,369 A | 4/1995 | Miura et al. | 360/75 |
| 5,412,816 A | 5/1995 | Paterson et al. | 4/623 |
| 5,427,351 A | 6/1995 | Korfgen et al. | 251/39 |
| 5,433,245 A | 7/1995 | Prather et al. | 137/554 |
| 5,455,971 A | 10/1995 | Sakakibara et al. | 4/313 |
| 5,456,279 A | 10/1995 | Parsons et al. | 137/245 |
| 5,456,448 A | 10/1995 | Chou | 251/230 |
| 5,464,041 A | 11/1995 | Reinicke | 137/595 |
| 5,467,799 A | 11/1995 | Buccicone et al. | 137/625.41 |
| 5,473,723 A | 12/1995 | Stockman et al. | 385/134 |
| 5,474,303 A | 12/1995 | Coles | 277/317 |

(56) References Cited

U.S. PATENT DOCUMENTS

| | | | |
|---|---|---|---|
| 5,481,187 A | 1/1996 | Marcott et al. | 324/207.16 |
| 5,511,579 A | 4/1996 | Price | 137/337 |
| 5,535,781 A | 7/1996 | Paterson et al. | 137/624.11 |
| 5,539,198 A | 7/1996 | McMichael et al. | 250/221 |
| 5,548,119 A | 8/1996 | Nortier | 250/341.1 |
| 5,555,912 A | 9/1996 | Saadi et al. | 137/801 |
| 5,564,462 A | 10/1996 | Storch | 137/337 |
| 5,566,702 A | 10/1996 | Philipp | 137/1 |
| 5,570,869 A | 11/1996 | Diaz et al. | 251/129.04 |
| 5,574,617 A | 11/1996 | Shimanuki et al. | 361/154 |
| 5,583,434 A | 12/1996 | Moyers et al. | 324/207.16 |
| 5,584,465 A | 12/1996 | Ochsenreiter | 251/65 |
| 5,586,746 A | 12/1996 | Humpert et al. | 251/129.04 |
| 5,595,216 A | 1/1997 | Pilolla | 137/607 |
| 5,599,003 A | 2/1997 | Seemann et al. | 251/30.03 |
| 5,600,237 A | 2/1997 | Nippert | 324/207.16 |
| 5,636,601 A | 6/1997 | Moriya et al. | 123/90.11 |
| 5,651,384 A * | 7/1997 | Rudrich | E03C 1/057 137/1 |
| 5,655,747 A | 8/1997 | Pasut | 251/30.03 |
| 5,655,748 A | 8/1997 | Regelbrugge et al. | 251/54 |
| 5,668,366 A | 9/1997 | Mauerhofer | 250/221 |
| 5,694,653 A * | 12/1997 | Harald | 4/623 |
| 5,708,355 A | 1/1998 | Schrey | 323/282 |
| 5,716,038 A | 2/1998 | Scarffe | 251/30.03 |
| 5,730,165 A * | 3/1998 | Philipp | E03C 1/057 137/1 |
| 5,747,684 A | 5/1998 | Pace et al. | 73/119 |
| 5,758,688 A | 6/1998 | Hamanaka et al. | 137/624.11 |
| 5,775,372 A | 7/1998 | Houlihan | 137/624.12 |
| 5,785,955 A | 7/1998 | Fischer | 424/49 |
| 5,787,915 A | 8/1998 | Byers et al. | 137/1 |
| 5,787,924 A | 8/1998 | Cewers et al. | 137/487.5 |
| 5,797,360 A | 8/1998 | Pischinger et al. | 123/90.11 |
| 5,804,962 A | 9/1998 | Kather et al. | 324/207.16 |
| 5,815,362 A | 9/1998 | Kahr et al. | 361/153 |
| 5,823,229 A | 10/1998 | Bertrand et al. | 137/614.2 |
| 5,868,311 A | 2/1999 | Cretu-Petra | 4/623 |
| 5,883,557 A | 3/1999 | Pawlak et al. | 335/179 |
| 5,900,201 A | 5/1999 | Chatterjee et al. | 264/109 |
| 5,905,625 A | 5/1999 | Schebitz | 361/154 |
| 5,911,240 A | 6/1999 | Kolar et al. | 137/801 |
| 5,918,855 A | 7/1999 | Hamanaka et al. | 251/129.04 |
| 5,927,328 A | 7/1999 | Nelson et al. | 137/624.12 |
| 5,941,505 A | 8/1999 | Nagel | 251/335.2 |
| 5,964,192 A | 10/1999 | Ishii | 123/90.11 |
| 5,979,500 A | 11/1999 | Jahrling et al. | 137/624.12 |
| 5,984,262 A | 11/1999 | Parsons et al. | 251/129.04 |
| 6,003,170 A | 12/1999 | Humpert et al. | 251/129.04 |
| 6,039,067 A | 3/2000 | Houlihan | 137/337 |
| 6,044,814 A | 4/2000 | Fuwa | 123/90.11 |
| 6,073,904 A | 6/2000 | Diller et al. | 251/30.03 |
| 6,082,407 A | 7/2000 | Paterson et al. | 137/801 |
| 6,085,790 A | 7/2000 | Humpert et al. | 137/801 |
| 6,123,839 A | 9/2000 | Sussman | 210/136 |
| 6,127,671 A | 10/2000 | Parsons et al. | 250/221 |
| 6,155,231 A | 12/2000 | Adachi et al. | 123/399 |
| 6,158,715 A | 12/2000 | Kirschbaum | 251/129.06 |
| 6,250,601 B1 | 6/2001 | Kolar et al. | 251/129.04 |
| 6,293,516 B1 | 9/2001 | Parsons et al. | 251/65 |
| 6,298,872 B1 | 10/2001 | Keller | 137/360 |
| 6,305,662 B1 | 10/2001 | Parsons et al. | 251/129.04 |
| 6,393,634 B1 | 5/2002 | Kodaira et al. | 4/623 |
| 6,394,414 B1 | 5/2002 | Breitling et al. | 251/129.04 |
| 6,408,881 B2 | 6/2002 | Lorenzelli et al. | 137/801 |
| 6,425,415 B2 | 7/2002 | Lorenzelli et al. | 137/624.11 |
| 6,450,478 B2 | 9/2002 | Parsons et al. | 251/129.04 |
| 6,619,320 B2 * | 9/2003 | Parsons | E03C 1/05 137/624.11 |
| 6,619,613 B1 * | 9/2003 | Akamatsu et al. | 251/129.04 |
| 6,712,332 B1 | 3/2004 | Storm | 251/129.04 |
| 6,770,869 B2 | 8/2004 | Patterson et al. | 250/252.1 |
| 6,871,835 B2 | 3/2005 | Parsons | 251/30.03 |
| 6,913,203 B2 * | 7/2005 | DeLangis | 236/12.12 |
| 6,955,333 B2 * | 10/2005 | Patterson | G06Q 20/327 251/129.04 |
| 7,025,227 B2 | 4/2006 | Oliver et al. | 222/61 |
| 7,069,941 B2 * | 7/2006 | Parsons | E03C 1/05 137/1 |
| 7,107,631 B2 | 9/2006 | Lang et al. | 4/623 |
| 7,383,721 B2 | 6/2008 | Parsons et al. | 73/46 |
| 7,396,000 B2 | 7/2008 | Parsons et al. | 251/129.04 |
| 7,608,936 B2 | 10/2009 | Shimizu et al. | 290/43 |
| 7,650,653 B2 | 1/2010 | Johnson et al. | 4/623 |
| 7,681,860 B2 | 3/2010 | Maercovich | 251/30.04 |
| 7,690,395 B2 * | 4/2010 | Jonte | E03C 1/05 137/551 |
| 7,690,623 B2 | 4/2010 | Parsons et al. | 251/129.04 |
| 7,731,154 B2 * | 6/2010 | Parsons et al. | 251/129.04 |
| 7,871,057 B2 | 1/2011 | Shimizu et al. | 251/129.04 |
| 7,880,641 B2 * | 2/2011 | Parris | G01D 4/002 137/625.11 |
| 7,921,480 B2 * | 4/2011 | Parsons | E03C 1/05 137/624.11 |
| 8,028,355 B2 | 10/2011 | Reeder et al. | 4/623 |
| 8,104,113 B2 * | 1/2012 | Rodenbeck | E03C 1/057 251/129.03 |
| 8,252,173 B2 | 8/2012 | Scholz et al. | 210/130 |
| 8,276,878 B2 | 10/2012 | Parsons et al. | 251/129.04 |
| 8,296,875 B2 * | 10/2012 | Loberger | E03C 1/057 4/623 |
| 8,365,767 B2 * | 2/2013 | Davidson | E03C 1/0404 137/559 |
| 8,376,313 B2 | 2/2013 | Burke et al. | 251/129.04 |
| 8,381,329 B2 | 2/2013 | Bayley et al. | 4/623 |
| 8,394,269 B2 | 3/2013 | Wawrla et al. | 210/232 |
| 8,438,672 B2 * | 5/2013 | Reeder | E03C 1/055 4/623 |
| 8,448,271 B2 | 5/2013 | Rudisser | 4/623 |
| 8,496,025 B2 | 7/2013 | Parsons et al. | 137/624.11 |
| 8,561,626 B2 * | 10/2013 | Sawaski et al. | 137/1 |
| 8,576,032 B2 | 11/2013 | Herbert et al. | 335/220 |
| 8,613,419 B2 * | 12/2013 | Rodenbeck | E03C 1/055 251/129.03 |
| 8,698,444 B2 * | 4/2014 | Malkin | B64C 13/28 244/76 R |
| 8,843,241 B2 * | 9/2014 | Saberi | F16K 37/0091 251/129.04 |
| 8,878,383 B2 | 11/2014 | Kuroishi et al. | 290/54 |
| 8,967,590 B2 * | 3/2015 | Minervini | F01D 15/00 251/129.04 |
| 9,254,499 B2 | 2/2016 | Klicpera | 4/615 |
| 9,359,747 B2 | 6/2016 | Wawrla | 4/638 |
| 9,366,014 B2 | 6/2016 | Wawrla | 4/676 |
| 2003/0164612 A1 | 9/2003 | Yumita | 290/1 R |
| 2005/0151101 A1* | 7/2005 | McDaniel | E03C 1/057 251/129.04 |
| 2006/0145111 A1* | 7/2006 | Lang et al. | 251/129.04 |
| 2007/0246564 A1 | 10/2007 | Rodenbeck et al. | 239/67 |
| 2008/0109956 A1 | 5/2008 | Bayley | 4/623 |
| 2009/0165866 A1 | 7/2009 | Firma | 137/15.17 |
| 2010/0108165 A1 | 5/2010 | Rodenbeck et al. | 137/801 |
| 2010/0252759 A1* | 10/2010 | Guler et al. | 251/129.04 |
| 2010/0275359 A1 | 11/2010 | Guler et al. | 251/129.15 |
| 2011/0071698 A1* | 3/2011 | Glasser et al. | 700/296 |
| 2011/0155934 A1* | 6/2011 | Guler et al. | 251/129.04 |
| 2012/0012207 A1 | 1/2012 | Weigen | 137/562 |
| 2012/0055557 A1* | 3/2012 | Belz et al. | 137/1 |
| 2012/0318386 A1* | 12/2012 | Guzman | 137/560 |
| 2015/0159765 A1 | 6/2015 | Wawrla et al. | 4/677 |

* cited by examiner

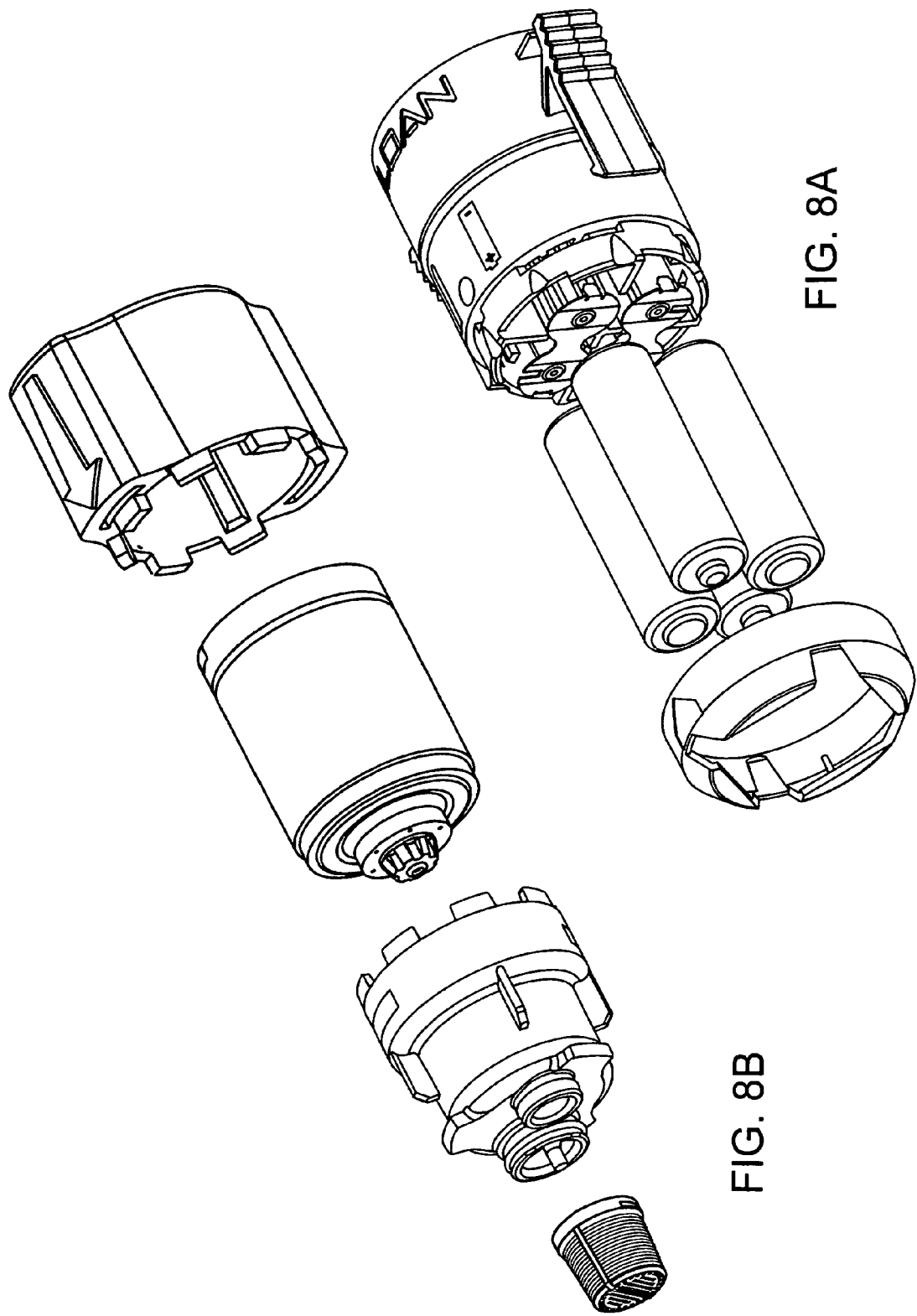

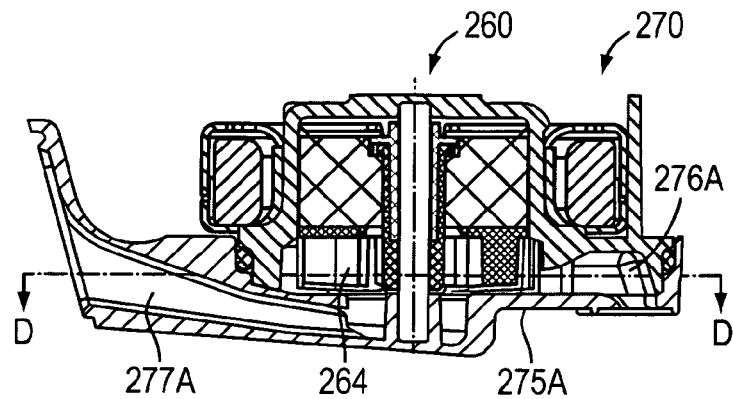
FIG. 12A
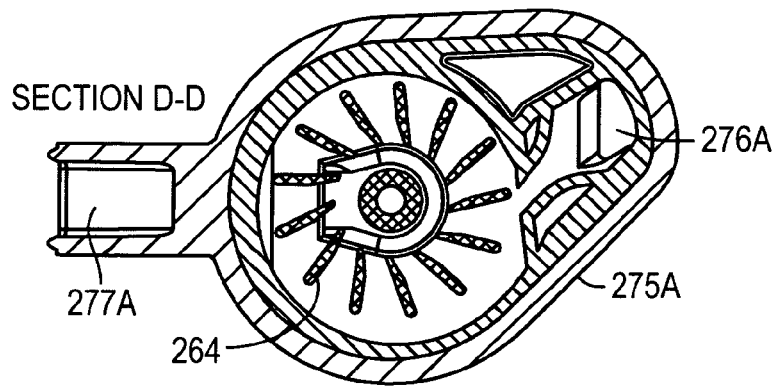
FIG. 12B
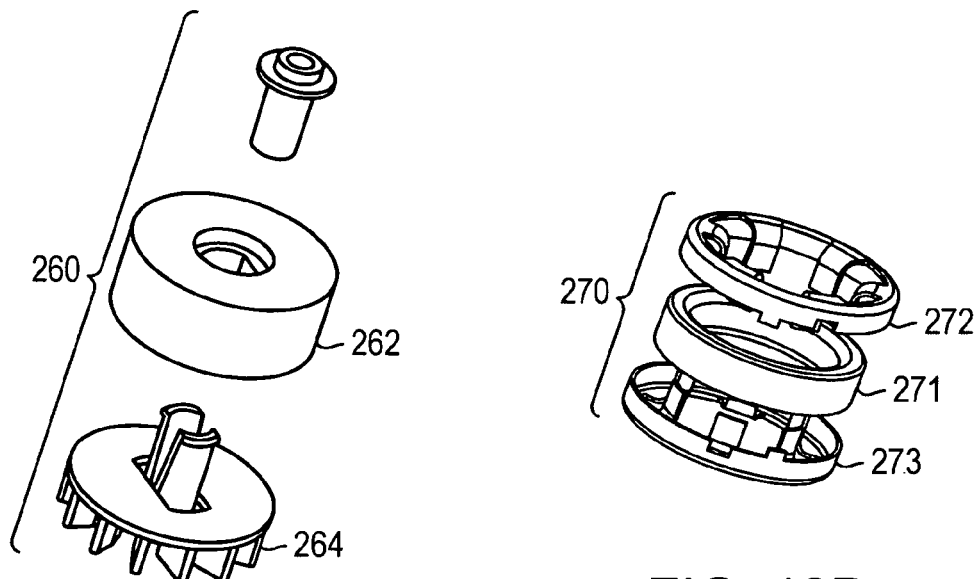
FIG. 12C
FIG. 12D

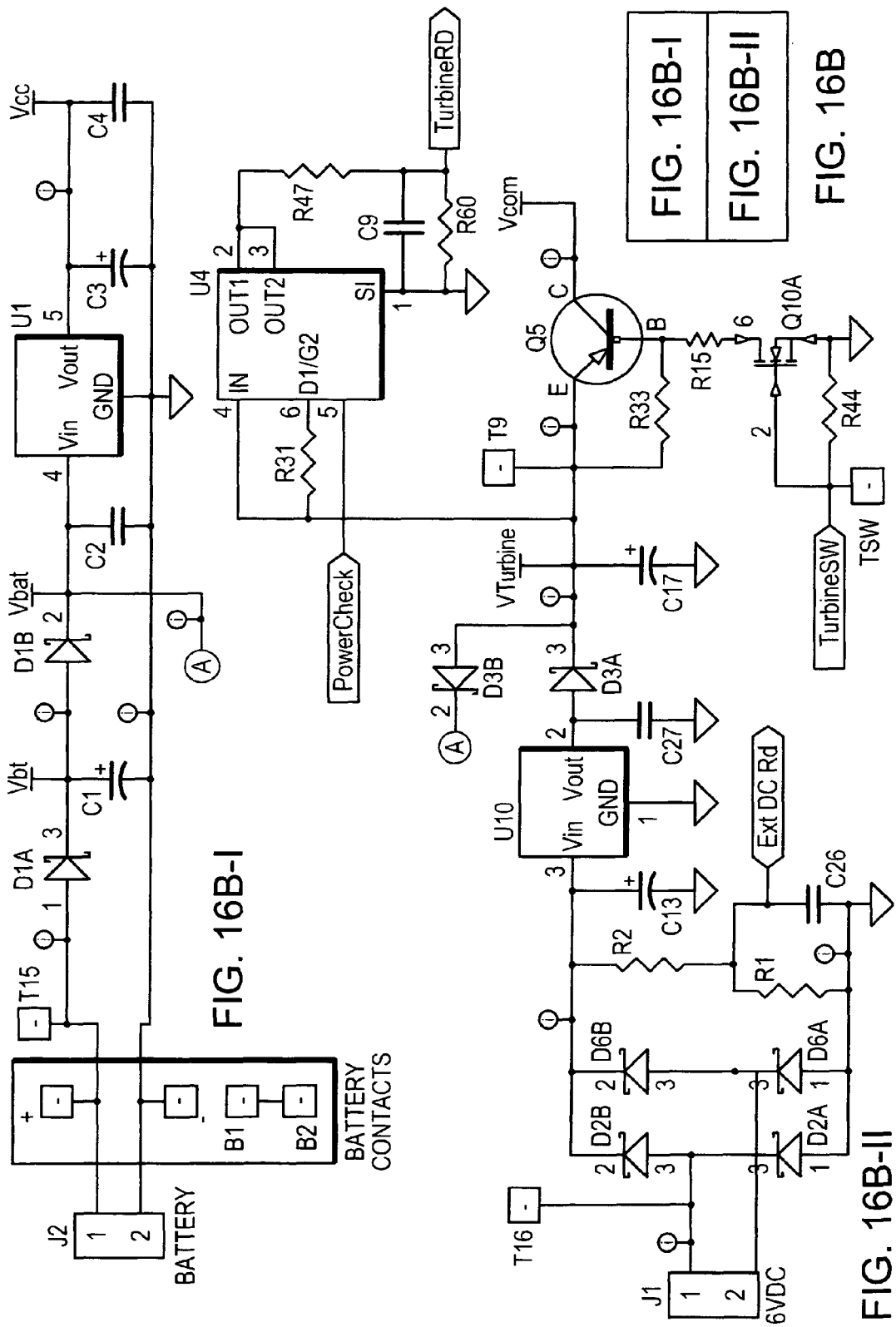

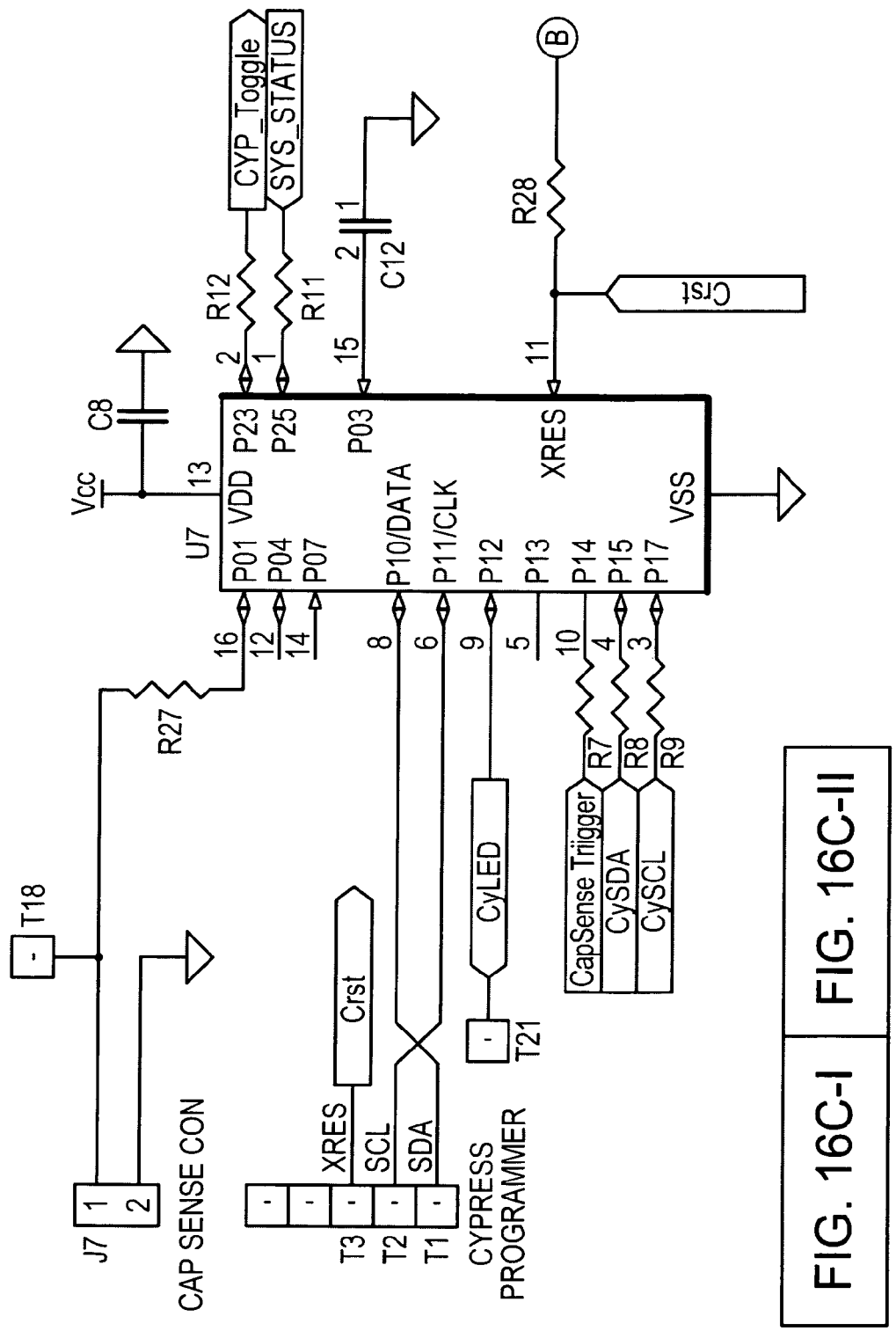

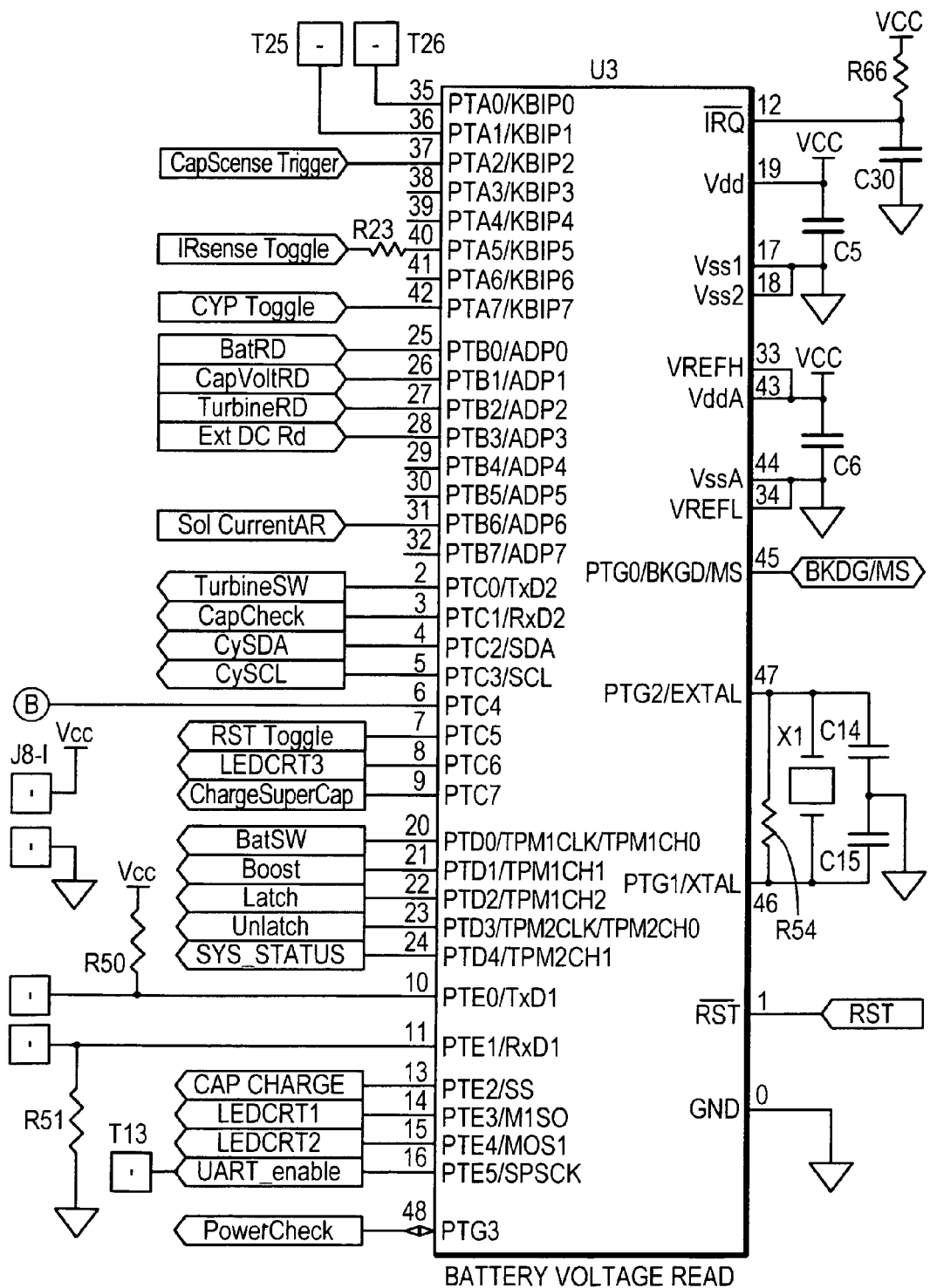
FIG. 16C-II

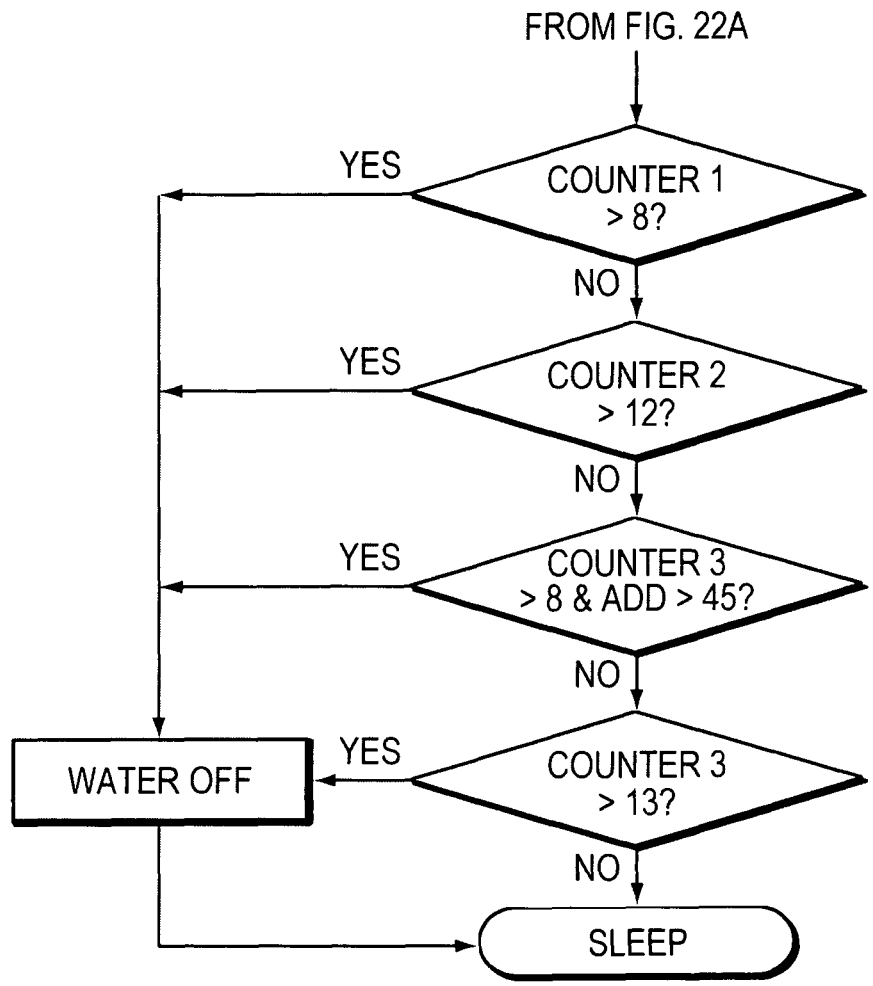
FIG. 22A-I

AUTOMATIC FAUCETS

This application is a continuation of PCT Appl. PCT/US2012/000150, filed on Mar. 15, 2012, which claims priority from U.S. Provisional Application 61/465,213, filed on Mar. 15, 2011, entitled "Automatic Faucets" and U.S. Provisional Application 61/574,345, filed on Jul. 31, 2011, entitled "Automatic Faucets," both of which are incorporated by reference.

This invention relates to automatic faucets and methods for operating and controlling such faucets.

BACKGROUND OF THE INVENTION

In public facilities or large private facilities, there are several different types of automatic faucets in use today. There are also metering faucets that are manually activated to turn on the water by pressing the faucet head and are hydraulically timed so that the water remains on for a set period of time after depression of the head. Some of these faucets have separate head allowing separate control over the hot and cold water. Other metering faucets mix the incoming hot and cold water streams and, when actuated, deliver a tempered output stream.

Also known is a manually activated metering faucet whose on-time is controlled electronically. Still other known faucets are activated electronically when the user positions a hand under the faucet. Automatic water dispensing systems have provided numerous advantages including improved sanitation, water conservation, and reduced maintenance cost. Since numerous infectious diseases are transmitted by contact, public-health authorities have encouraged the public and mandated to food workers the exercise of proper hygiene including washing hands effectively. Effective hand washing has been made easier by automatic faucets. Automatic faucets typically include an object sensor that detects presence of an object, and an automatic valve that turns water on and off based on a signal from the sensor. If the water temperature in an automatic faucet is not in an optimal range, individuals tend to shorten their hand washing time. To obtain an optimal water temperature, a proper mixing ratio of hot and cold water and proper water actuation has to be achieved. Automatic faucets usually use a preset valve that controls water flow after mixing.

The hydraulically timed faucets are disadvantaged in that it is difficult to accurately control the on-time of the faucet over the long term because of mains pressure changes and foreign matter build up in the faucet which can adversely affect the hydraulic controls within the faucet. Furthermore, some faucets can not always discriminate between a user's hand and other substances and objects which may be brought into proximity to the faucet, e.g., a reflective object disposed opposite the faucet's infrared transceiver, soap build up on the faucet's proximity sensor, etc. Resultantly, those prior faucets may be turned on inadvertently and/or remain on for too long a time resulting in wastage of water There is still a need for reliable automatic faucets that do not waste water and have energetically efficient operation.

SUMMARY OF THE INVENTION

The present invention generally relates to automatic sensor based faucets and methods of operating such faucets.

According to one aspect, an automatic faucet includes a housing constructed to receive at least one water inlet conduit and having a spout for delivering water and a valve module including a valve controlled by an electromagnetic actuator for controlling the water flow from the spout. The faucet also includes a sensor module constructed to provide sensor data influenced by a user, and a control module constructed to control opening and closing of the valve by providing signals to the electromagnetic actuator. The control module is constructed to receive sensor data from the sensor module and execute a sensing algorithm that keeps track of a noise signal level and dynamically adapts a signal threshold, the sensing algorithm tracking signal trend to determine presence of a user.

According to preferred embodiments, the control module is constructed to execute the sensing algorithm utilizing separate parameters for different power supply sources.

The sensor module includes a capacitive sensor. The capacitive sensor includes a touch capacitive sensor, or includes a proximity capacitive sensor. Alternatively, the sensor module includes an active infra-red sensor comprising an infrared emitter and detector.

The valve module, the sensor module and the control module are located in the housing of the faucet. Alternatively, the valve module and the control module are located in a control system unit located below a top surface of a sink. The control system unit may include a quick connect fitting for connecting the water inlet conduit. The control system unit includes a water filter associated with the actuator. The control system unit is mounted on a wall using a wall plate. The valve module is designed for auto shut off upon removal of the actuator.

The automatic faucet includes a water turbine for providing power to the electronic control circuit. The water turbine and the control module are designed to measure a water flow rate of the faucet. The water turbine and the control module are designed to detect a fault condition of the faucet. The control module is constructed to execute a power management algorithm.

The automatic faucet includes a photovoltaic cell for providing power to the electronic control circuit. The automatic faucet includes an indicator for indicating status to a user. The indicator includes an LED diode.

According to another aspect, an automatic faucet includes a housing constructed to receive at least one water inlet conduit and having a spout for delivering water. The automatic faucet includes a valve module, a sensor module, a battery module, a turbine module, and a control module. The valve module includes a valve controlled by an electromagnetic actuator for controlling the water flow from the spout. The sensor module is constructed to provide sensor data influenced by a user. The control module is constructed to control opening and closing of the valve by providing signals to the electromagnetic actuator. The control module is also constructed to receive sensor data from the sensor module and execute a sensing algorithm. The control module is also constructed to execute a power management algorithm for managing electrical power generated by the water turbine and provided to and from the battery.

The present invention also relates to a sensor-based flow-control system, such as a sensor-based faucet for delivering water to a sink. The sensor-based flow-control system includes a valve interposed in a conduit and controlled by an electromechanical actuator, and a sensor for generating sensor output signals to an electronic control circuit constructed and arranged to provide the control signals to the electromechanical actuator for opening and closing the valve. The sensor-based faucet includes the control circuit located inside the faucet body mounted on the sink, or includes a control module (a control system unit) located below the sink. The faucet may be activated by a capacitive sensor, an active IR sensor, a passive IR sensor, or an ultrasonic sensor detecting approach, presence or departure of a user.

Preferred embodiments of this aspect include one or more of the following features:

The control module (control system unit) may include the electromagnetic actuator module (including a solenoid actuator), a battery pack, and a water turbine. The electromagnetic actuator enables auto shut off and thus there is no need to shut the water off in case of maintenance, valve changing, or filter cleaning.

The combination of filter attached to removable valve cartridge and auto shutoff associated with the electromagnetic actuator allows for inspecting and cleaning of the filter without tools and without having to shutoff the water supply.

Preferably, the faucet includes a water turbine for providing power to the electronic control circuit and a rechargeable battery. The water turbine and the electronic control circuit are designed to measure a water flow rate of the faucet. The faucet may include a water turbine, a photovoltaic cell and a rechargeable battery, and the microcontroller may includes a power management system for controlling input and output of electrical power and charging of the battery.

According to another aspect, a sensor based faucet includes a water turbine located in a water flow discharged from the faucet. The water turbine includes a rotor coupled to rotor blades located within the water path having a predetermined flow rate, a magnet, a stator and an electrical coil constructed and arranged to generate electrical power.

Preferably, the faucet including the water turbine are further constructed and arranged to detect a minute amount of water leaving the faucet. The faucet including the water turbine are further constructed and arranged to detect a flow rate of water leaving the faucet. The faucet is activated by an automatic sensor and is further constructed and arranged to detect a malfunction of a faucet element based on a signal from the water turbine.

The water turbine includes the rotor attached to the magnet thereby displacing rotationally the magnet during water flow, and the electrical coil that is stationary with respect to the stator.

Advantageously, the control manifold is designed for easy installation and removal of water conduits (e.g., water hoses). The installation requires a simple pull/push to secure the conduits to the control system unit and/or to the faucet. After shutting off the water supply, the quick connect hose fittings allow installation of hoses prior to installing the valve housing (manifold). In combination with the special wall-mounting bracket, the manifold can be easily installed and removed for repairs without tools. The present design uses a special Allen wrench, or other key for a screw securing the cover of the control module with respect to a bracket mounted below the sink.

The control module (control manifold) is designed cooperatively with a wall-mounting bracket. The manifold provides for easy installation and removal onto the wall bracket. The manifold attaches to the wall plate via a simple twist action and is secured as soon as the manifold cover is put over the manifold.

The control system unit (control manifold) is rigidly and totally secured by a simple screw tightening. Once the cover screw is secured, the manifold cannot be removed from the wall mounting bracket (wall plate).

The control manifold also includes a battery case that secures batteries regardless of orientation of the case with respect to the manifold. The battery case can only be installed two ways (180 degree symmetry) and therefore prevents wrong polarity installation. The battery case allows for "blind" installation, i.e., if installer cannot see the location under the sink but still can install the batteries. A simple quarter turn of the battery cover ring will make the batteries slide out for easy replacement. If the battery cover ring is not locking the batteries (batteries not secured) the battery case cannot be installed onto the manifold, which alerts the installer. The battery case is sealed via an o-ring from humidity and the battery case is secured in the manifold via snaps.

The control system unit (control manifold) also includes a water turbine. The turbine reduces power consumption and also allows for precise metering by reading the AC signal frequency which is proportional to the flow rate and also optimized for different flow rates with an insertable flow nozzle and integrated in the manifold and fault detection such as leaks and clogs. That is, the turbine turns for leaks or stops for clogs.

The novel faucet provides for easy installation and removing the crown assembly using one screw. Advantageously, the crown design and function can be easily changed such as adding photovoltaic cells, display screens (e.g., LCD display) and user interfaces.

The electromechanical actuator may be coupled to only one valve interposed in one conduit delivering premixed hot and cold water. The electromechanical actuator may coupled to another type of a valve for controlling flow of hot and cold water in two separate conduits, as described in PCT application PCT/US01/43277. Alternatively, the control signals may be delivered to two electromechanical actuators constructed and arranged to control separately two valves and thereby control separately water flow in two separate conduits with hot and cold water delivered to a faucet.

According to yet another aspect, the faucet may be self-contained battery operated, electronic faucet which can operate for over two, three or more years between battery replacements. The faucet which has a minimum number of moving parts, and the individual parts may be accessed quite easily for maintenance purposes. The faucets can be manufactured and maintained at relatively low cost.

According to yet another aspect, there is a novel interface for calibrating or programming a sensor-based faucet. The interface interacts with a user via an object sensor coupled to a microprocessor for controlling the water flow in the faucet. The sensor-based faucet includes a valve interposed in a conduit and controlled by an electromechanical actuator, and a sensor for generating sensor output signals to an electronic control circuit constructed and arranged to provide the control signals for opening and closing the valve. The control circuit may direct the valve to provide a predetermined number of water bursts at different steps of various algorithms to communicate with a user. The control circuit may control the valve to provide pulsating water delivery when sensing different problems such as a battery low state, an electrical problem or a mechanical problem in one of the faucet's elements.

According to yet another aspect, the faucet is constructed using materials that prevent or significantly reduce bacterial or other biological growth in water regulated by the faucet. Furthermore, sensor-based faucet that is constructed to execute automatically a flushing algorithm in order to flush water contained in the faucet for a predetermined period of time and thus flush bacterial contamination that may have grown inside the faucet. The control circuit may provide also signals to an optical, acoustic or other indicator when such flushing algorithm is executed.

According to yet another aspect, the faucet has a hot and cold-water inlet and an outlet. A sensor generates sensor output signals provided to an electronic control circuit constructed and arranged to provide control signals to an electromechanical actuator. The control circuit provides also a signal to an optical, acoustic or other indicator starts signaling when the actuator first opens the valve. The control circuit provides signals to the indicator that continues signaling for a predetermined duration to indicate to a user that a time interval prescribed as necessary for effective hand washing has not yet expired. When the interval does expire, the user is thereby assured that he has complied with the relevant duration regulation.

BRIEF DESCRIPTION OF THE DRAWINGS

FIG. 8A is an exploded perspective view of the battery module shown in FIG. 4A.

FIG. 8B is an exploded perspective view of the actuator module shown in FIG. 4A.

FIGS. 12, 12A, 12B, 12C and 12D show several views of the turbine including water flow surfaces all located inside the turbine module.

FIGS. 16A through 16G are circuit diagrams of the faucet elements shown in the block diagram in FIG. 15.

FIGS. 22A and 22A-I show a flow chart that illustrates target sensing for turning water off in the flow chart of FIG. 21.

DESCRIPTION OF THE PREFERRED EMBODIMENT

Figure 1:
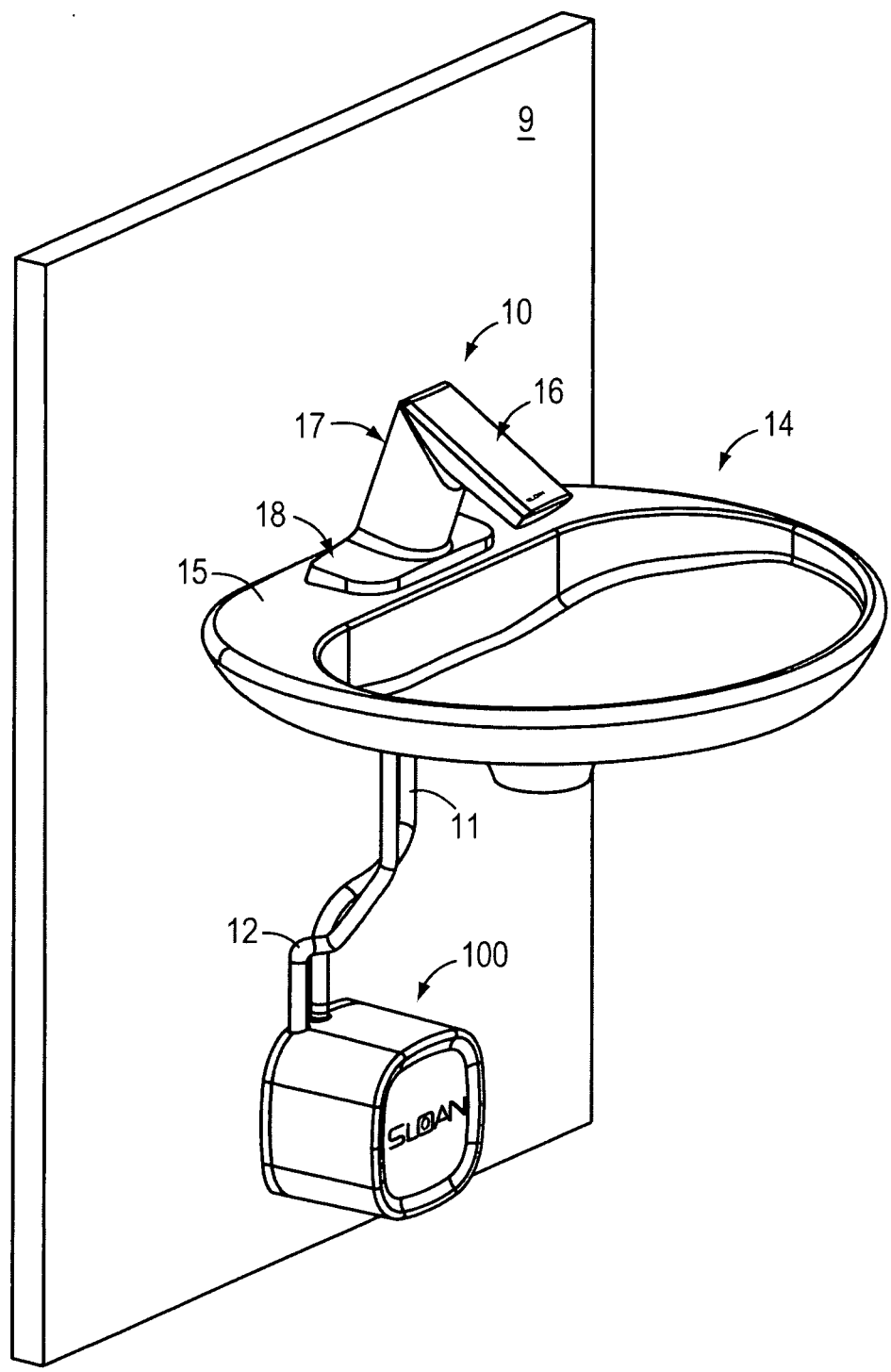
FIG. 1 is a front perspective view showing a faucet installed on a sink with a control system unit located below the sink.
Figure 1A:
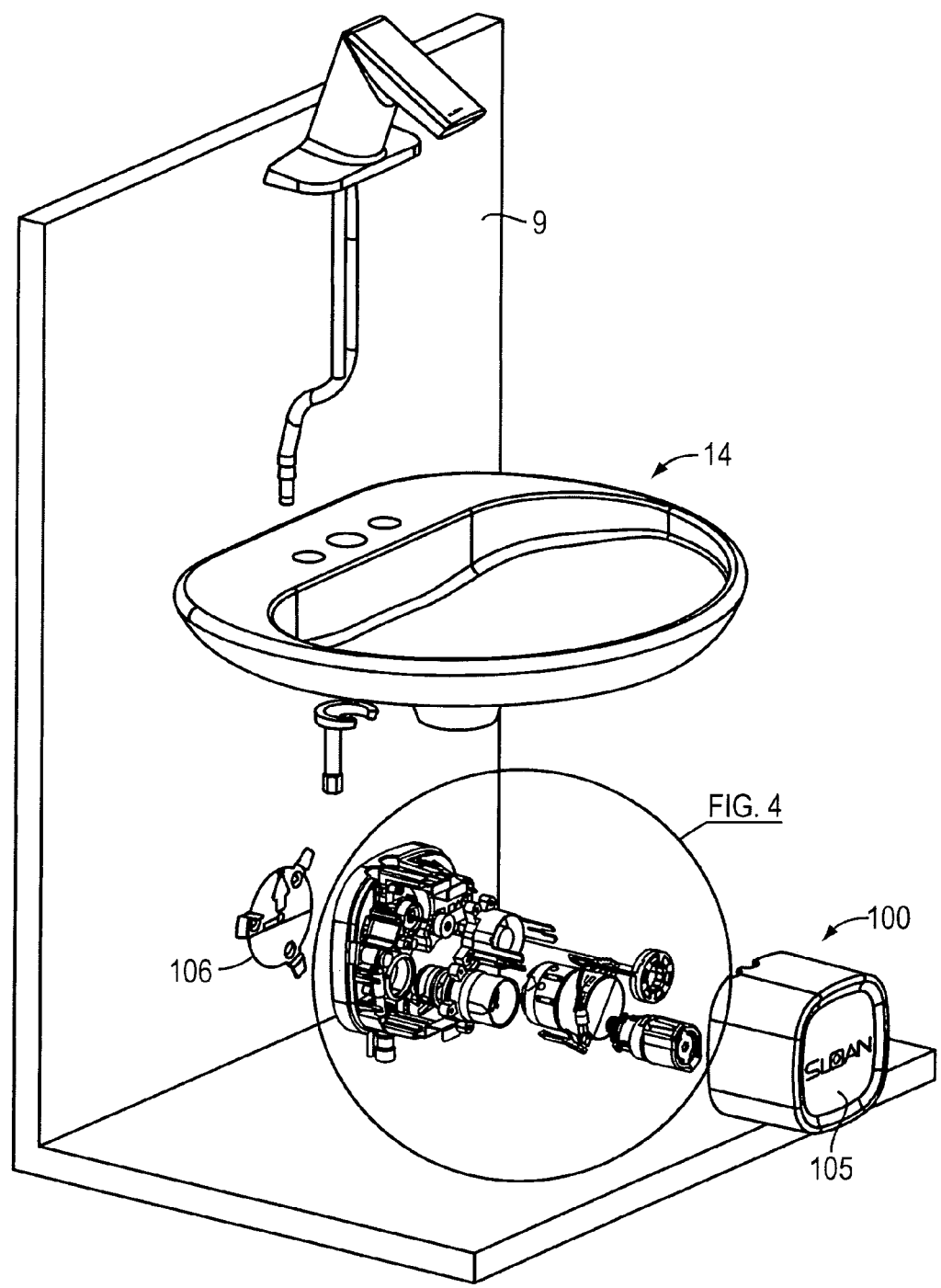
FIG. 1A is the front perspective view of the faucet with the control system unit shown in an exploded view.
Figure 4:
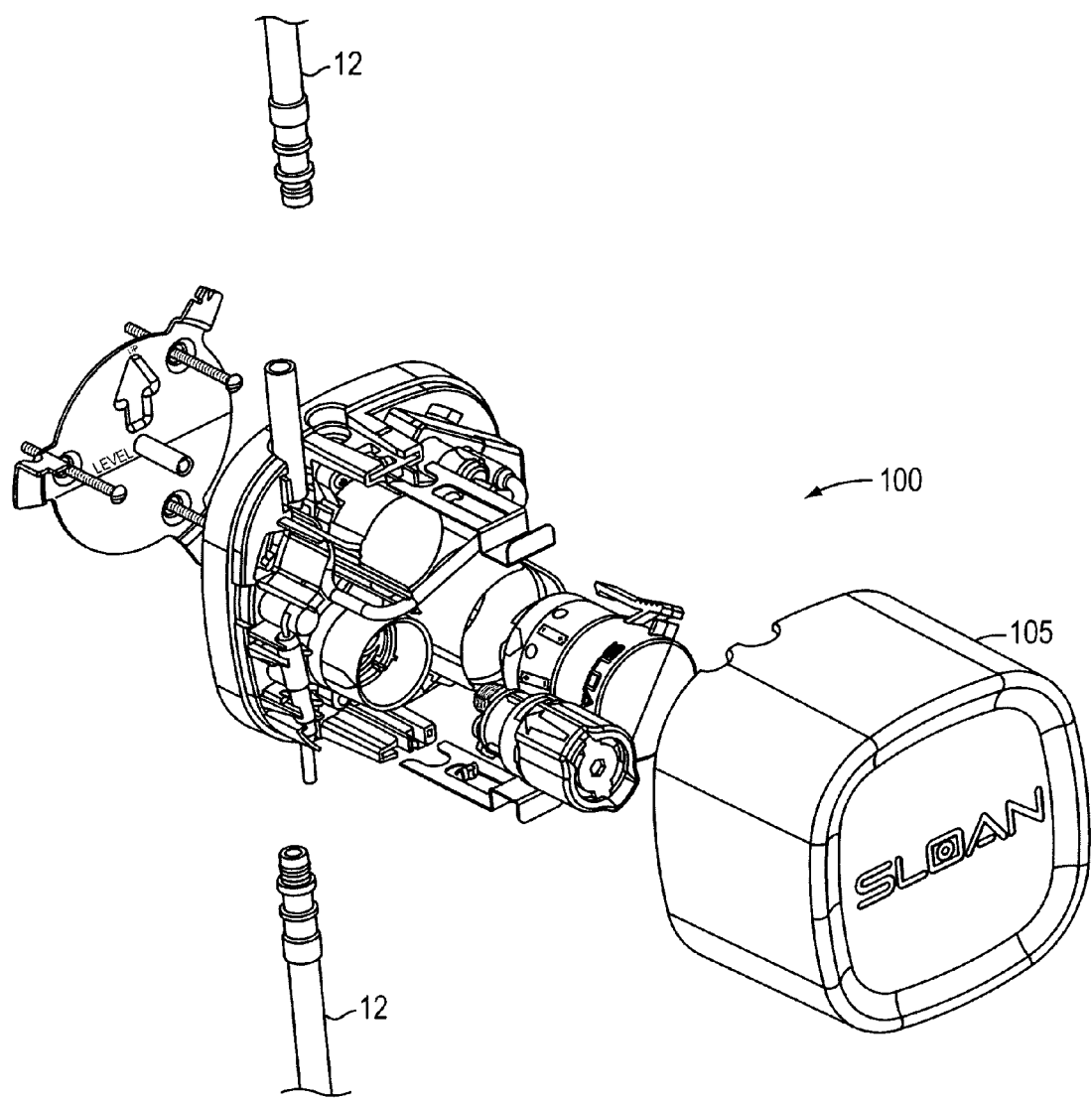
FIG. 4 is a perspective, exploded view of the control system unit located below the sink of the installation shown in FIG. 1.
Figure 4A:
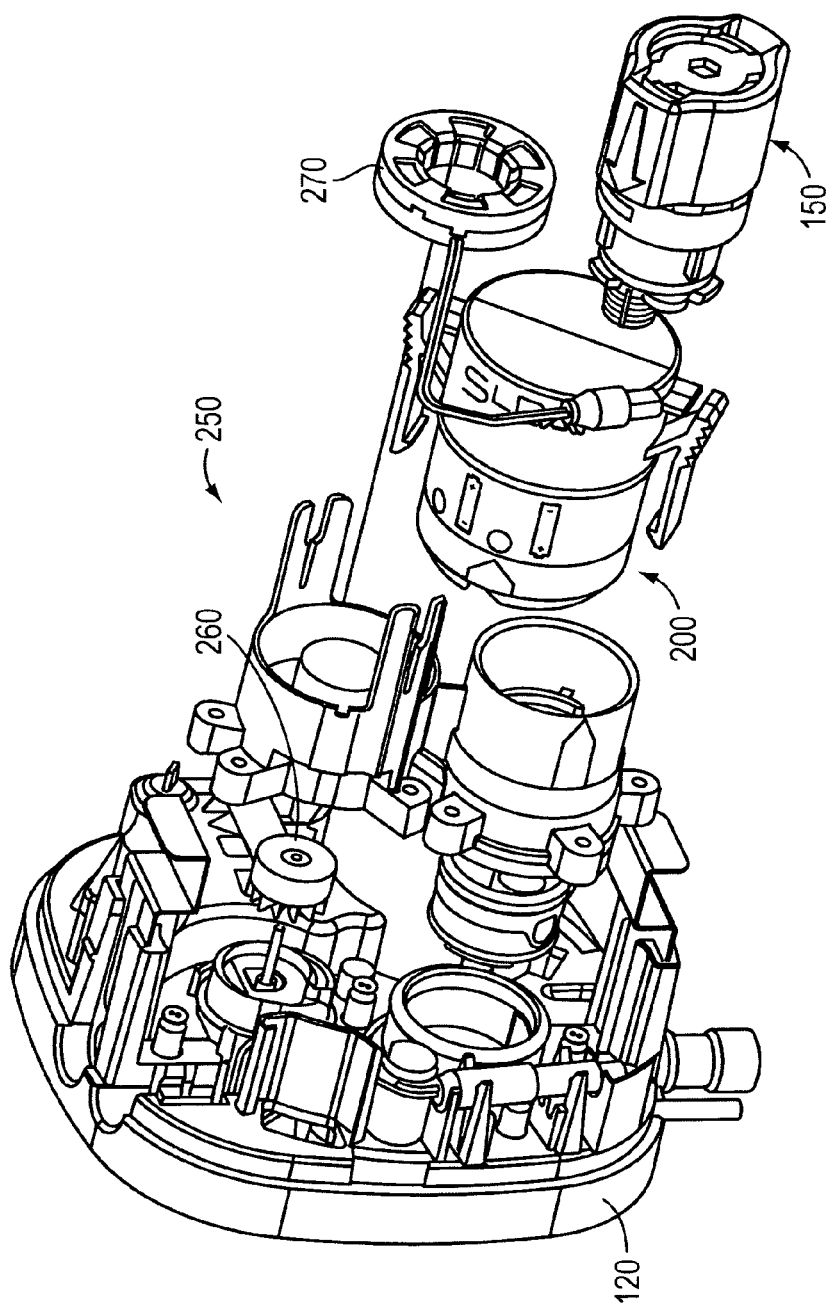
FIGS. 4A and 4B are perspective exploded views of the control system unit shown in FIG. 4 with individual modules shown in more detail.

Referring to FIG. 1, a water faucet 10 is shown mounted to a sink 14, wherein a faucet base 18 is in contact with a top sink surface 15. The faucet includes a housing or encasement body 17 and a faucet crown 16. Faucet 10 is electrically coupled to a control manifold (control system unit) 100 using electrical line 11 and receives water via a water line 12. FIG. 1A illustrates faucet 10 with control system unit 100 shown in an exploded view. Water line 12 is coupled to control center unit 100 using a quick connect arrangement 130 (shown in FIG. 4E) and provides mixed hot/cold water. That is, there is a hot cold mixing unit (not shown in FIGS. 1 and 1A) located below sink 14. Control system unit 100 includes plastic manifold 120 and cover 105 attached to wall attachment plate 106, as also shown in FIGS. 4 and 4A.

Figure 2:
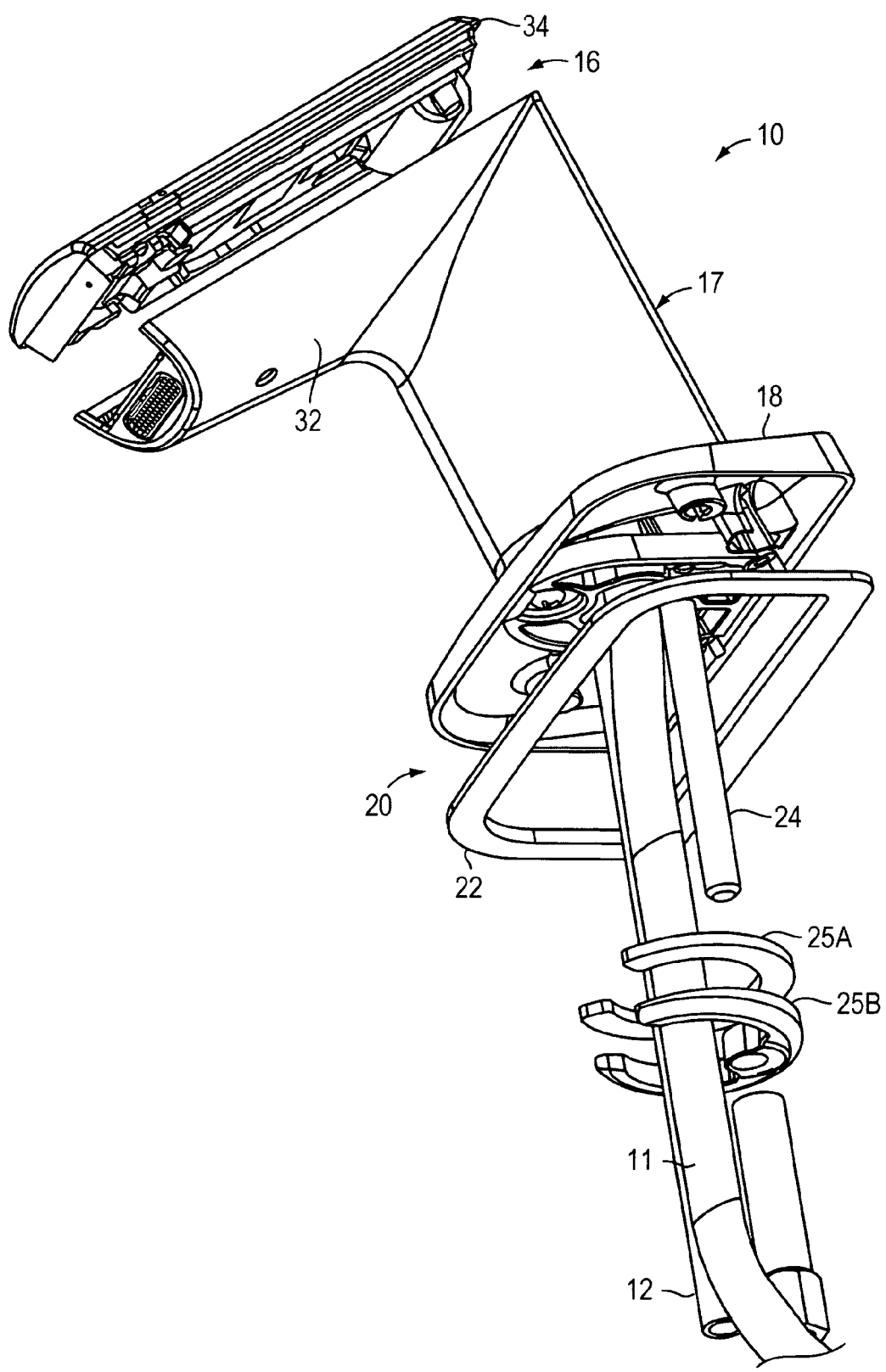
FIGS. 2 and 2A are perspective views showing two embodiments of the faucet of FIG. 1.
Figure 2A:
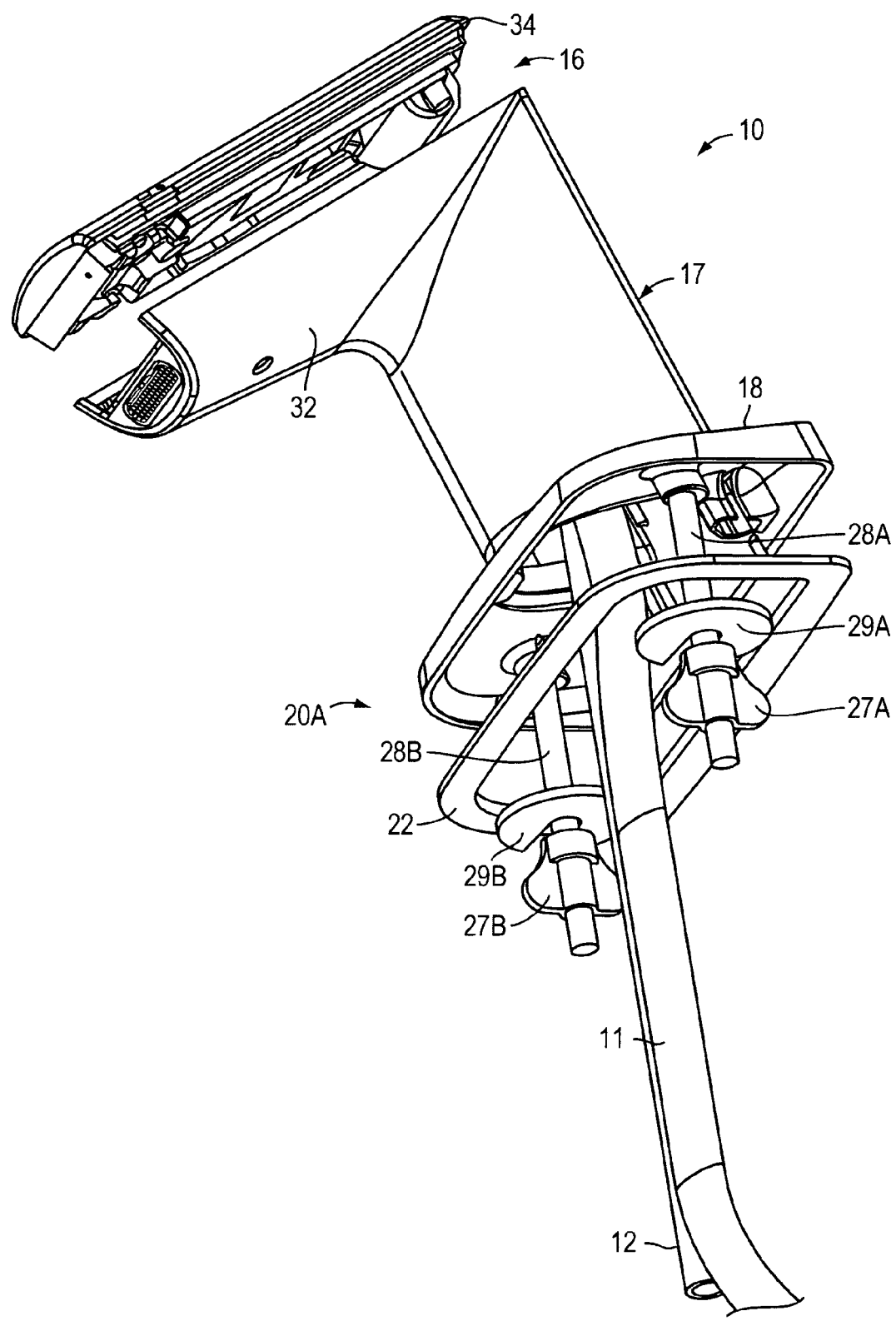

FIGS. 2 and 2A show two different mounting embodiments of faucet 10, shown in FIG. 1, to sink 14. The mounting can be done using a quick connect assembly including a rod 24 and coupling elements 25A and 25B. The coupling assembly may include a gasket 22 or a thicker insulation element for electrically insulating the faucet from a sink made of metal. This insulation is important for proper operation of the capacitance sensor (described below) in installation with a metal sink. FIG. 2A shows another mounting embodiment of faucet 10 using the assembly of rods 28A and 28B and coupling elements 27A, 27B, 29A and 29B.

The faucet housing actually consists of a shell-like structure that forms an upright main body and the upper portion including the faucet crown having a spout extending out from the main body portion to an aerator 38. The faucet crown (Shown as faucet crown 34 in FIGS. 2 and 2A) includes a removable cover plate secured to the body. The cover plate may be replaced by an LCD display or another type of display for communicating with a user or providing a message to the user for entertainment or advertising.

Figure 3:
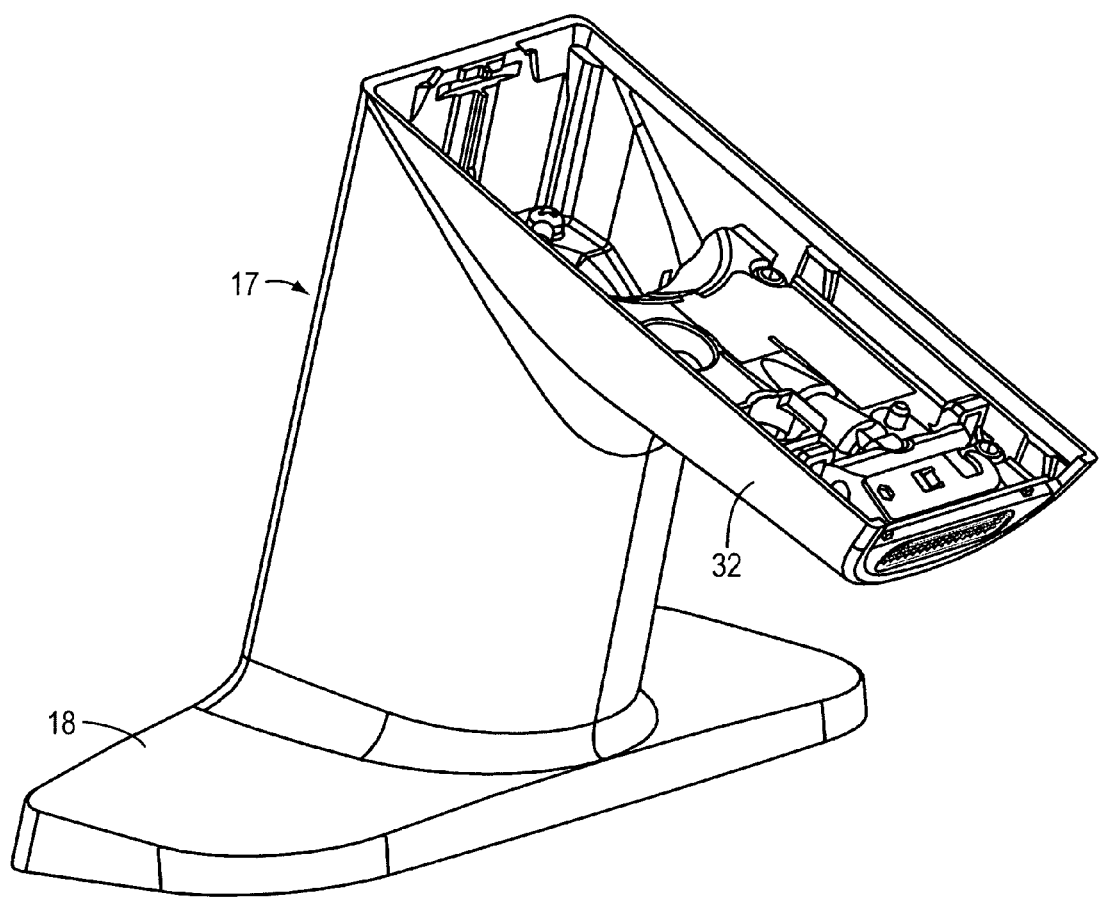
FIG. 3 is perspective view of the faucet of FIG. 1 with a faucet crown removed.
Figure 3A:
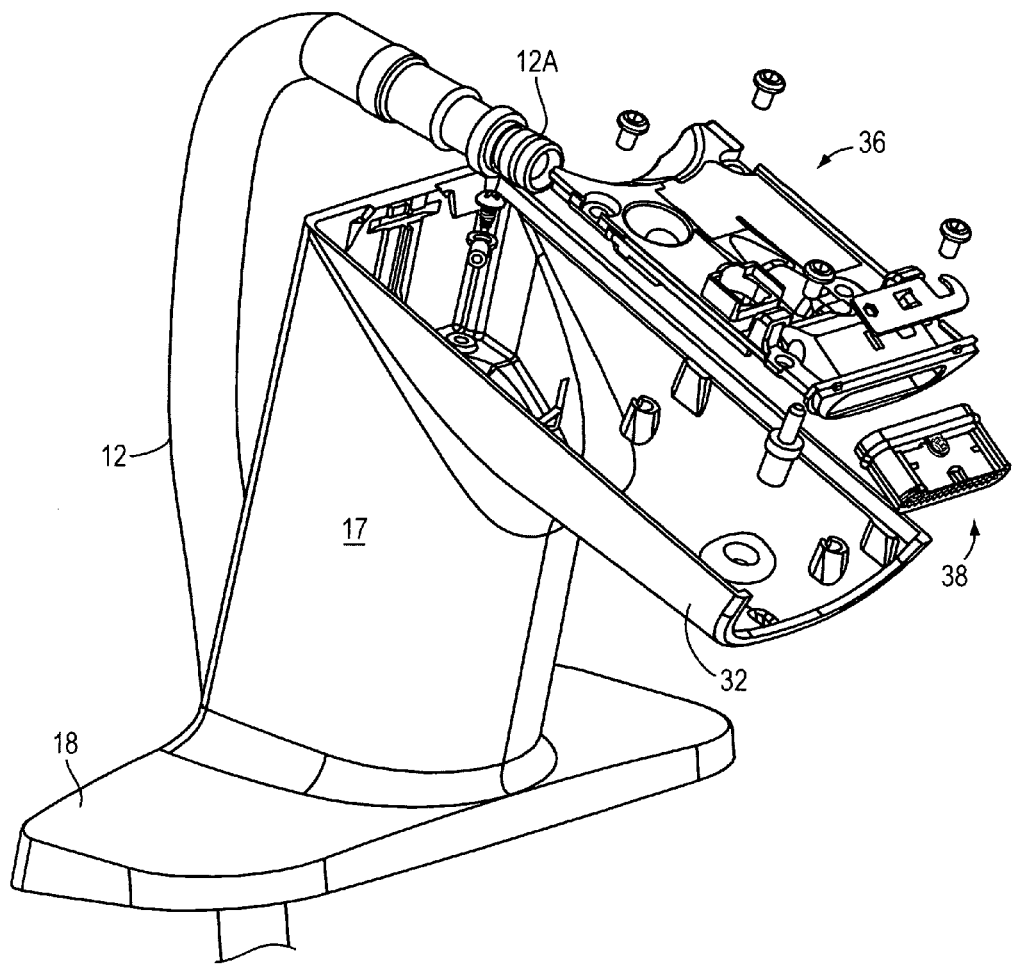
FIG. 3A is a perspective exploded view of the faucet without the faucet crown.
Figure 3B:
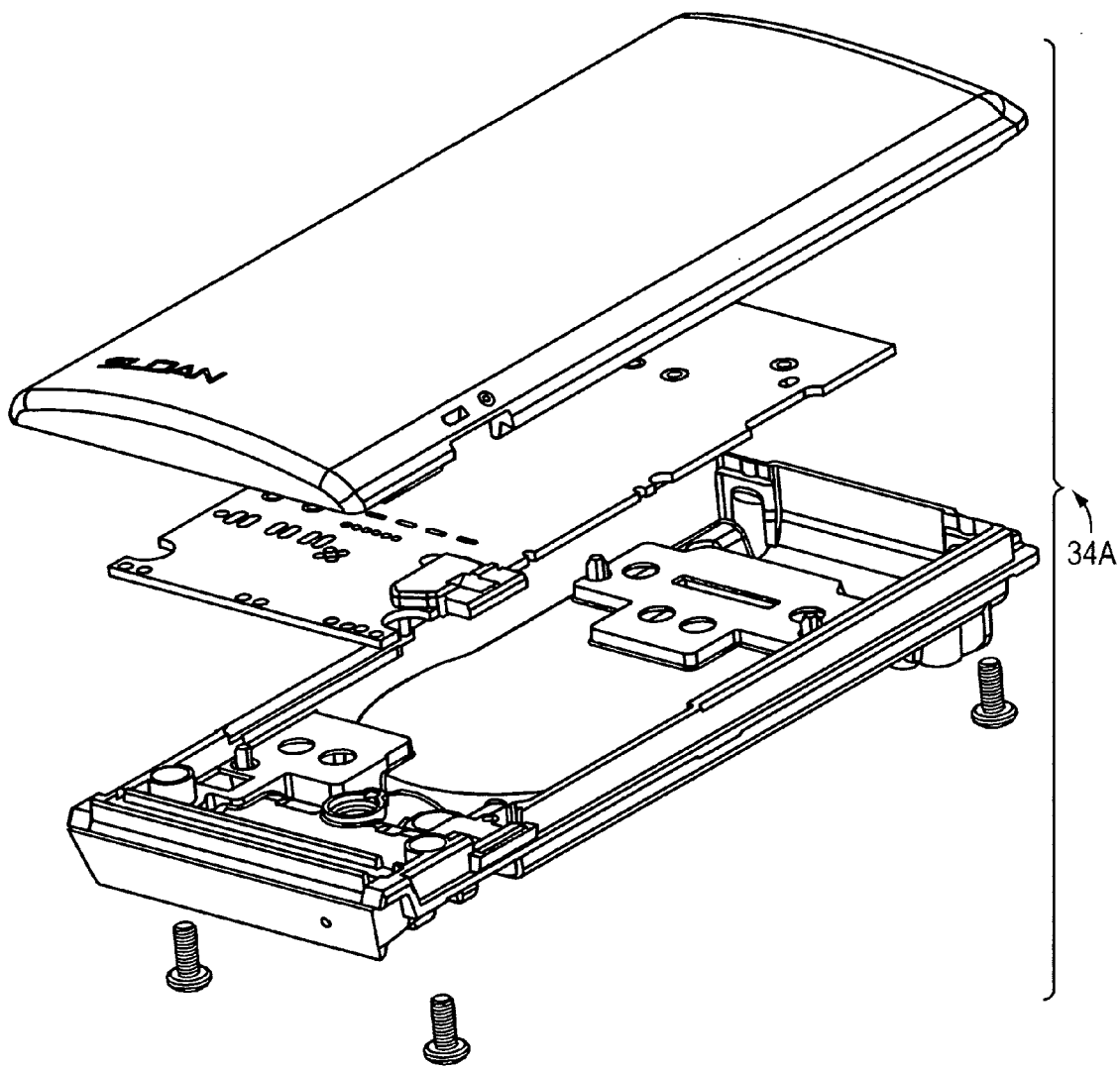
FIGS. 3B and 3C are perspective exploded views of the faucet crown and a circuit board module with an attachment for the faucet shown in FIG. 3 designed for capacitive sensing and IR sensing, respectively.
Figure 3C:
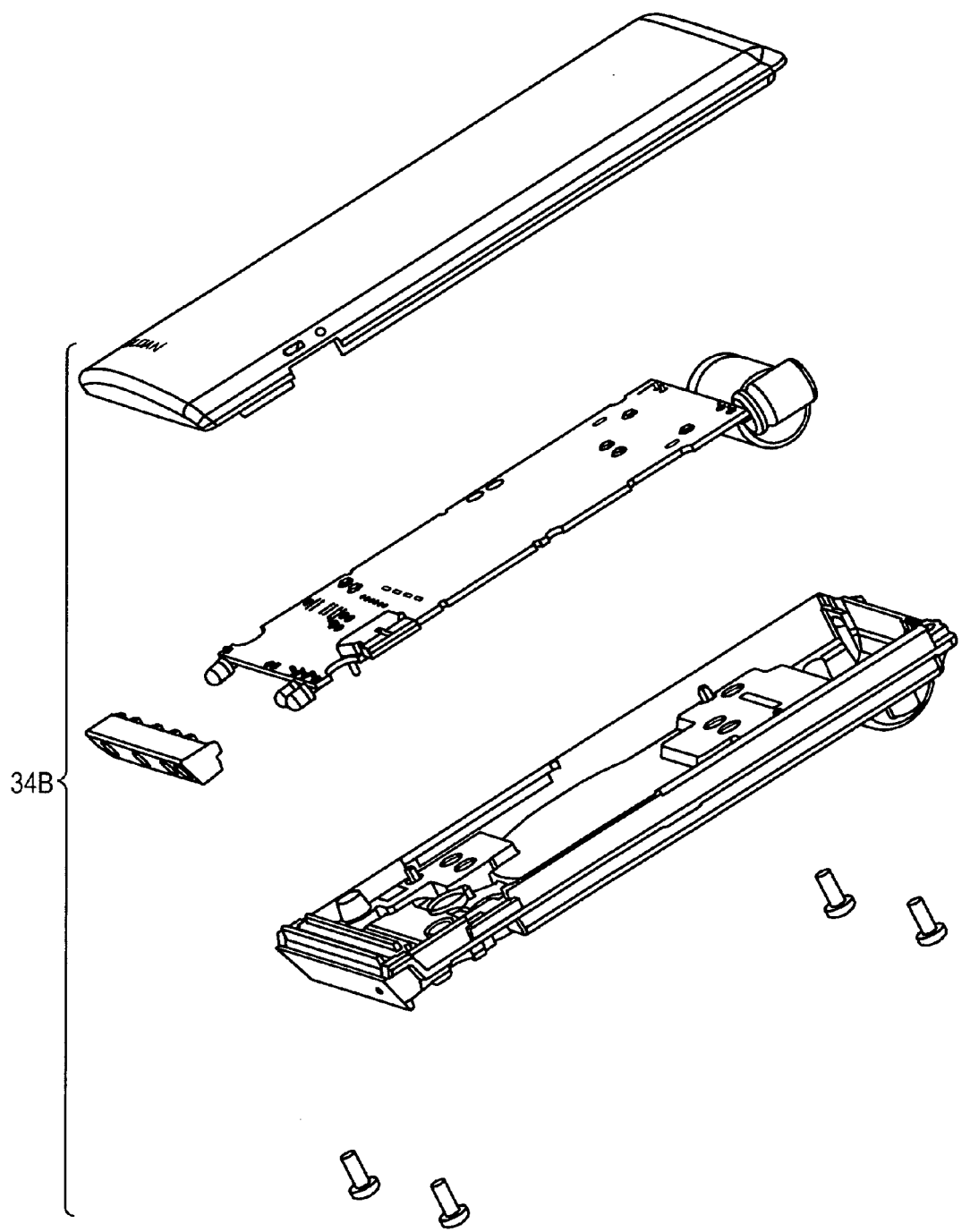

FIGS. 3 and 3A illustrate the faucet having a faucet crown 34 removed. Faucet 10 includes a flexible water conduit 12 having a quick connect 12A attachable to faucet crown insert 36 providing water to aerator 38. FIG. 3B is a perspective exploded views of a faucet crown 34A, including a circuit board and a cover plate, designed for capacitive sensing of the user's hands. FIG. 3C is perspective exploded view of a faucet crown 34B, including a circuit board and a cover plate, designed for IR sensing of the user's hands (or alternatively designed for both capacitive sensing and IR sensing).

FIG. 4 is a perspective, exploded view of a control system manifold 100 located below the sink. FIG. 4A is a perspective exploded view of control system manifold (control system unit) 100 having a cover 105 removed. Control system unit 100 is designed co-operatively with a wall-mounting bracket 106 (shown in FIGS. 4 and 5) for attachment to the bathroom wall below the sink.

Figure 14:
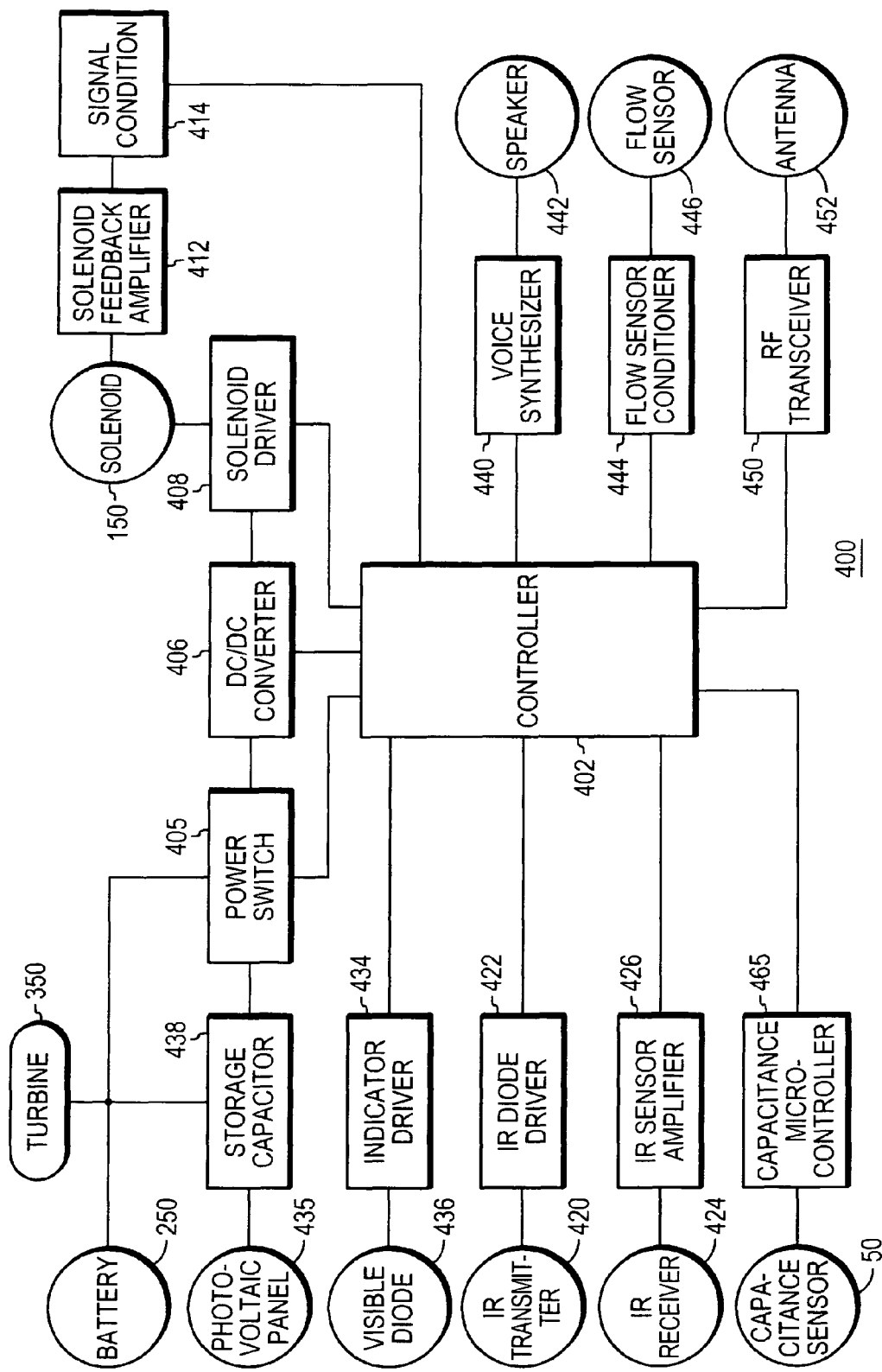
FIG. 14 is a block diagram of the faucet elements and control circuitry for controlling operation of the faucet shown in FIG. 1 or FIG. 9.

Referring to FIGS. 4, 4A, 4B, 4C and 4D, control system unit 100 includes a valve module 150, a battery module 200, a turbine module 250, and an electronic control module 400 (shown in FIG. 14). The valve module includes a valve housing, a lower valve body, an upper valve body, a filter and an actuator module. The battery module includes a battery housing and a battery holder for accommodating four 1.5V batteries. The turbine module includes a water turbine including a rotor assembly 260 and a stator assembly 270, as shown in detail in FIGS. 12 through 12D.

The valve module provides a valve for controlling water flow to faucet 10 using the actuator module and provides a shut off valve for easy maintenance. When the actuator module is removed from the valve housing, there is no water flow across control system unit 100. Also referring to FIGS. 7 and 7A, actuator module 150 is inserted into the valve housing oriented to match the arrows on both elements, as shown in FIG. 4D. When actuator module 150 is turned, for example, 45 degrees as shown in FIG. 4C, water can flow across the valve module if the actuator is open. Rotating actuator module 150 about 45 degrees (from the position shown in FIG. 4C to the position shown in FIG. 4D) closes the valve for maintenance. Actuator module 150 includes an electromechanical actuator (a solenoid actuator) described below. FIG. 8B is an exploded perspective view of the actuator module and the valve including the water filter, also shown in FIG. 4A. The solenoid actuator controls the water flow delivered to the user from aerator 38.

Battery module 200 includes four batteries each providing 1.5V DC. In control system module 100, the surfaces of plastic manifold 120 and cover 105 are cooperatively designed for tight, mechanically robust coupling. FIG. 8A is an exploded perspective view of the battery module. The battery housing located in the control system unit is designed to receive the battery module 200 regardless of orientation of the case with respect to the manifold. That is, battery module 200 can only be installed two ways (180 degree symmetry) and therefore prevents wrong polarity installation. The battery case allows for "blind" installation, i.e., if installer cannot see the location under the sink but still can install the batteries. A simple quarter turn of the battery cover ring will make the batteries slide out for easy replacement. If the battery case ring is not locking the batteries (batteries not secured) the battery case cannot be installed onto the manifold. Battery unit 200 is sealed via an or-ring from humidity and battery case is secured in the manifold via snaps.

Figure 5:
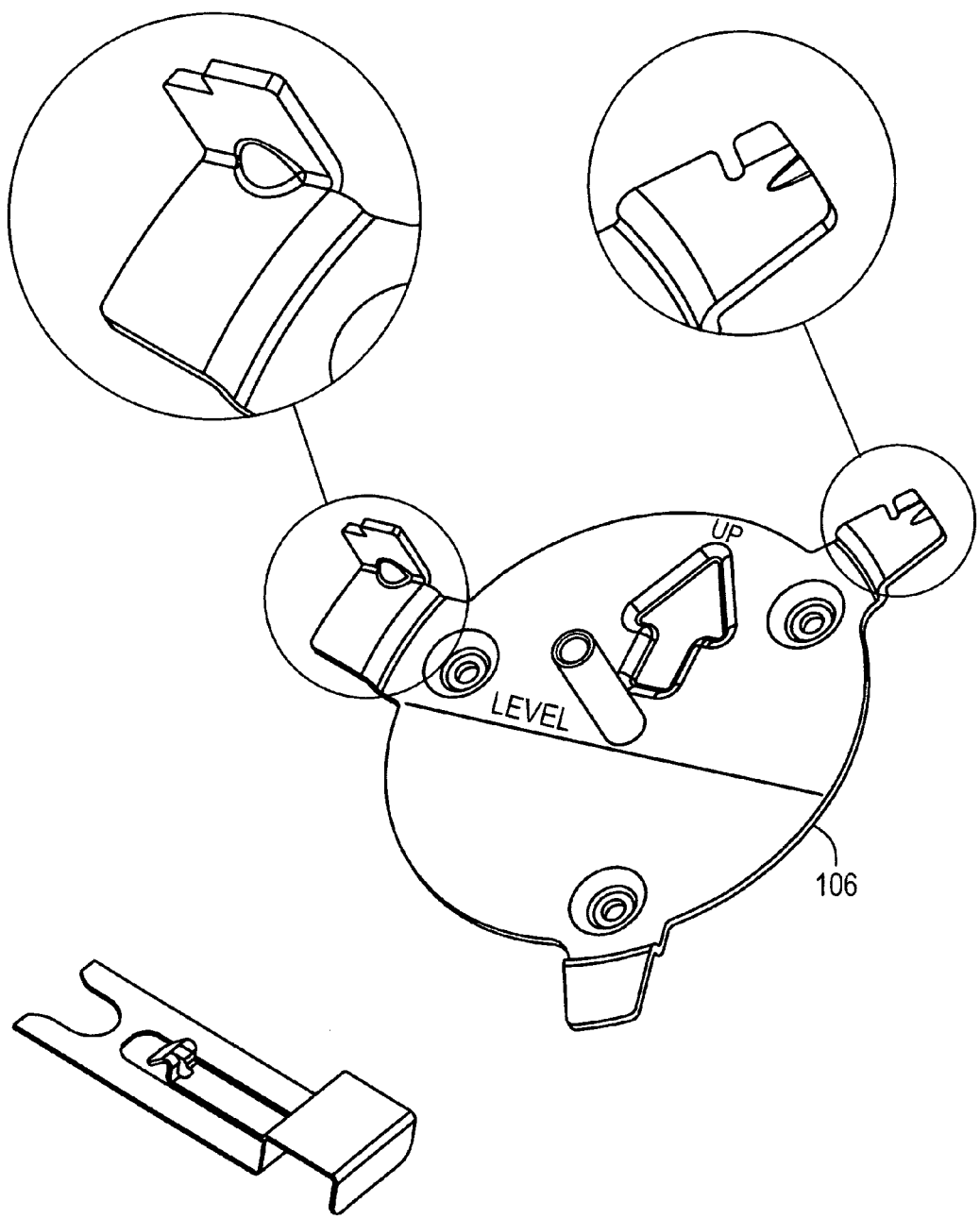
FIG. 5 is a perspective view of a wall attachment plate for attaching the control system unit shown in FIG. 1 and in FIG. 1A.

FIG. 5 is a perspective view of a wall attachment plate 106 for attaching control system unit 100 to a wall or another suitable surface. Plastic manifold 120, plastic cover 105 (shown in FIG. 8) and wall attachment plate 106 include cooperating surfaces and are marked for easy servicing of control system manifold 100. The entire control system unit is designed cooperatively with the wall-mounting bracket 106 for easy installation and attachment to, and removal from the wall bracket. The unit attaches to the wall plate 106 via a simple twist action and is secured as soon as the plastic cover 105 is put over the plastic manifold 120. The unit is rigidly and totally secured by a simple screw tightening. Once the cover screw (FIG. 8) is secured, the manifold cannot be removed from the wall mounting bracket (wall plate) 106. The present design uses special Allen wrench (or other key) for a screw securing a cover 105 of the control module. The individual modules within faucet 10 and control system unit 100 are removable and easily replaceable for quick servicing.

Figure 6:
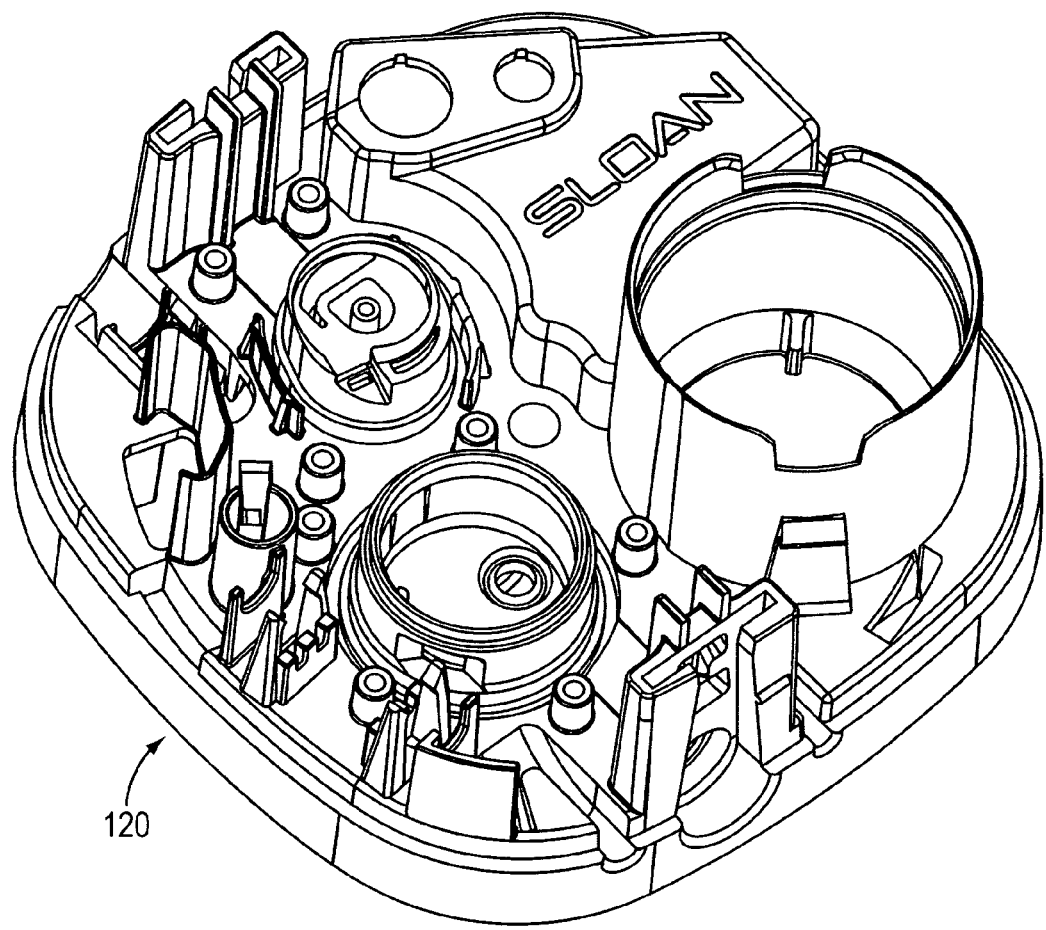
FIGS. 6 and 6A are a perspective top view and a perspective bottom view, respectively, of a base holder for the control system unit shown in FIGS. 4A through 4D without the individual modules.
Figure 6A:
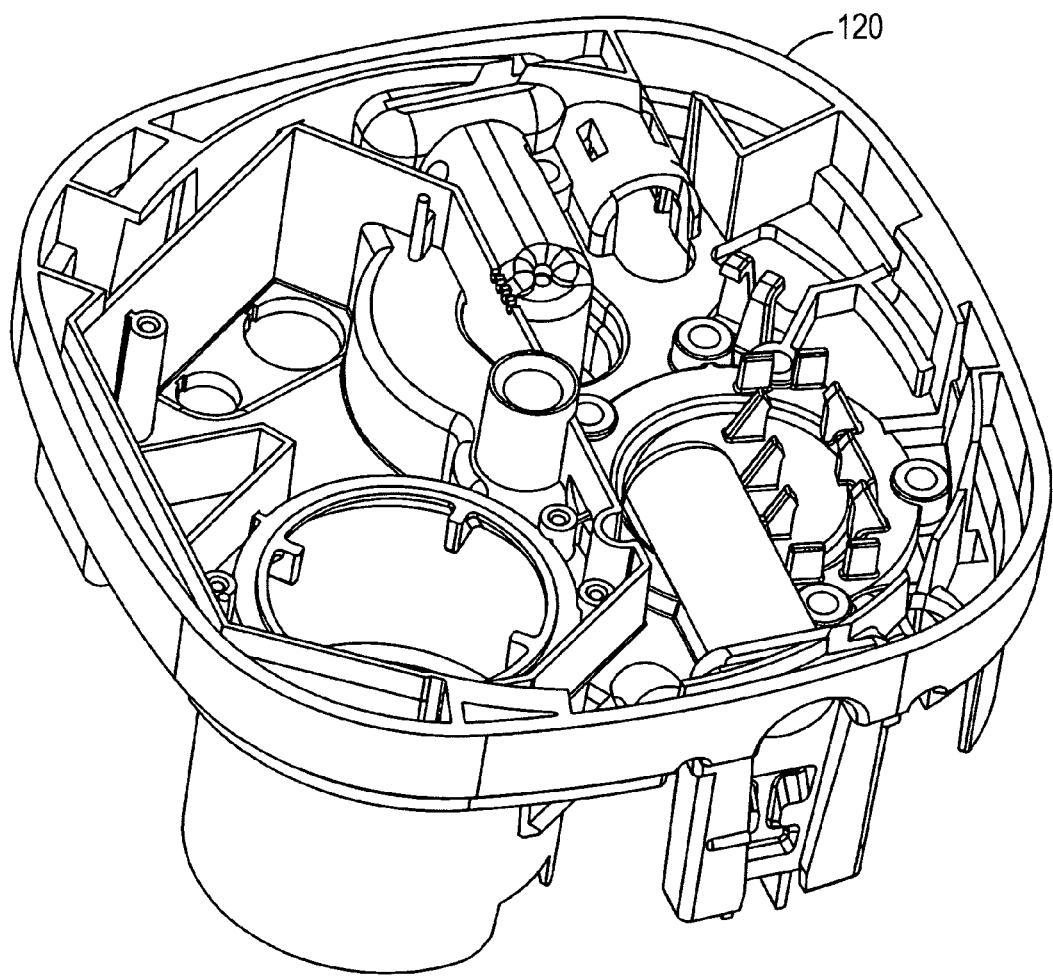
Figure 7:
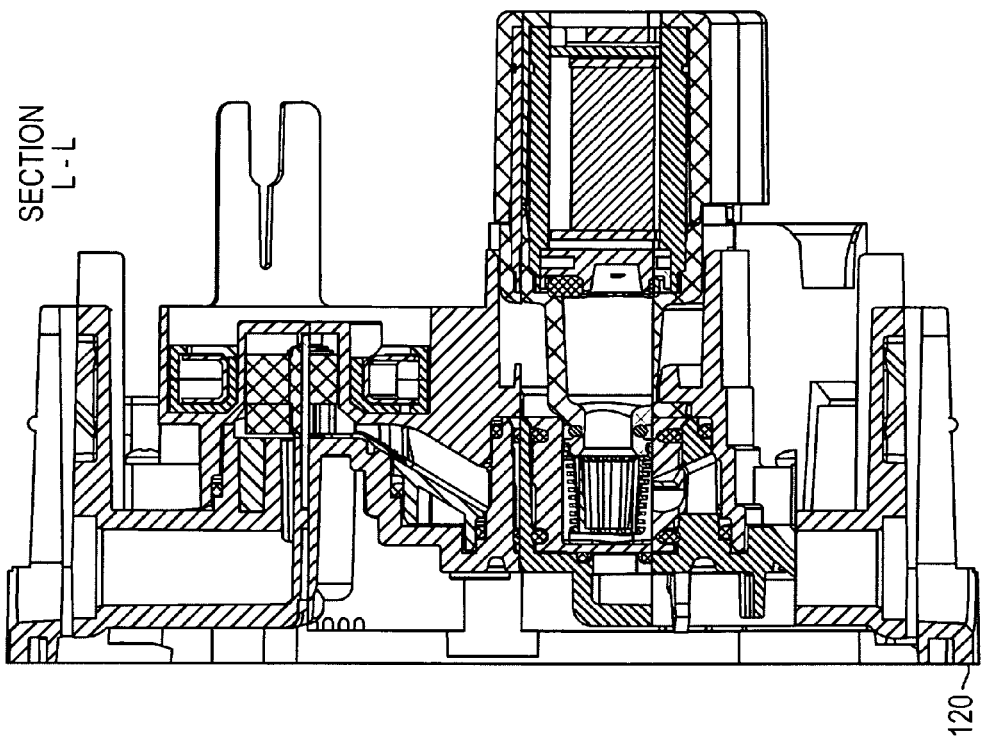
FIGS. 7, 7-I, 7A, and 7A-I, are top and cross-sectional views of the control system unit with the individual modules attached.
Figure 7:
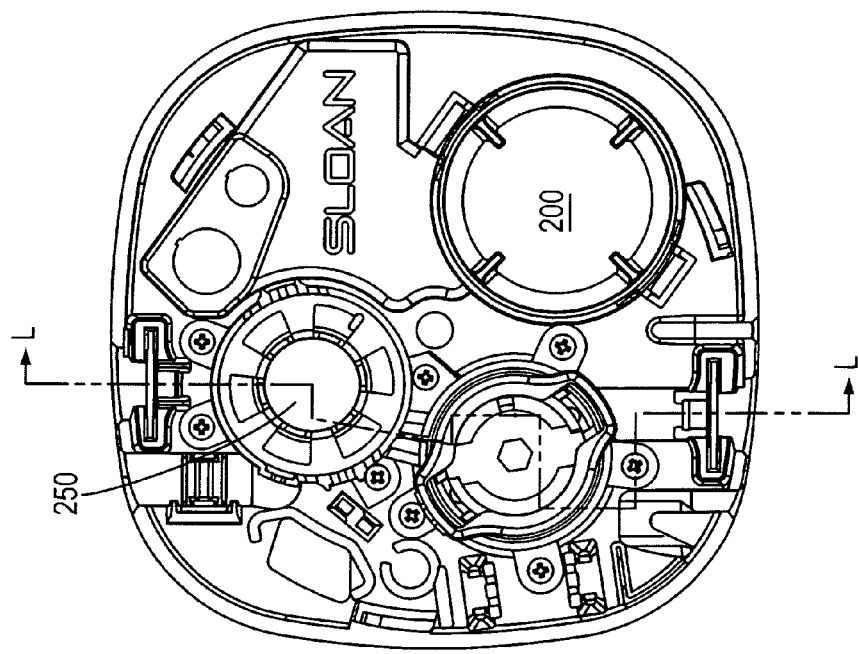
Figure 7A:
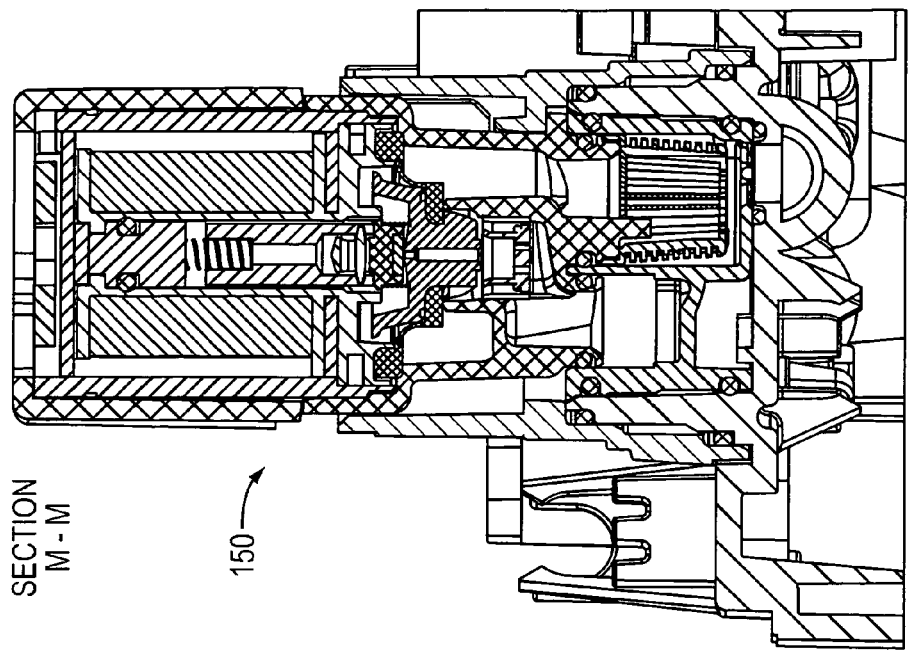
Figure 7A:
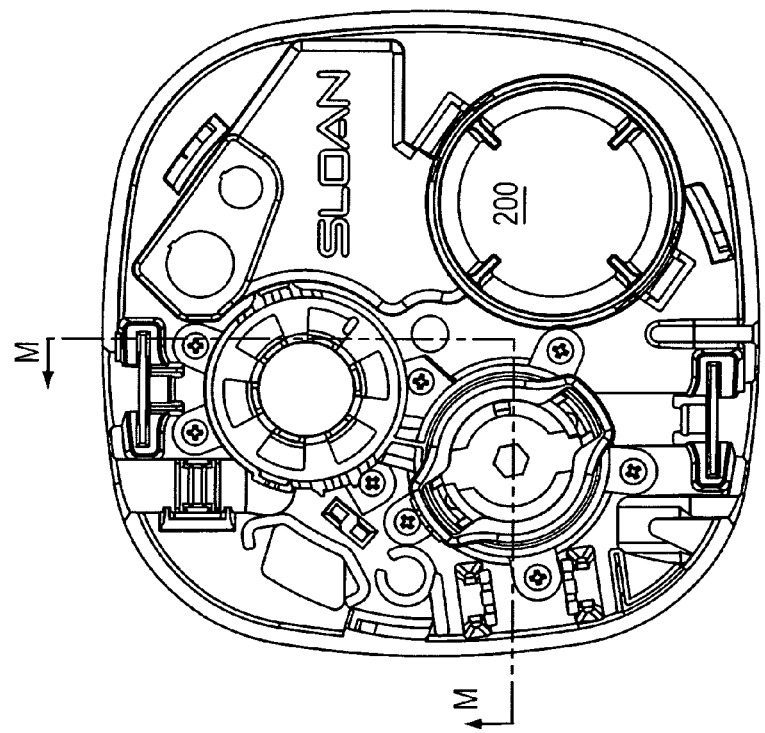
Figure 8:
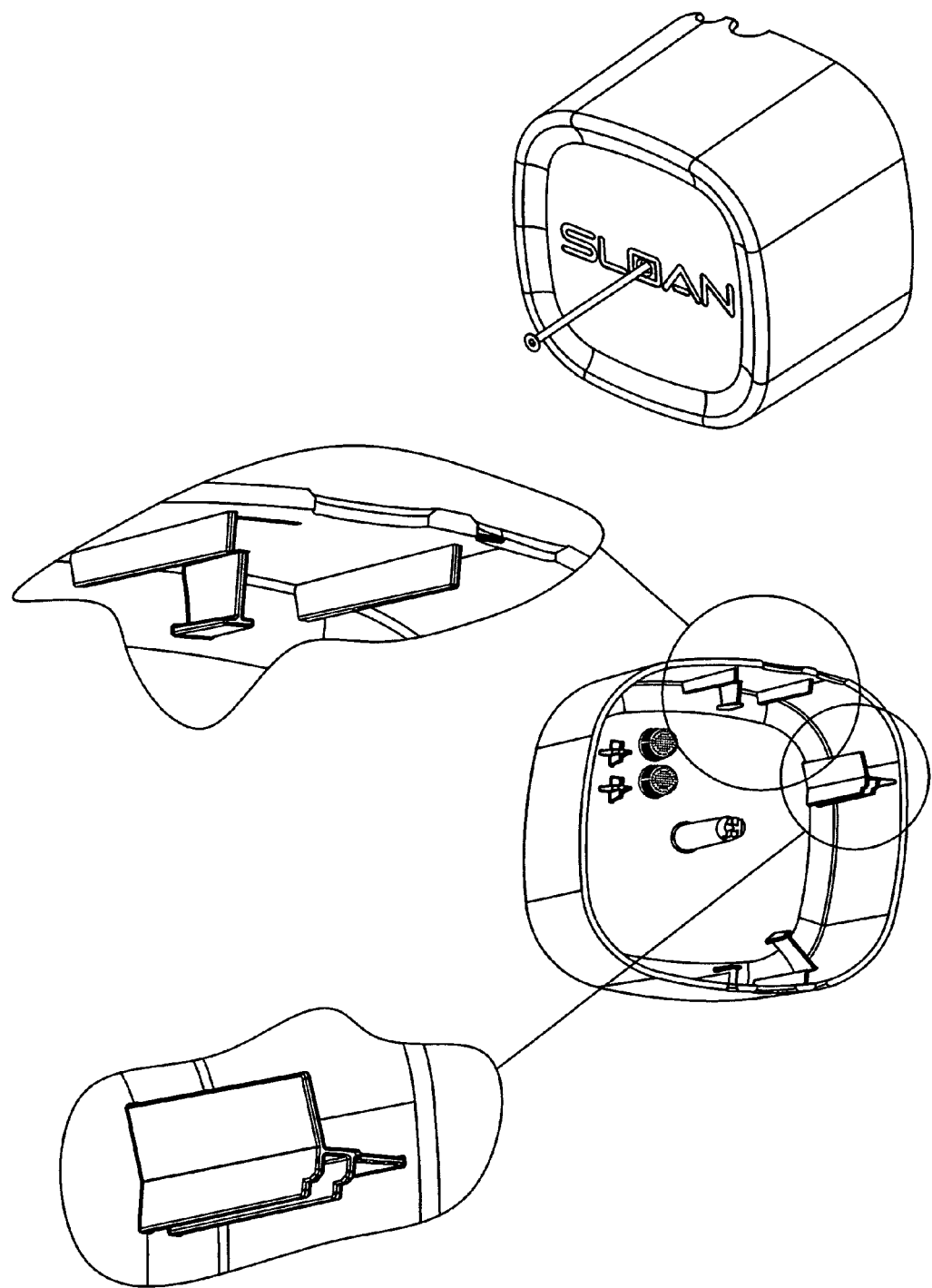
FIG. 8 shows the cover for the control system unit in several perspective and detailed views also illustrating individual attachments elements for attaching cover to the base holder.
Figures 10, 10A:
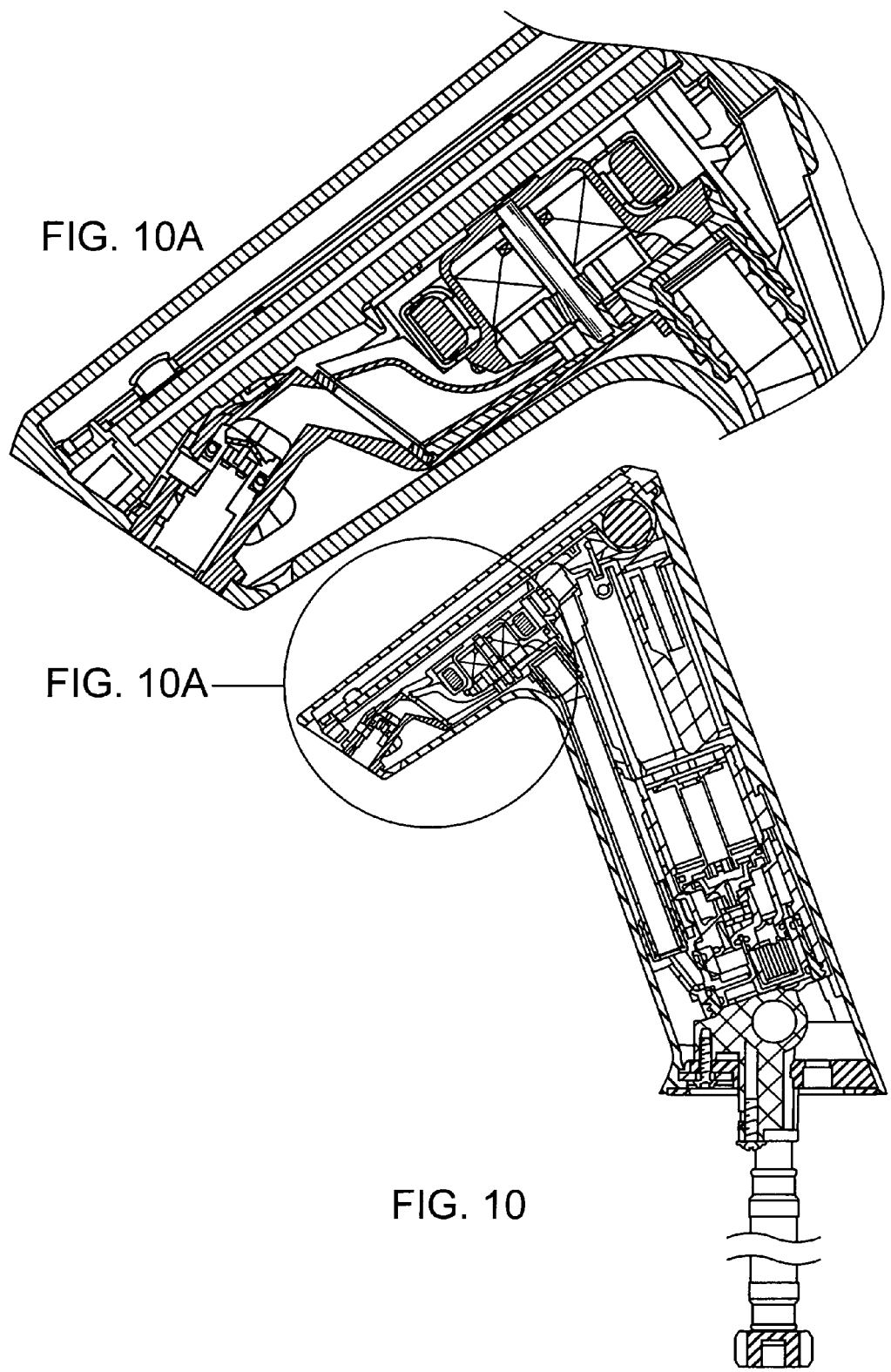
FIG. 10 is a cross-sectional side view of the faucet shown in FIG. 9.
FIG. 10A is a cross-sectional, detailed side view of the faucet head of the faucet shown in FIG. 10.

FIGS. 6 and 6A are perspective top view and perspective bottom view of plastic manifold (base holder) 120 for control system unit 100. FIGS. 7, 7-I, 7A, and 7A-I, are cross-sectional views of control system manifold 100. FIG. 10 shows manifold cover 105 in several perspective and detailed views.

The cooperative action of the valve module and the actuator module enables auto shut off and thus there is no need to shut the water off in case of maintenance, valve changing or filter cleaning. The combination of filter attached to removable valve cartridge and auto shutoff associated with the electromagnetic actuator allows for inspecting and cleaning of the filter without tools and without having to shutoff the water.

The actuator module includes an electromagnetic actuator (electromagnetic operator). The electromagnetic actuator includes a solenoid wound around an armature housing constructed and arranged to receive an armature including a plunger partially enclosed by a membrane. The armature provides a fluid passage for displacement of armature fluid between a distal part and a proximal part of the armature thereby enabling energetically efficient movement of the armature between open and closed positions. The membrane is secured with respect to the armature housing and is arranged to seal armature fluid within an armature pocket having a fixed volume, wherein the displacement of the plunger (i.e., distal part or the armature) displaces the membrane with respect to a valve passage thereby opening or closing the passage. This enables low energy battery operation for a long time.

Preferably, the actuator may be a latching actuator (including a permanent magnet for holding the armature) or a non-latching actuator. The distal part of the armature is cooperatively arranged with different types of diaphragm membranes designed to act against a valve seat when the armature is disposed in its extended armature position. The electromagnetic actuator is connected to a control circuit constructed to apply said coil drive to said coil in response to an output from an optional armature sensor. The armature sensor can sense the armature reaching an end position (open or closed position). The control circuit can direct application of a coil drive signal to the coil in a first drive direction, and in responsive to an output from the sensor meeting a predetermined first current-termination criterion to start or stop applying coil drive to the coil in the first drive direction. The control circuit can direct or stop application of a coil drive signal to the coil responsive to an output from the sensor meeting a predetermined criterion.

The faucet may be controlled, for example, by an electromagnetic actuator constructed and arranged to release pressure in the pilot chamber and thereby initiate movement of a piston, diaphragm, or a fram assembly, from the closed valve position to the open valve position. The actuator may include a latching actuator (as described in U.S. Pat. No. 6,293,516, which is incorporated by reference), a non-latching actuator (as described in U.S. Pat. No. 6,305,662, which is incorporated by reference), or an isolated operator (as described in PCT Application PCT/US01/51098, which is incorporated by reference). The valve module may also be controlled manually, initialing an electrical signal to the actuator driver (instead of a signal initialed by a sensor) or by manually releasing pressure in the pilot chamber as described in U.S. Pat. No. 6,874,535 (which incorporated by reference).

Referring to FIG. 4 E, the control system unit is designed for easy installation and removal of water conduit for providing water to faucet 10. FIG. 4E illustrates an enlarged view of quick connect 130 for connecting water conduits to the control system unit 100 shown in FIG. 4. The installation requires a simple pull-push to secure the conduit (e.g., a hose) from the mixing valve or from the faucet. In combination with the special wall-mounting bracket 106 (FIG. 4), control system unit 100 can be easily installed and removed for repairs without tools.

Figure 4B:
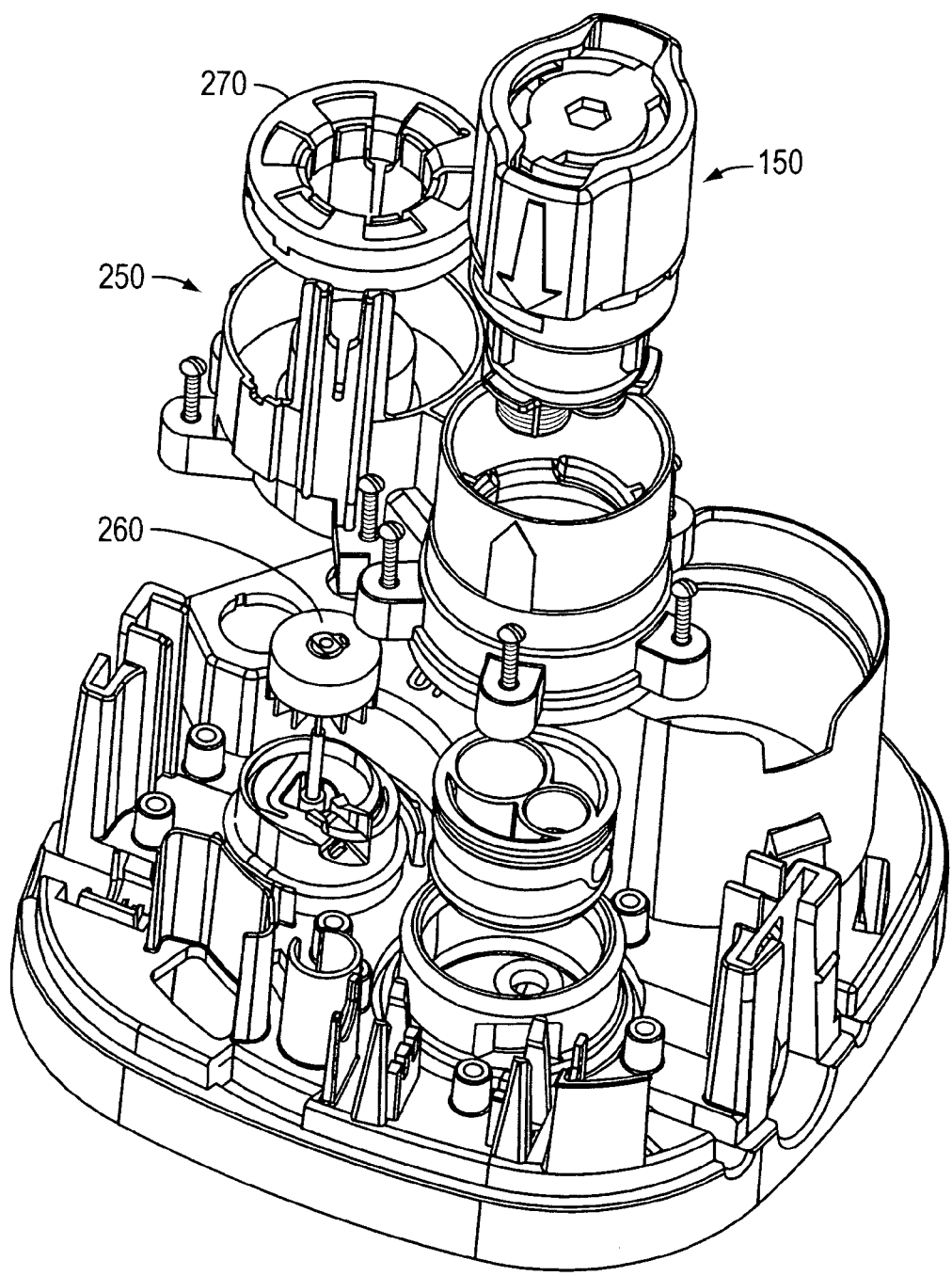
Figure 4C:
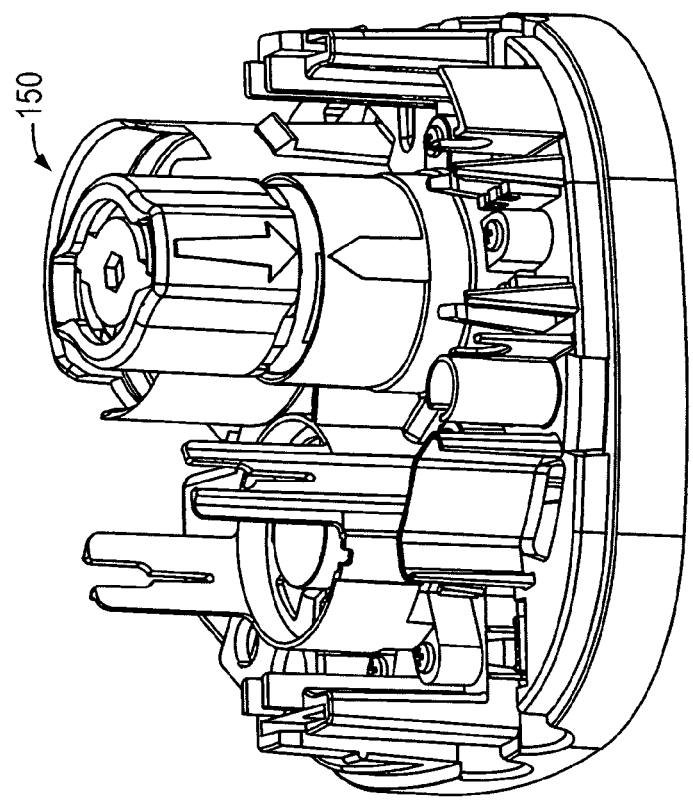
FIGS. 4C and 4D are perspective side views of the control system unit shown in FIG. 4 with the cover removed, showing turned actuator module.
Figure 4D:
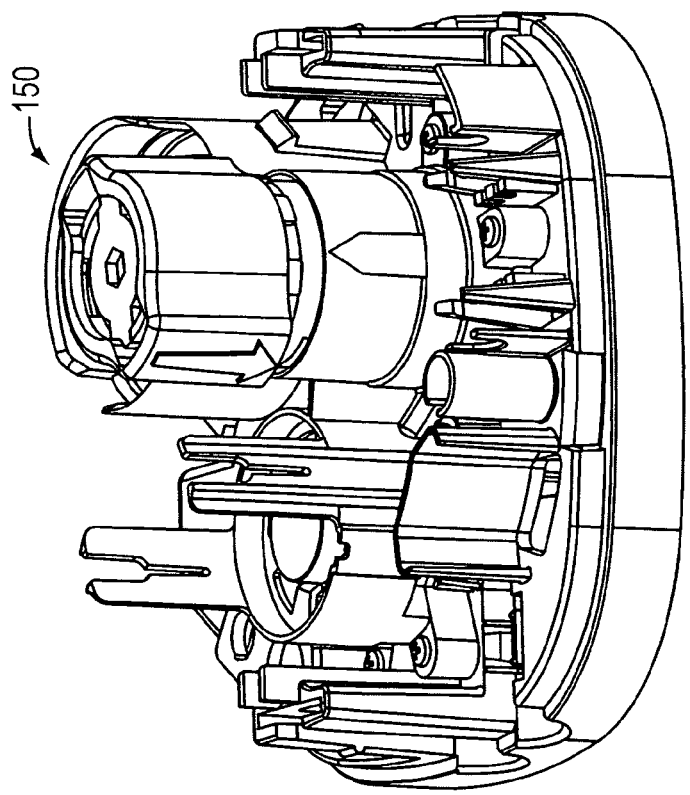
Figure 4E:
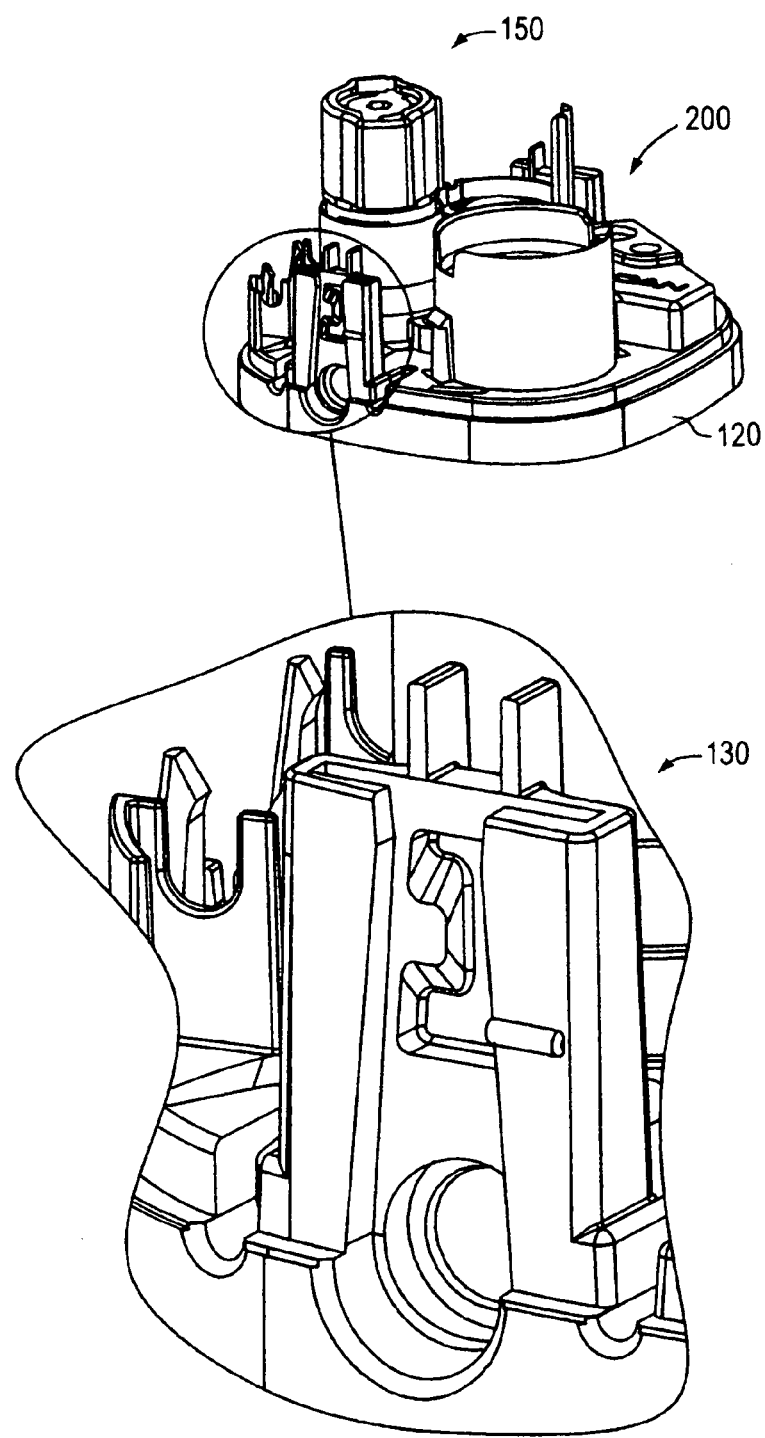
FIG. 4E illustrates a quick connect for a water conduit connecting to the control system unit of FIG. 4.
Figure 12:
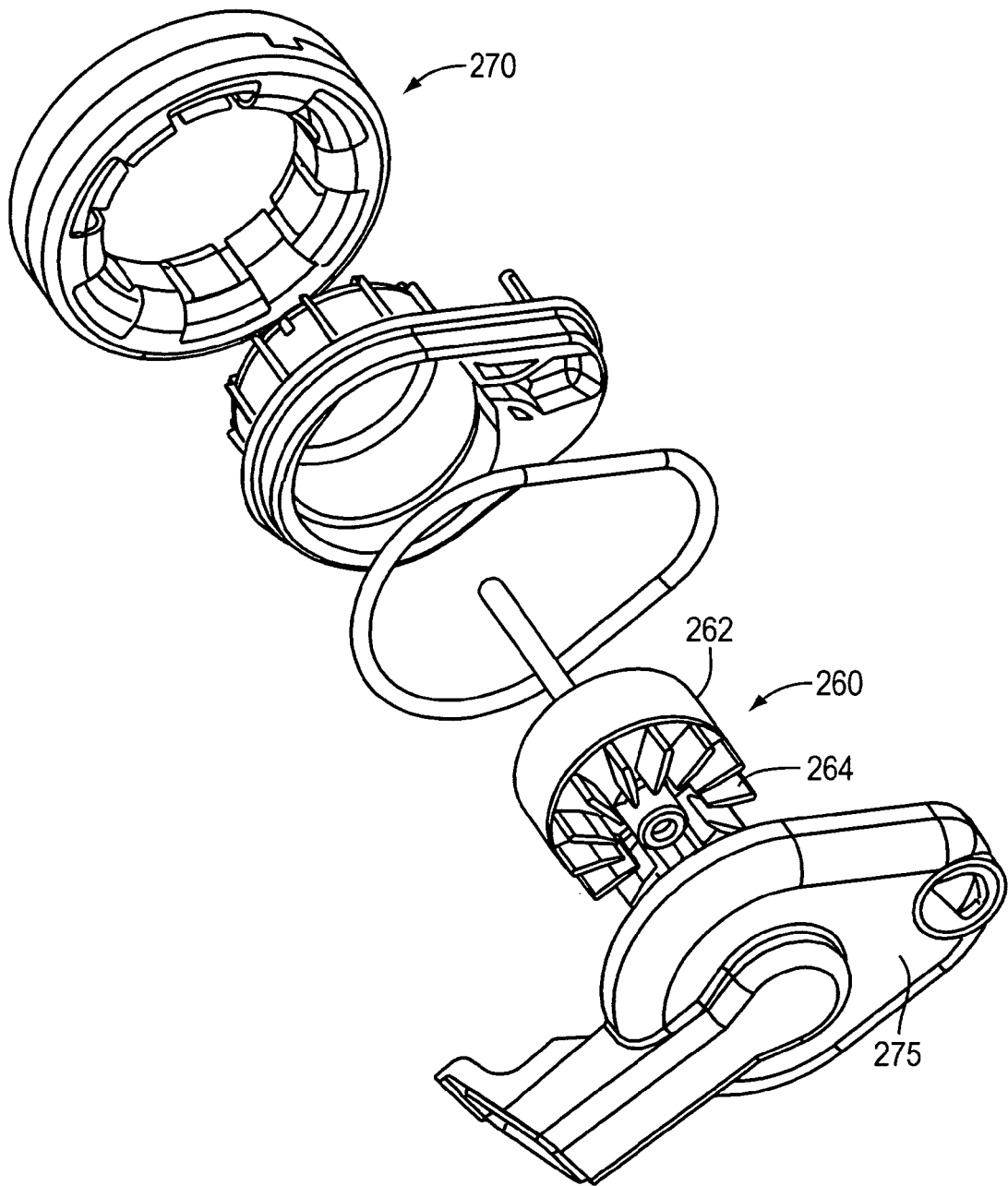

Referring to FIGS. 4A and 4B, turbine module 250 is also shown in FIGS. 12 through 12D as water turbine module 250A includes a rotor assembly 260 and a stator assembly 270 forming the Francis type turbine provided in the water path inside the control system unit. The rotor is fixed integrally with the rotary shaft turbine blades, and a magnet 262. The rotor magnet is opposed to a stator pole through the wall of a non-magnetic member. The stator assembly 270 includes stator coils 271. Each stator coil is provided to be interlinked with a magnetic flux passing through the stator poles 272 and 273. When, the water turbine rotates by receiving the water flow, the magnet rotates relatively with respect to the stator pole. The flow of the magnetic flux flowing to the rotor and the stator pole is changed. As a result, a current flows to the stator coil in such a direction as to prevent the change in the flow of the magnetic flux. After the current is rectified, it is stored, for example, in the rechargeable battery using the power management algorithm described below.

Figure 15:
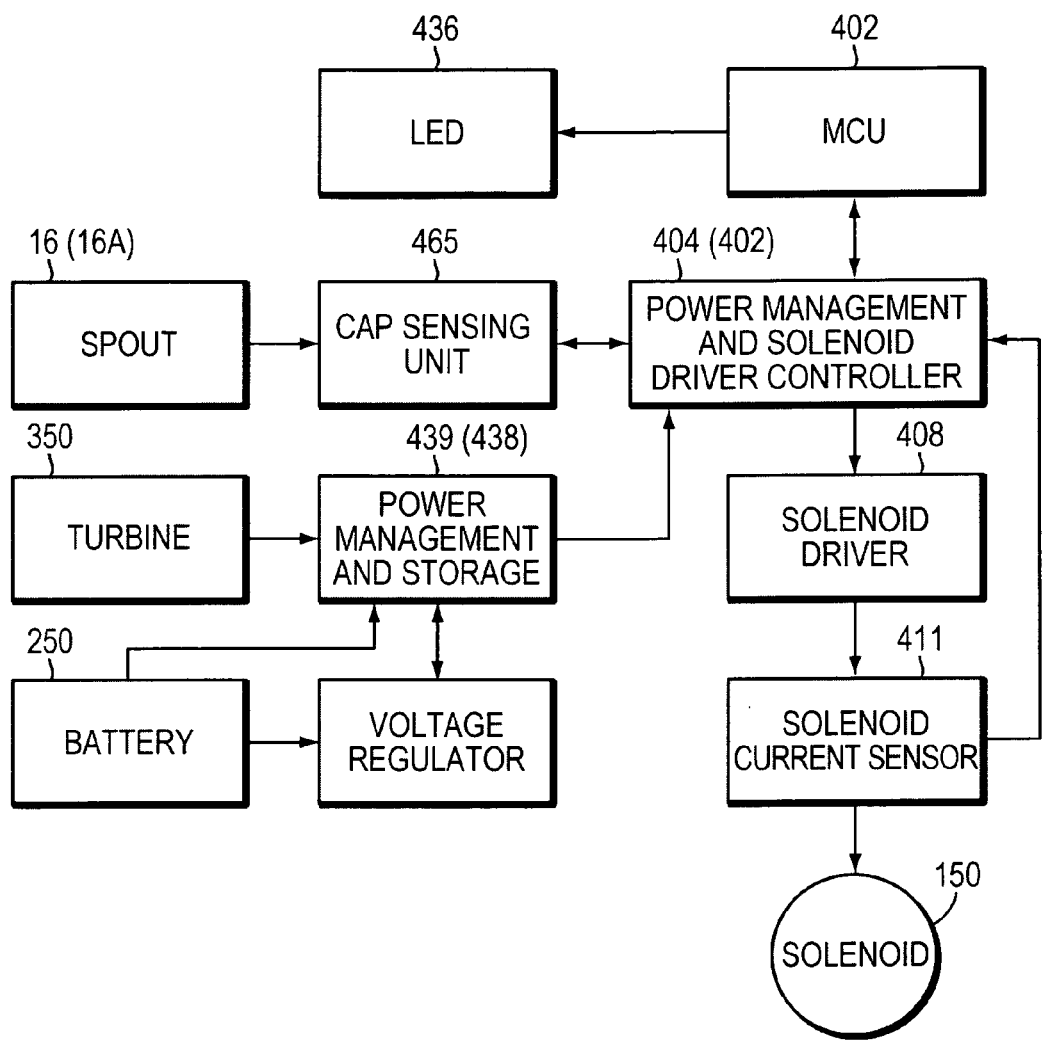
FIG. 15 is a block diagram of another embodiment of the faucet elements and control circuitry for controlling operation of the faucet shown in FIG. 1 or FIG. 9.
Figure 16A:
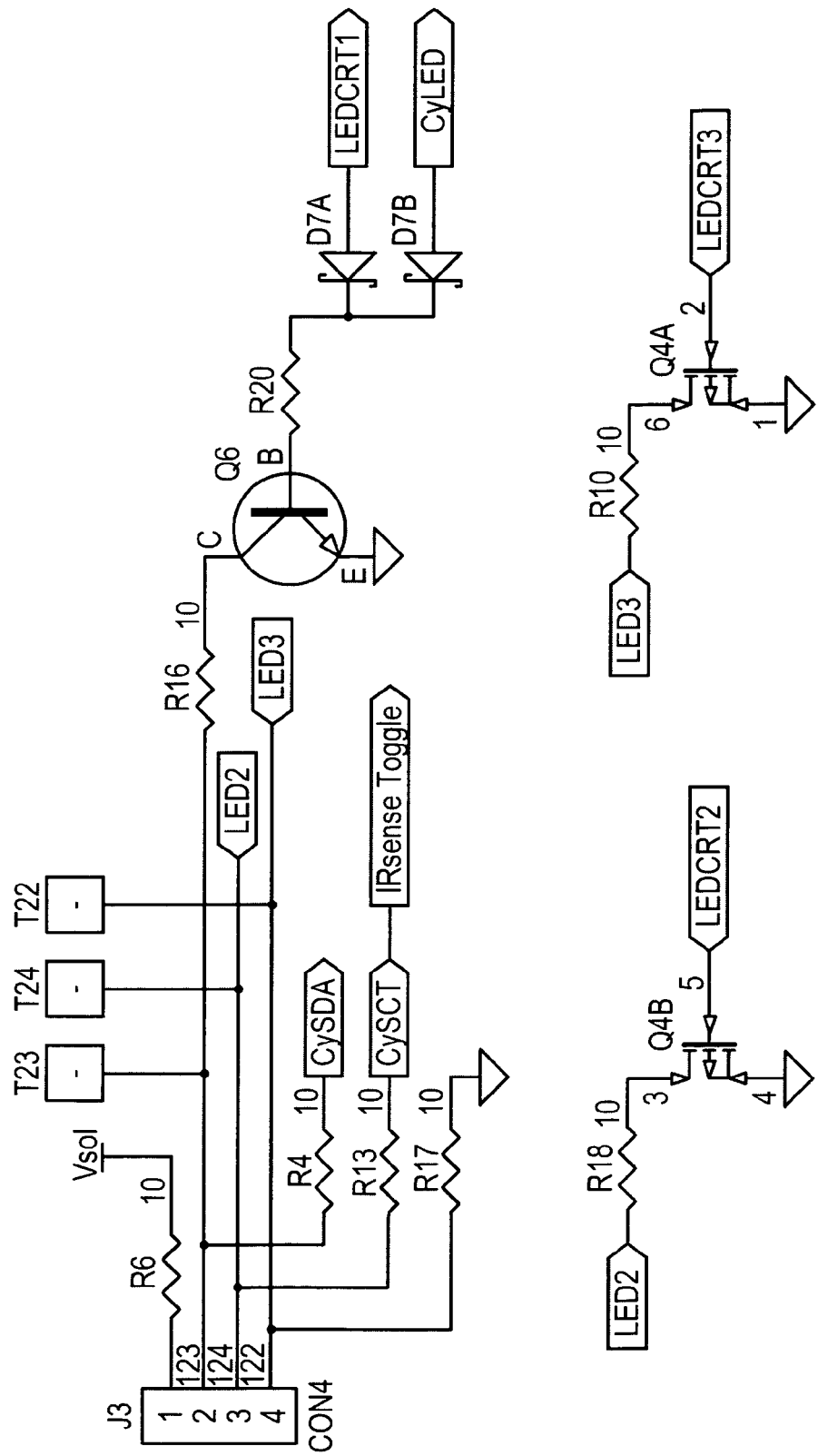
Figure 16D:
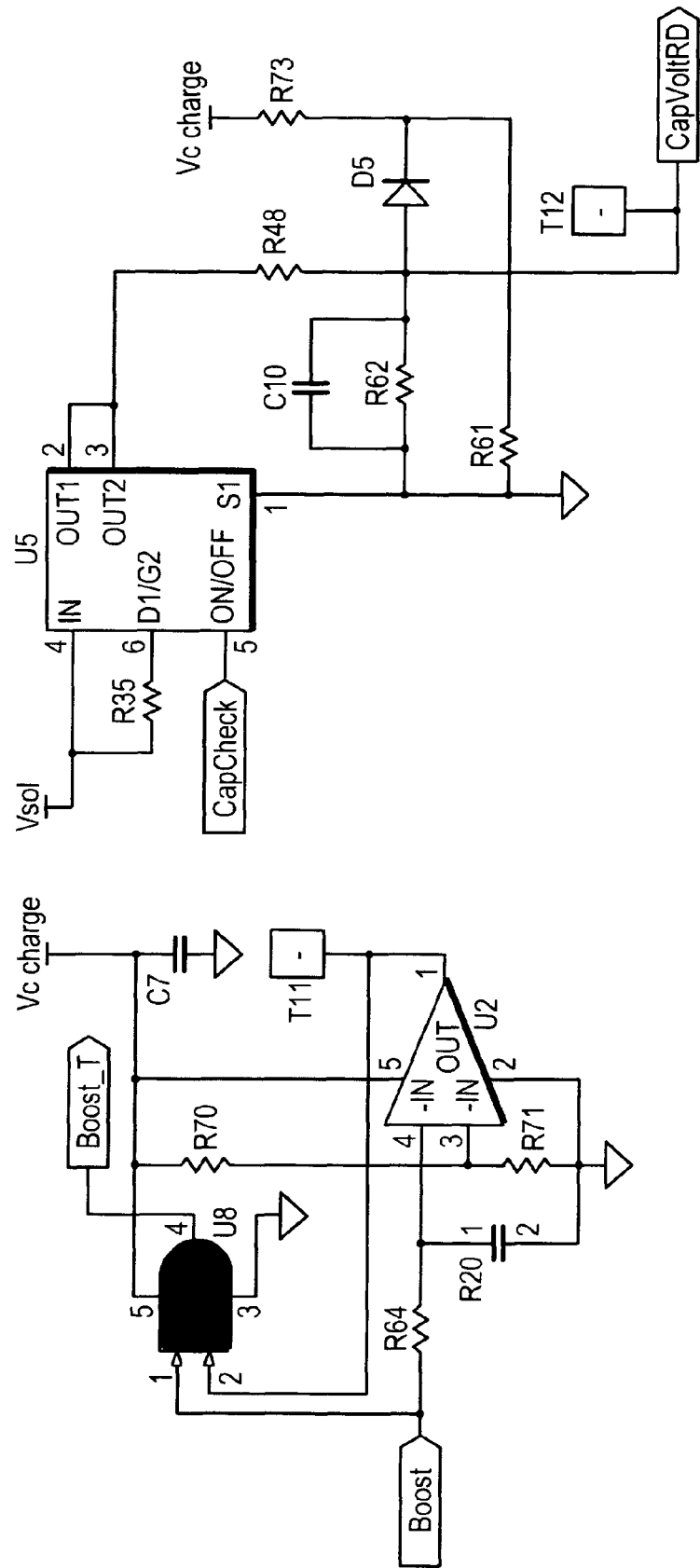
Figure 16E:
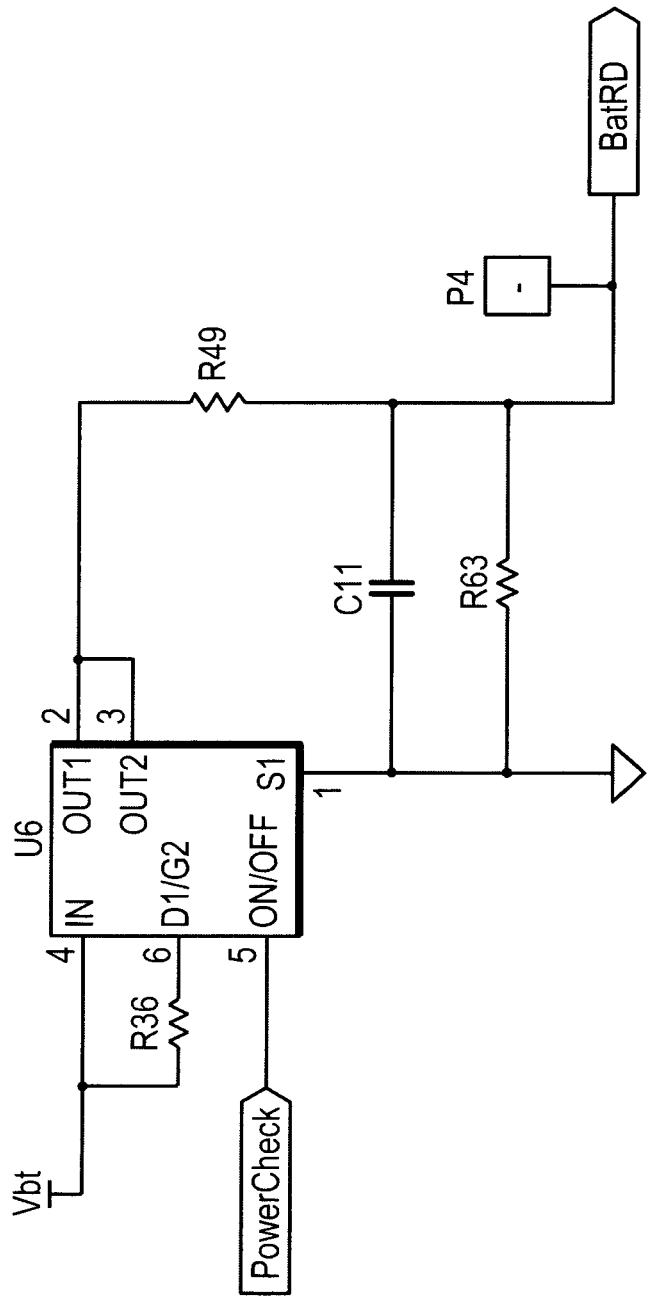
Figure 16F:
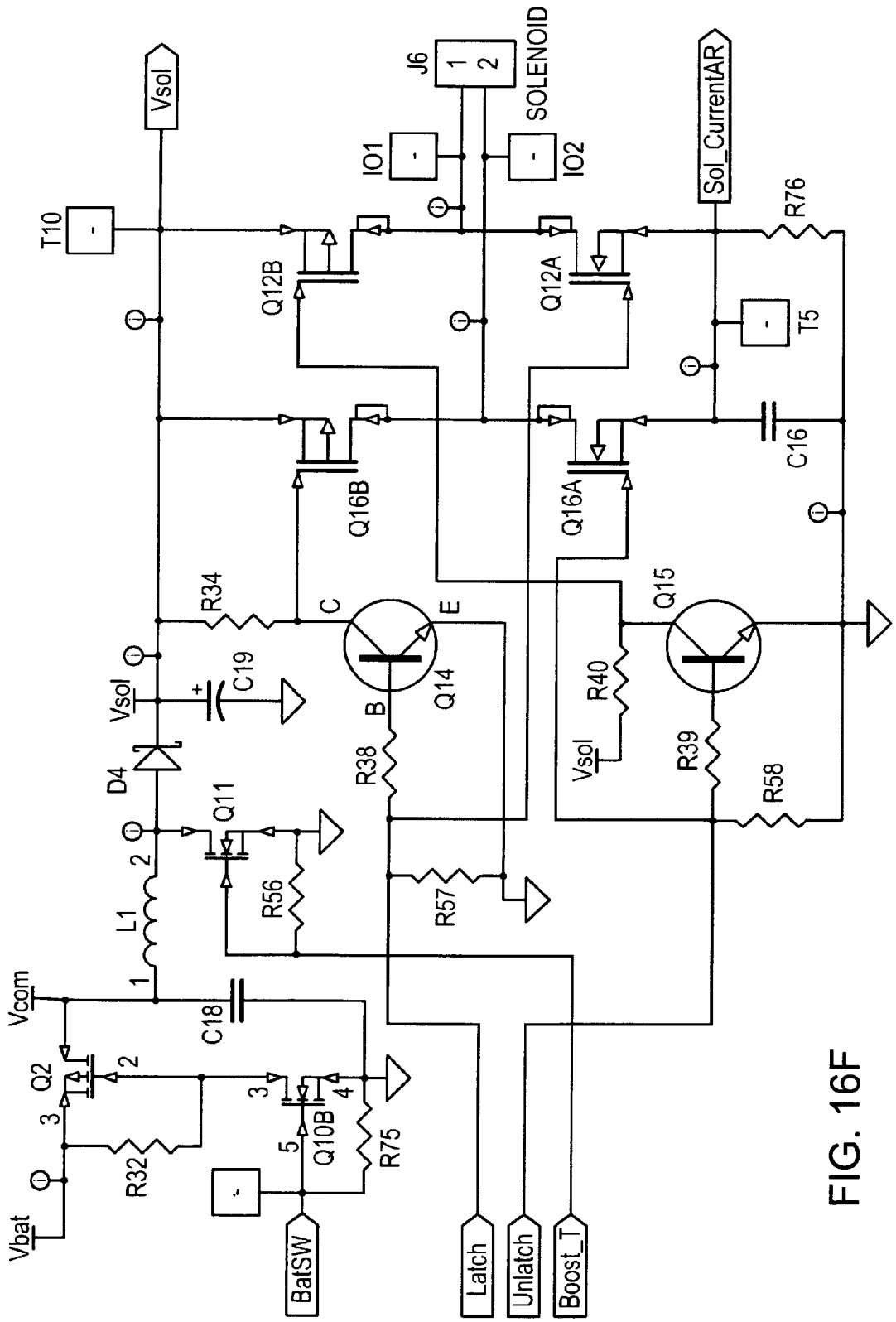
Figure 16G:
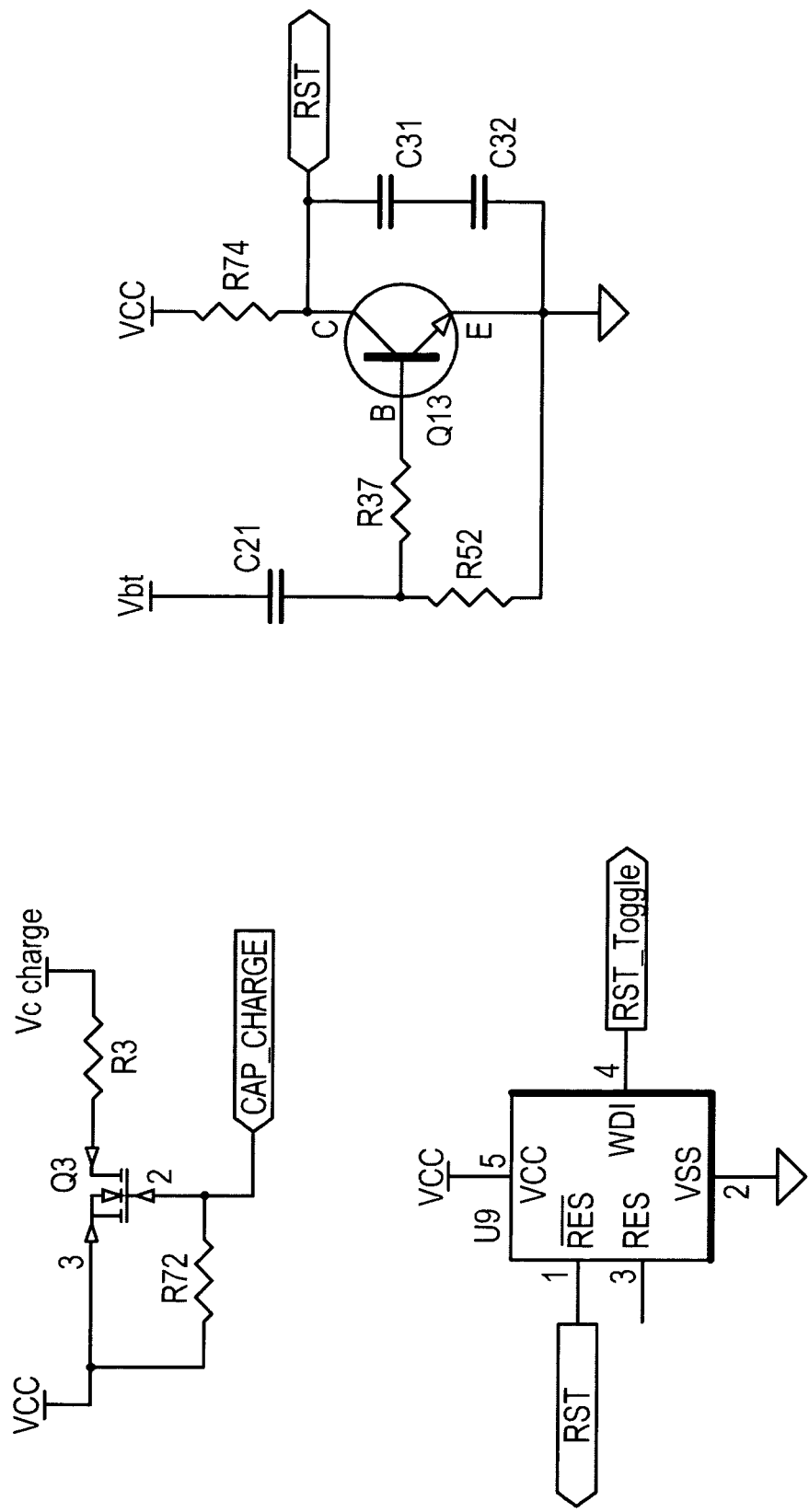

In the turbine module 250, the claw pole stator uses multi pole magnet as the generator and the rotor is rigidly attached to the impeller 264 and submerged in water on the rotation shaft. The magnet is slipped over the impellor in a novel arrangement and is secured with a plastic pin (FIG. 12C). The stator-rotor arrangement has preferably 12 poles (but can also have a smaller or a larger number of poles to optimize energy output). The generator is also used as a tachometer to measure effectively the flow rate thru the faucet. This arrangement also enables fault monitoring and detection of a clogged line or a clogged filter. The corresponding signal is provided to the microcontroller, as shown in FIGS. 14 and 15.

Referring still to FIGS. 12 through 12D, the Francis type turbine has a single fluid path designed to enable, for flow rates of over 0.7 GPM (gallons per minute) to 0.8 GPM, a larger cross sectional flow path to reduce the internal flow resistance (that is, a pressure loss). On the other hand, for low flow rates as low as 0.35 GPM, the turbine module uses a factory installed nozzle that boosts the power output of the generator. The nozzle is held in place by a small tab and groove molded to the nozzle of the manifolds shown in FIG. 12. This design requires relatively small amount of space.

The water turbine module 250 reduces power consumption and also allows for precise water metering by reading the AC signal frequency, which is proportional to the flow rate and also is optimized for different flow rates with the insertable flow nozzle. The insertable flow nozzle is integrated in the manifold.

As described above, the magnetic flux flows between the rotor and the stator pole in the generator. The magnetic flux acts as a resistance when the water turbine is to be rotated by the force of the flowing water. That is, a magnetic flux generated between the rotor and the stator pole acts as a detent torque to brake the operation of the water turbine during the starting and rotation of the water turbine. The turbine of the present invention is designed to start and detect a small amount of water flow.

The turbine module may be replaced by another rechargeable power source module, such as one or several photovoltaic cells. The photovoltaic cells may be installed at the top of the crown assembly.

Figure 9:
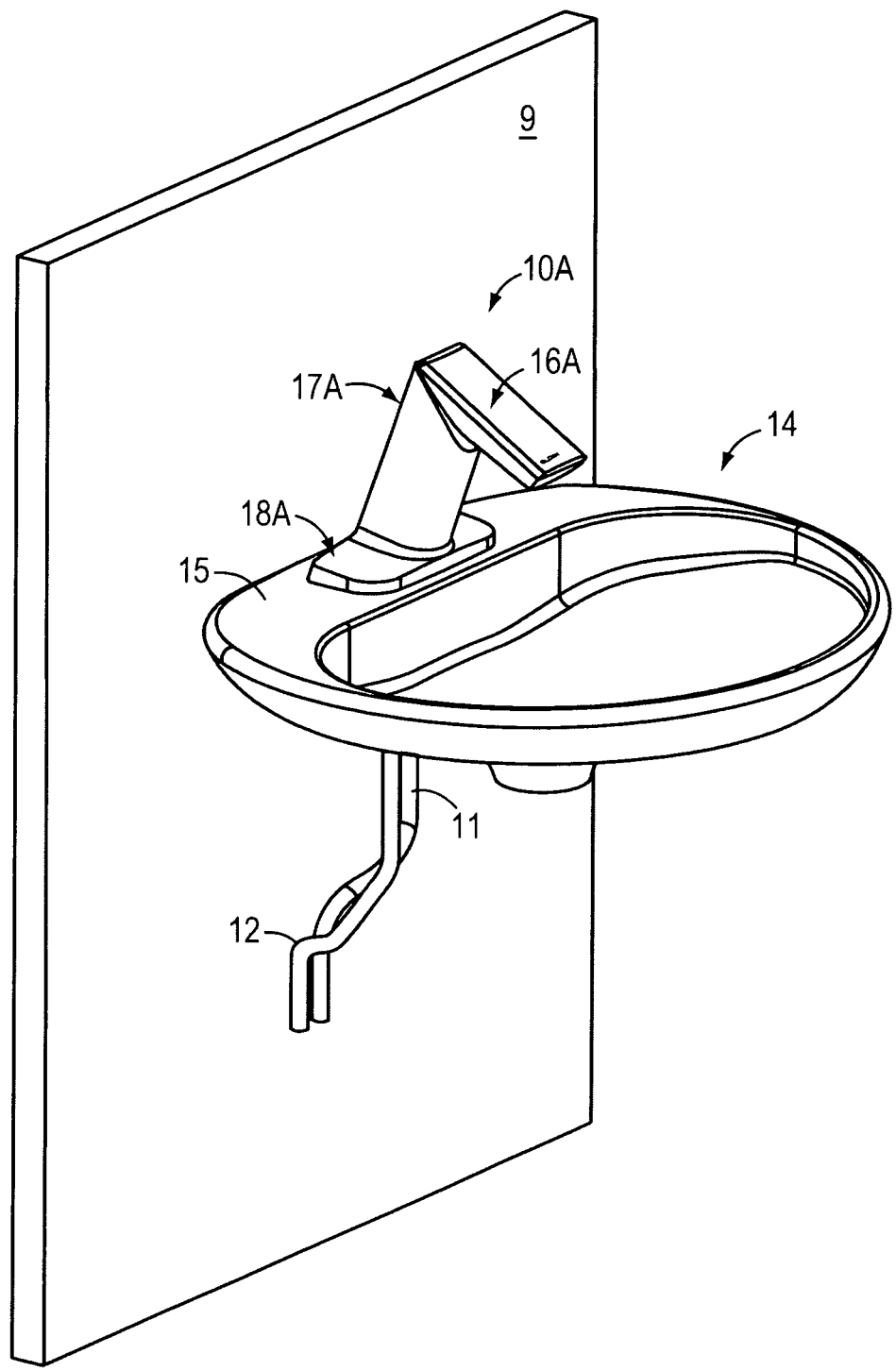
FIG. 9 is a front perspective view showing another embodiment of a faucet installed on a sink with a control system unit located inside the faucet body.
Figures 9A, 9B:
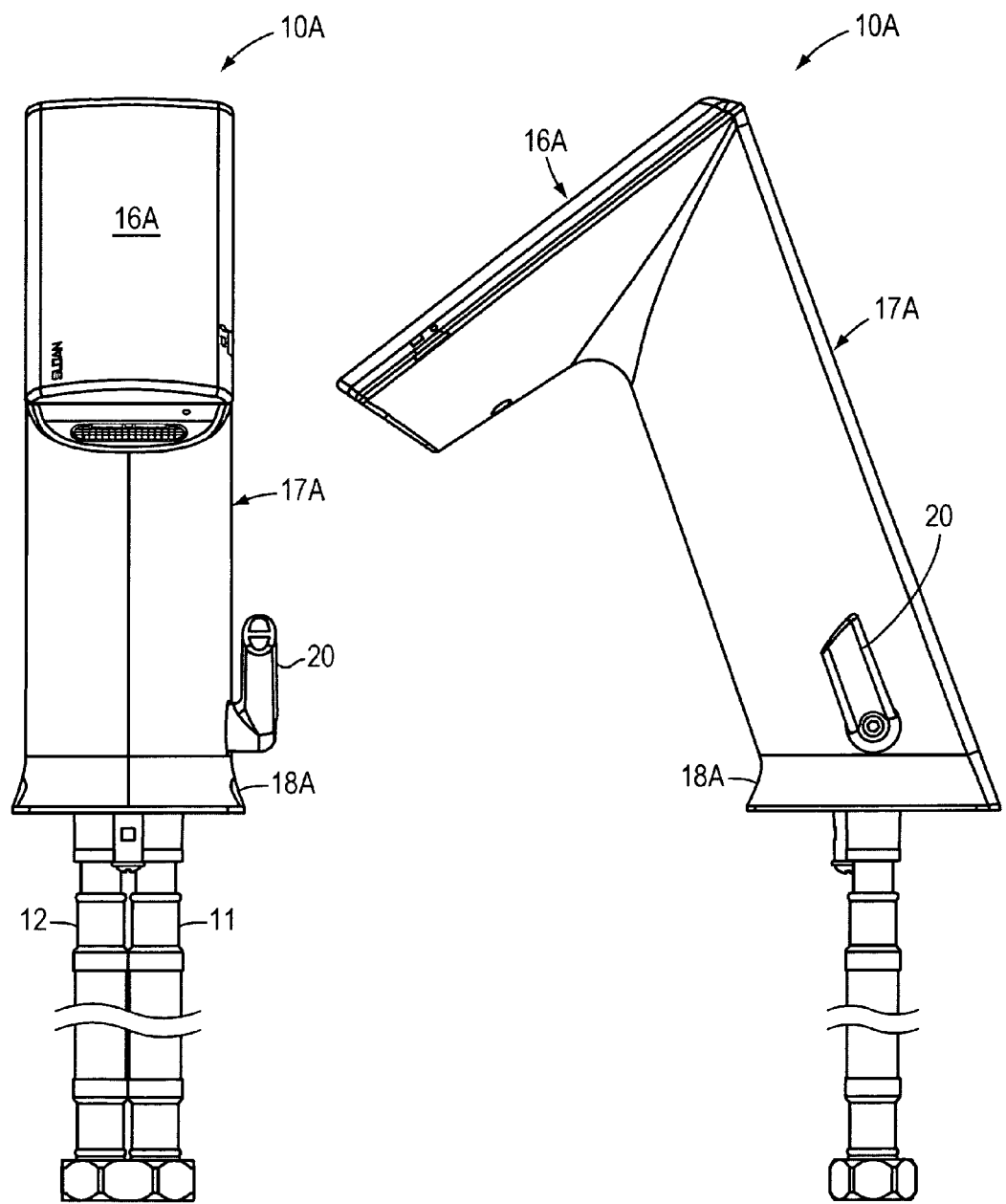
FIGS. 9A and 9B are a front view and a side view of the faucet shown in FIG. 9, respectively.

FIG. 9 is a front perspective view showing another embodiment of a faucet installed on a sink with a control system unit located inside the faucet body. FIGS. 9A and 9B are a front view and a side view of the faucet shown in FIG. 9, respectively.

FIG. 10 is a cross-sectional side view of the faucet shown in FIG. 9.

FIG. 10A is a cross-sectional, detailed side view of the faucet head of the faucet shown in FIG. 10.

Figure 10B:
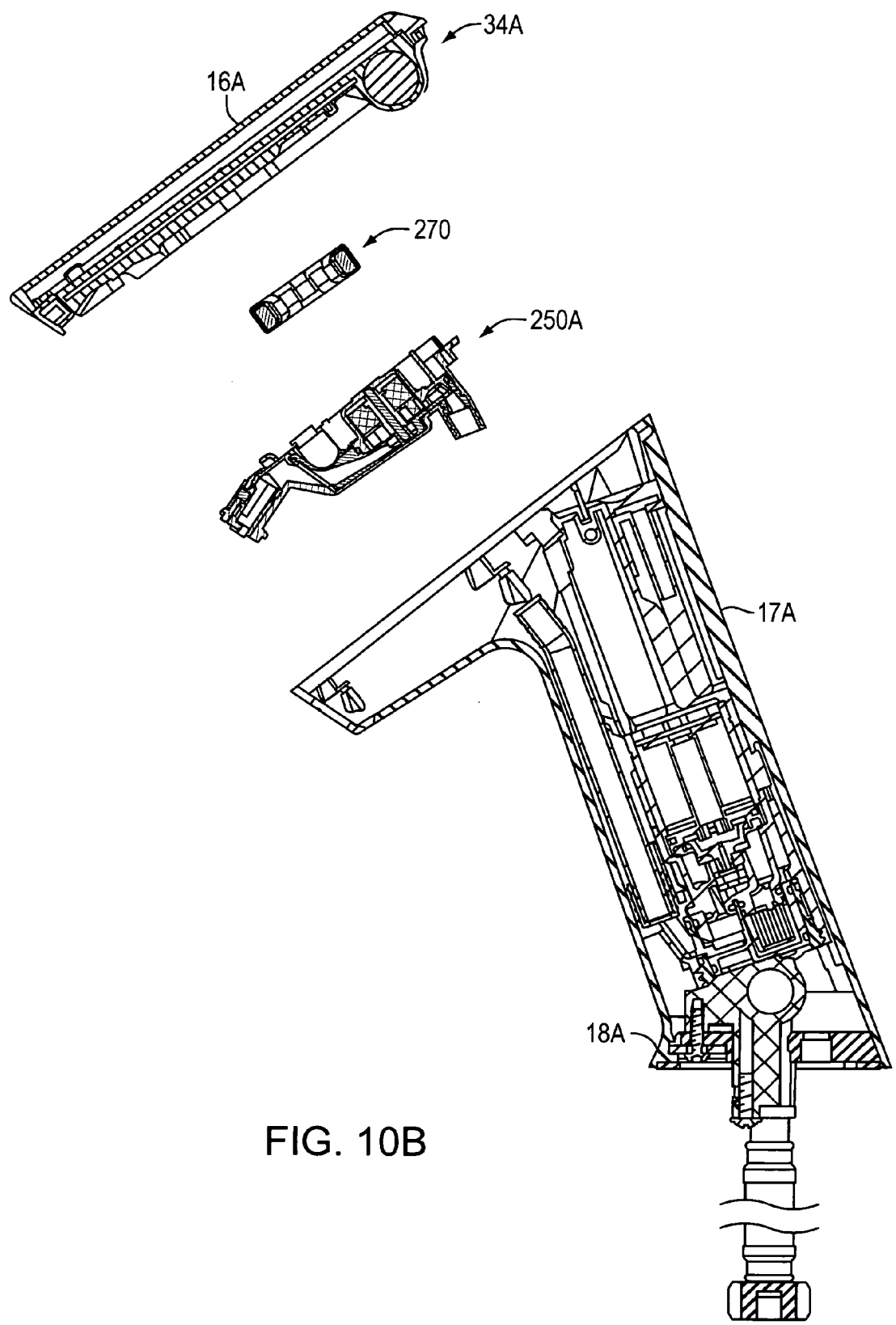
FIG. 10B is a cross-sectional side view of the faucet shown in FIG. 10 showing the faucet head in an exploded view for better illustration.

FIG. 10B is a cross-sectional side view of the faucet shown in FIG. 10 showing the faucet head in an exploded view for better illustration.

Figure 11:
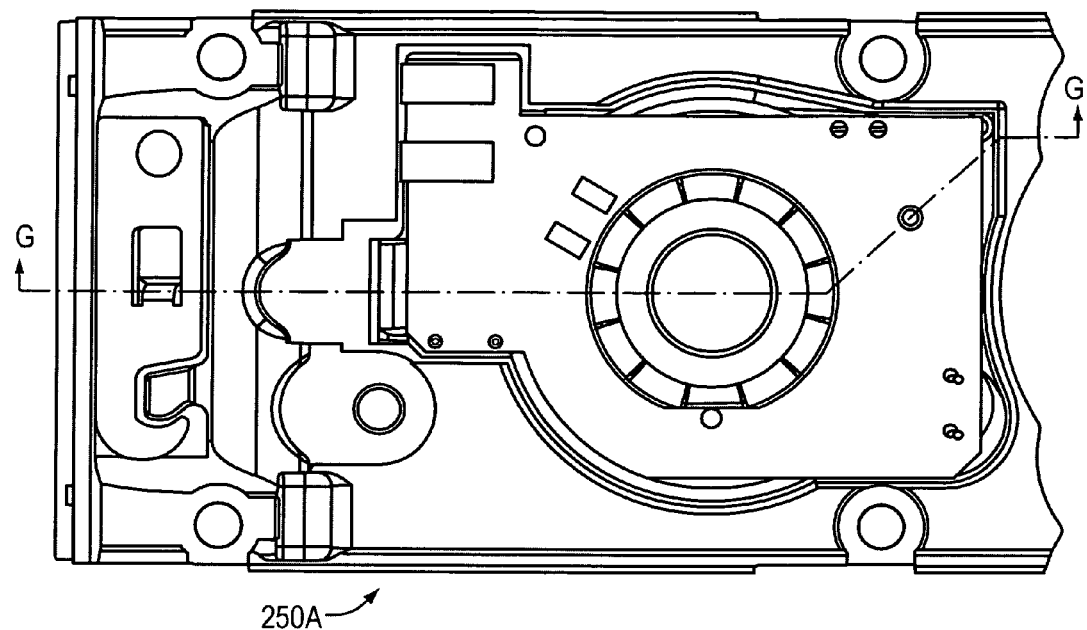
FIGS. 11 and 11A are top and cross-sectional views of a turbine module located in the faucet head shown in FIGS. 10A and 10B.
Figure 11A:
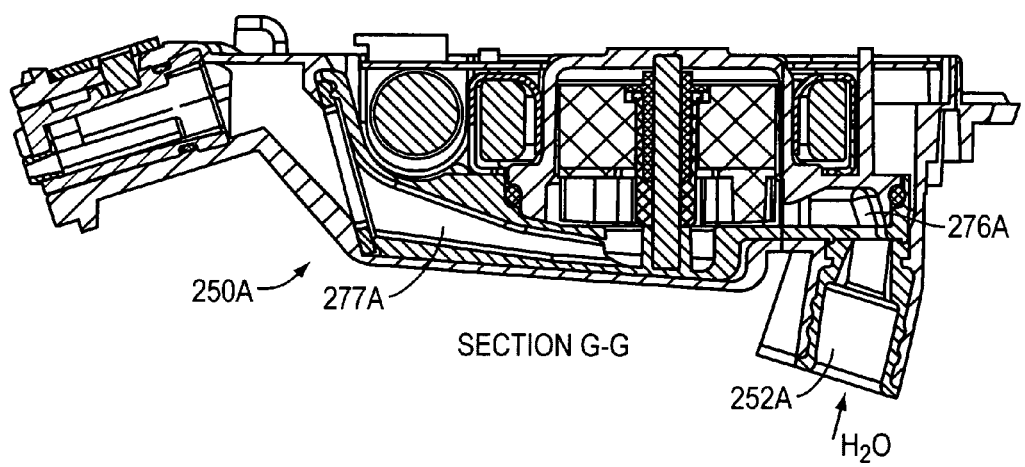

FIGS. 11 and 11A are top and cross-sectional views of a turbine module located in the faucet head shown in FIGS. 10A and 10B.

Figure 11B:
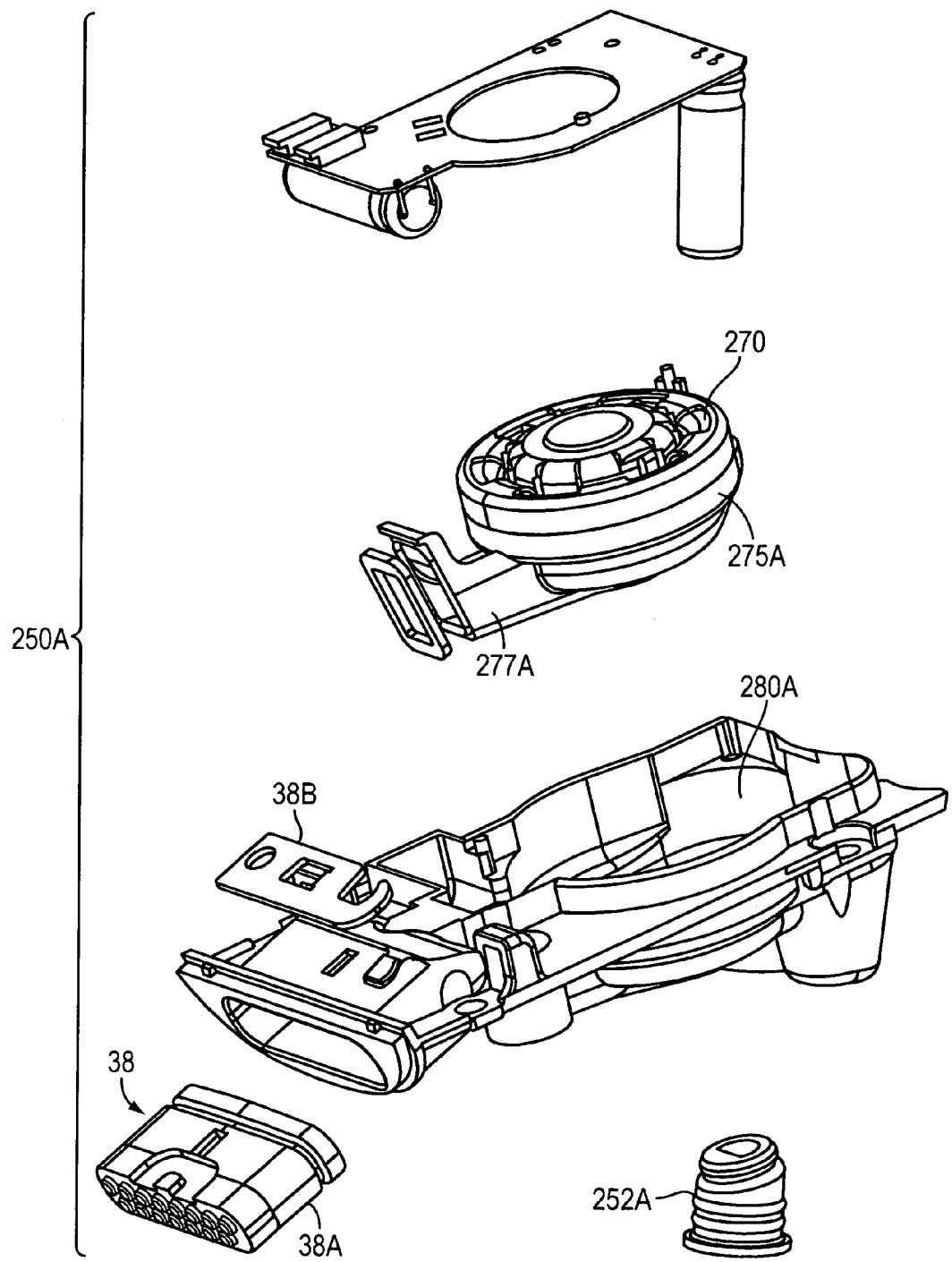
FIG. 11B is a perspective exploded view of the elements located inside the faucet head including the turbine module, the circuit board module and the aerator.
Figure 13:
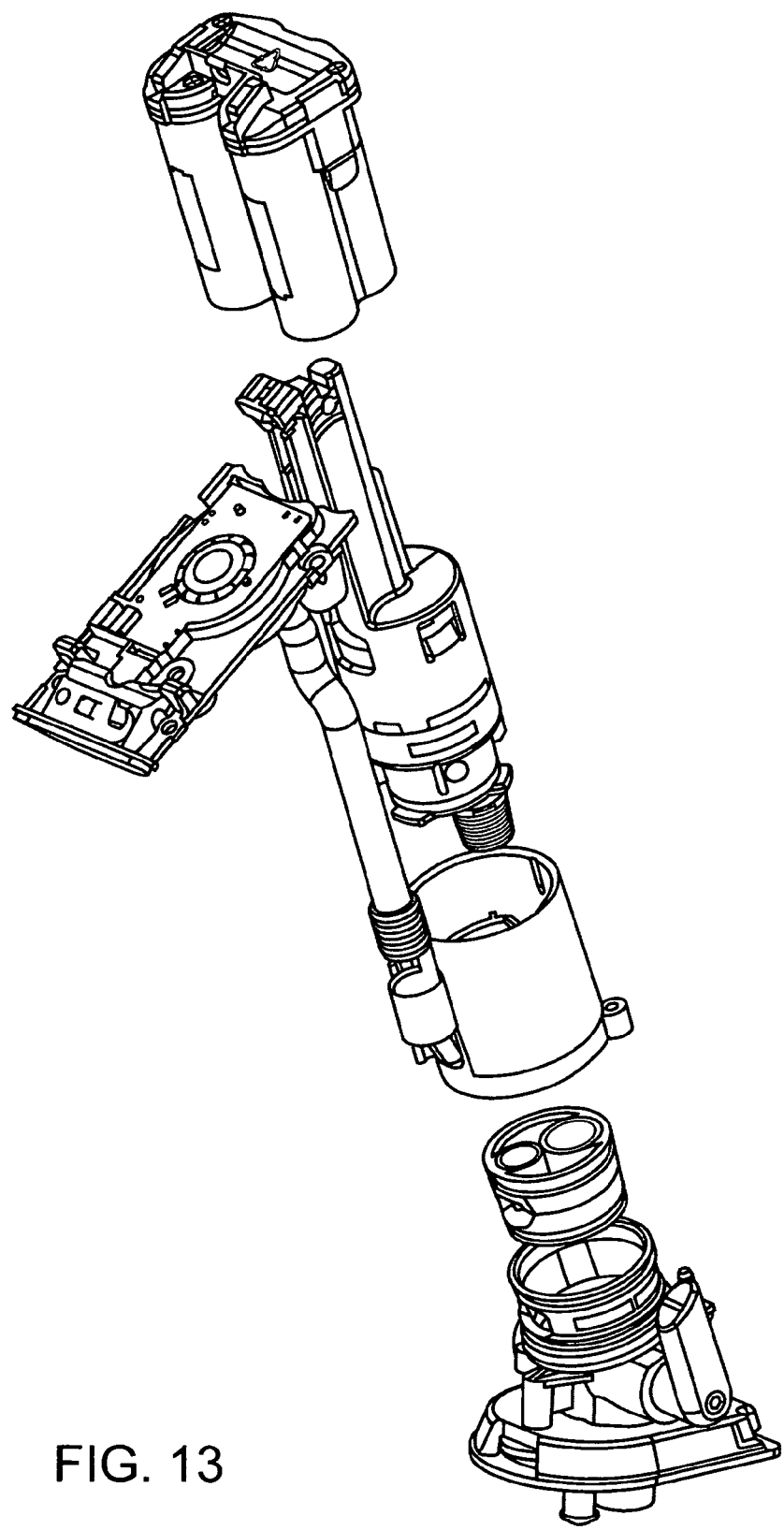
FIG. 13 shows an exploded perspective view of the control manifold located inside the faucet shown in FIG. 10, having the faucet enclosure removed.
Figure 13B:
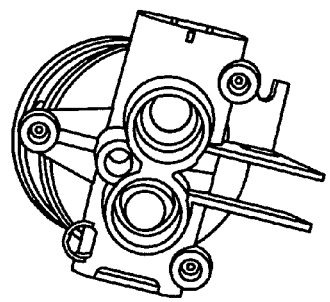
FIGS. 13A, 13B, 13C, 13D and 13E show mixing valve in detail.
Figure 13E:
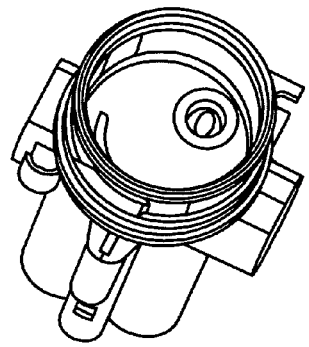
Figure 13A:
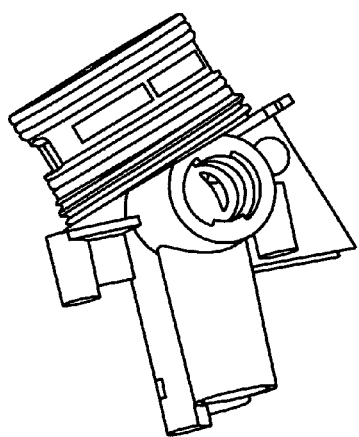
Figure 13C:
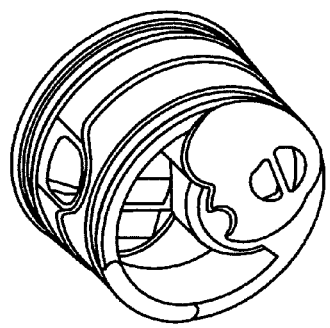
Figure 13D:
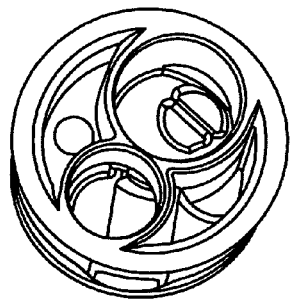

FIG. 11B is a perspective exploded view of the elements located inside the faucet head including the turbine module, the circuit board module and the aerator. FIGS. 12, 12A, 12B, 12C and 12D show several views of the turbine including water flow surfaces all located inside the turbine module FIG. 13 shows an exploded perspective view of the control manifold located inside the faucet shown in FIG. 10, having the faucet enclosure removed. The faucet includes a valve module including actuator module 150, housing 155, lower valve module 165 and upper valve module 170, shown in FIGS. 13A through 13D. The faucet also includes a mixing valve 140, a battery module 250, a turbine module 350.

FIG. 14 is a block diagram of a control electronics 400 for controlling operation of faucet 10. The control electronics preferably uses a capacitance sensor 50, or alternatively an active IR sensor or a passive IR sensor. The active IR sensor includes an IR transmitter 420 for emitting an IR beam and an IR receiver 424 for detecting the reflected IR light. The passive IR sensor uses passive optical detector for detecting presence of a user as described as described in PCT Applications PCT/US03/38730 and PCT/US03/41303, both of which are incorporated by reference.

Referring to FIG. 14, control electronics 400 includes a controller 402 powered by a battery 200. Controller 402 is preferably a microcontroller MC9S08GT16A made by Freescale®. The microcontroller executes various detection and processing algorithms, which are preferably downloaded. However, the controller and algorithms may also be implemented in the form of dedicated logic circuitry, ASIC, or other. The control electronics 400 includes a power switch 405, a DC-DC converter 406, a solenoid driver 408. Solenoid driver 408 provides a drive signal to a solenoid 150 monitored by a solenoid feedback amplifier 412, and a signal conditioner 414. Controller 402 communicates with an indicator driver 434 for driving a visible diode 436 (e.g., a blue diode or a red diode also shown in FIG. 3C) for communications with the user.

As shown in FIG. 14, the active optical sensor includes an IR diode driver 422 providing power to an IR transmitter 420, and an IR sensor amplifier 426 receiving a signal from an IR receiver 424. The entire operation is controlled by controller 402.

The IR diode driver 422 may be designed to progressively increase and decrease the optical power output according to target and environment conditions. The same applies to the IR receiver using IR sensor amplifier 426. Usually only one of the modes is used both since one is enough to achieve the purpose. The following are examples of the conditions: If the environment is too IR bright, the system boosts the optical emission signal. If the target is too close, such as in the closet, the system reduces the IR signal to save power. If the target is not sufficiently IR reflective, the system boosts the IR signal either from the IR transmitter 520 or using IR sensor amplifier 526.

The system 402 uses an optional voice synthesizer 440 connected to a speaker 442 for providing a user interface. An optional flow sensor conditioner 444 connected to a flow sensor 446 is used for detecting water flow through the faucet. Alternatively, a sensor may be used to detect overflow of water in the sink and provide signal to controller 402 for shutting down the automatic faucet.

The system may include an optional RF transceiver 450 connected to an antenna 452 for wireless communication with a remotely located central controller or network. The present design may be deployed with a network of wirelessly connected bathroom faucets and sanitary appliances. The remotely located network enables monitoring and gathering of information concerning the faucets and appliances. The communication between the faucets and appliances uses preferably low frequency RF signals, and the communication to the remotely located network node uses preferably a high frequency RF signals.

In general, wired or wireless data communication is used for transmitting information as it relates to the well being of the bathroom faucets and sanitary appliances. The transmitted information (together with the ID of the device) may include the battery voltage, number of flushes, the unit is on run-on condition (cannot turn off), no water condition (cannot turn on), etc. Using an RF transceiver 450 and antenna 452, the system can receive information such as command remotely initiated from somewhere else. The fixtures may talk to each other in a networked fashion. The fixtures may talk to a proximal central unit and this unit may transmit data (wired or wireless) to a wider network such as internet. In a preferred embodiment, the user initiates a location wide diagnostic mission by requesting each fixture to turn on and then off. In turn, each fixture reports successful/unsuccessful operation. The fixture may also report other variables such as battery voltage, number of flushes, etc. The user then gathers the information and schedules a maintenance routing according to results. This is particularly useful in establishments such as convention centers, etc. where the maintenance personnel currently send crews to monitor the well being of the fixtures and take notes manually prior to an event.

Another embodiment of the control electronics is described in PCT Publications WO2005/056938 and WO2004/061343, both of which are incorporated by reference.

According to another embodiment, the control electronics includes a microcontroller that is an 8-bit CMOS microcontroller TMP86P807M made by Toshiba. The microcontroller has a program memory of 8 Kbytes and a data memory of 256 bytes. Programming is done using a Toshiba adapter socket with a general-purpose PROM programmer. The microcontroller operates at 3 frequencies (fc=16 MHz, fc=8 MHz and fs=332.768 kHz), wherein the first two clock frequencies are used in a normal mode and the third frequency is used in a low power mode (i.e., a sleep mode). The microcontroller operates in the sleep mode between various actuations. To save battery power, microcontroller periodically samples optical sensor unit for an input signal, and then triggers power consumption controller. Power consumption controller powers up signal conditioner and other elements. Otherwise, the optical sensor unit, the voltage regulator (or the voltage boost) and the signal conditioner are not powered to save battery power. During operation, the microcontroller also provides indication data to an indicator, e.g., a visible diode or a speaker. Control electronics may receive a signal from the passive optical sensor or the active optical sensor described above. A Low battery detection unit may be the low battery detector model no. TC54VN4202EMB, available from Microchip Technology. The voltage regulator may be the voltage regulator part no. TC55RP3502EMB, also available from Microchip Technology (http://www.microchip.com). Microcontroller may alternatively be a microcontroller part no. MCU COP8SAB728M9, available from National Semiconductor.

The faucet may include one or several photovoltaic cells (435) alone or in combination with the water turbine 250 for producing voltage that is proportional to the amount of light that it receives. When system 400 powers up and starts operation, the system registers this voltage and continuously monitors the voltage thereafter. At first time power up, if there is no voltage from the photovoltaic cell, this means dark environment and therefore the unit marks the time and count for a predetermined amount of time. If the time is long enough, such as hours and days, and there is no target detected within the same period of time then the faucet system is powered up but nobody is using the bathroom (i.e., the lights are turned off) and therefore the system goes into a power saving mode. In this mode, the system scans for target at a much slower frequency to conserve battery power. The system may also shut down or slow down other functions such as scanning the override buttons, battery voltage, etc. The use of the photovoltaic cells is described in the PCT Application PCT/US2008/008242, filed on Jul. 3, 2008, which is incorporated by reference.

FIG. 15 is a block diagram of another embodiment of the control circuitry for controlling operation of the faucet shown in FIG. 1.

FIGS. 16A-16G are circuit diagrams of the control circuitry shown in the block diagram in FIG. 15.

Figure 17:
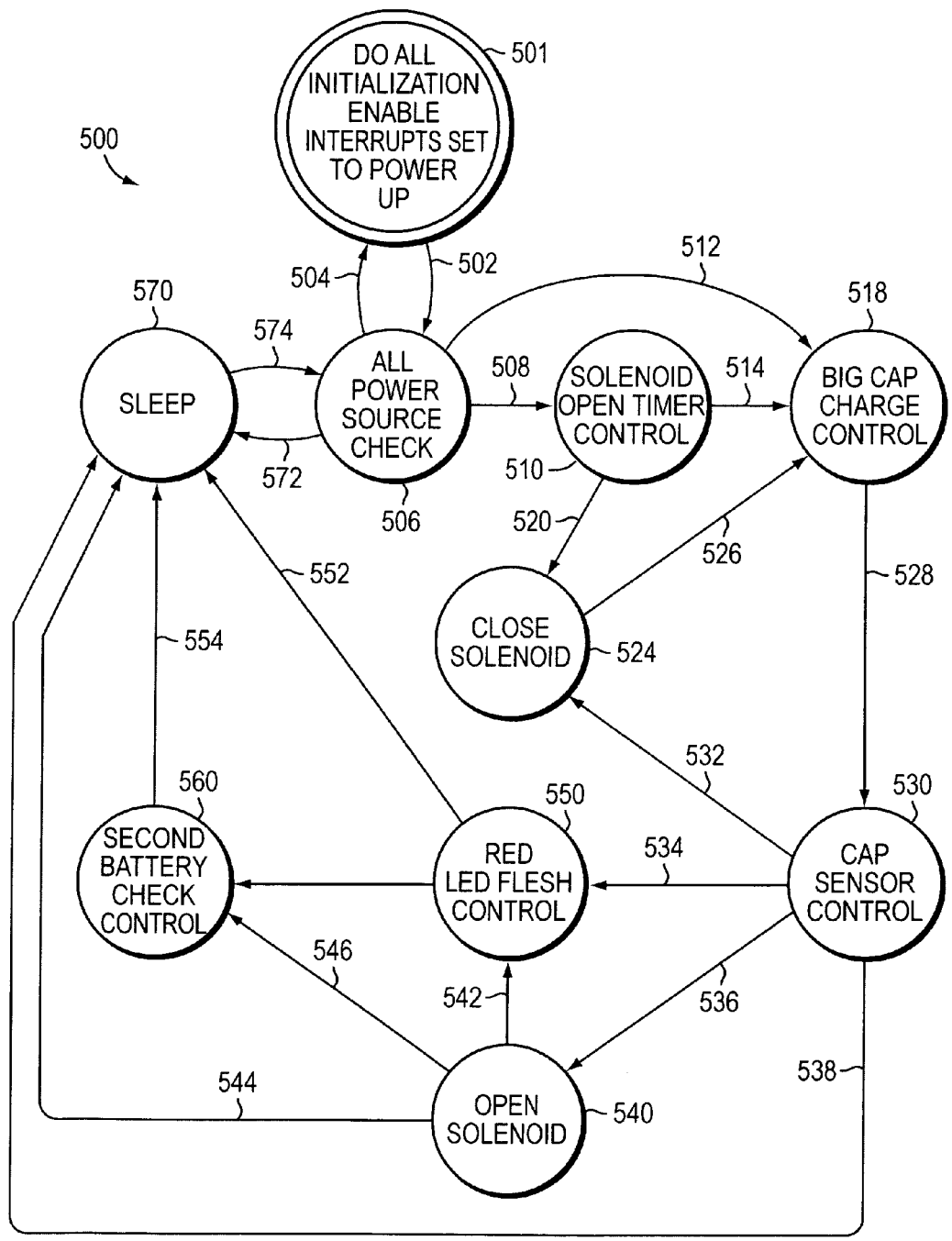
FIG. 17 illustrates the main operation and control of the faucet shown in FIG. 1 or FIG. 9.

FIG. 17 the faucet operation using a state diagram 500. The processor executes the algorithm by first performing all initialization, enabling the interrupts set to power up (state 501). Next, the power for all sources is checked in the "All Power Source Check" state (state 506). If there is a battery ND error or the microcontroller is running out of external power the algorithm enters again state 501 (transition 504). Otherwise, for normal power level and if there is no solenoid activation, the algorithm enters (by transition 512) the "Big Capacitor Charge Control" (state 518).

In state 506, if there is normal power level and if there is solenoid activation, the algorithm enters (508) "Solenoid Open Timer Control" (state 510). After the target is no longer detected or after a pre-selected time period (520) the algorithm enters the "Close Solenoid" state (state 524). Thereafter, the algorithm transitions (over transition 526) to "Big Capacitor Charge Control" (state 518). From "Big Capacitor Charge Control" (state 518) the algorithm transitions (over transition 528) to "Capacitor Sensor Control" (state 530).

In "Capacitor Sensor Control" (state 530) the system executes target detection and when the target is not detected and solenoid activated, the system transitions (transition 534) to "Red LED Flash Control" (state 550). Alternatively, when the target is detected (FIGS. 22 and 22A), the system transitions (transition 536) to the "Open Solenoid" state (state 540), where the solenoid is opened. Alternatively, when the target is out of detection zone when solenoid is opened, the system transitions (transition 532) back to the "Close Solenoid" state (state 524), where the solenoid is closed. Otherwise, when there is no sensing activity, and there is no LED Flash and second battery check needed, the system transitions from state 530 (over transition 538) to the "Sleep" state (state 570).

From the Red LED Flash Control state (state 550), the system transitions (transition 552) to the Sleep state (state 570) after there is LED Flash and second battery check is needed. However, if the flag is set to the second battery check, the system transitions (transition 556) to the Second Battery Check Control state (state 560). Also, after the Open Solenoid state (state 540) is there is second battery check required the system transitions (transition 546) to the Second Battery Check Control state (state 560), and then after the battery checking is completed, the system transitions (transition 554) to the Sleep state (state 570).

Upon each wakeup, the system transitions (transition 574) from the Sleep state (state 570) to the All Power Source Check state (state 506). If there is no turbine power, or no battery power (or low battery power for 10 min less than 3.7 V), or no solar power, the system transitions (transition 572) back to the Sleep state (state 570).

Figure 18:
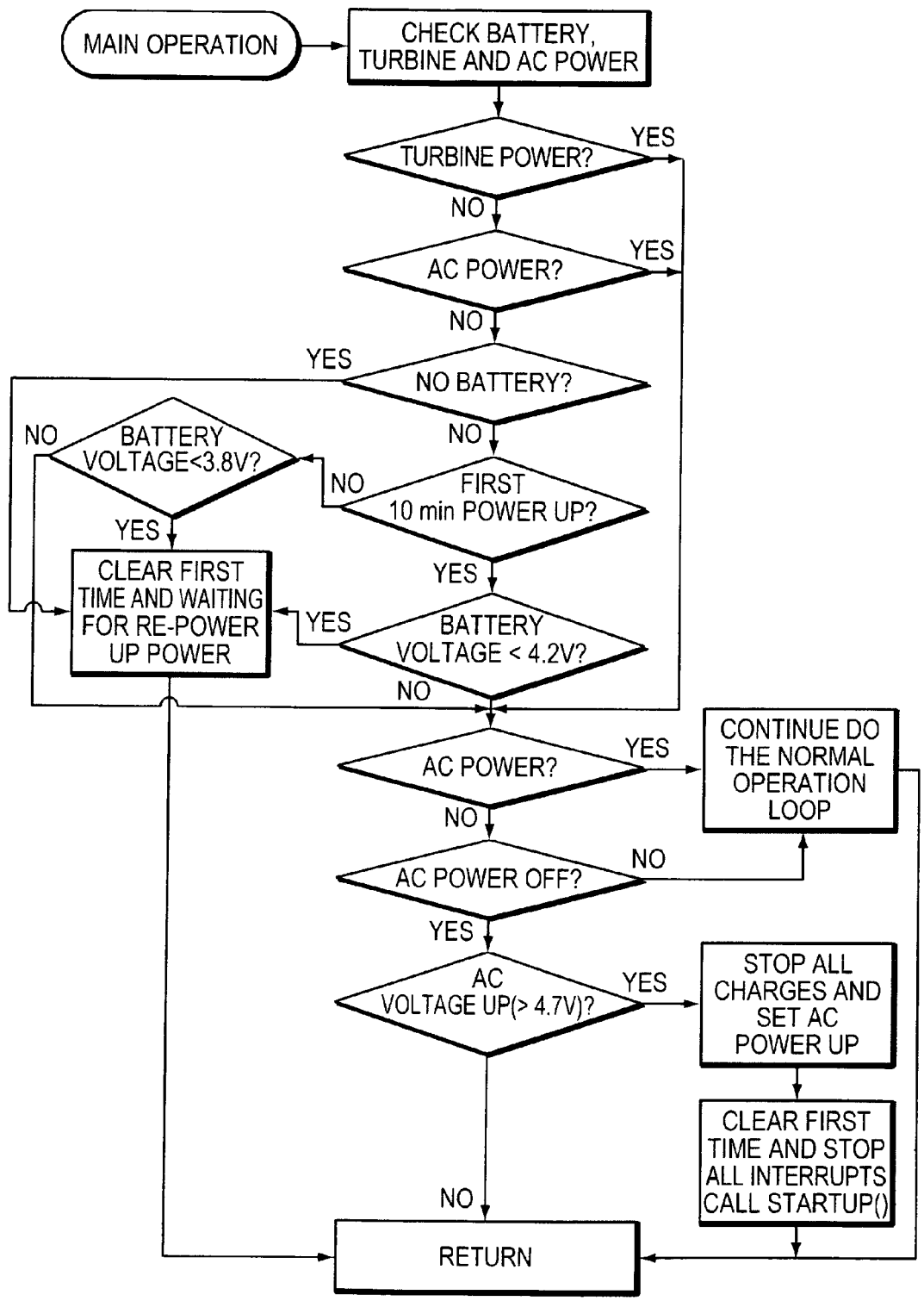
FIG. 18 is a flow chart that illustrates power management for the turbine module executed.
Figure 19:
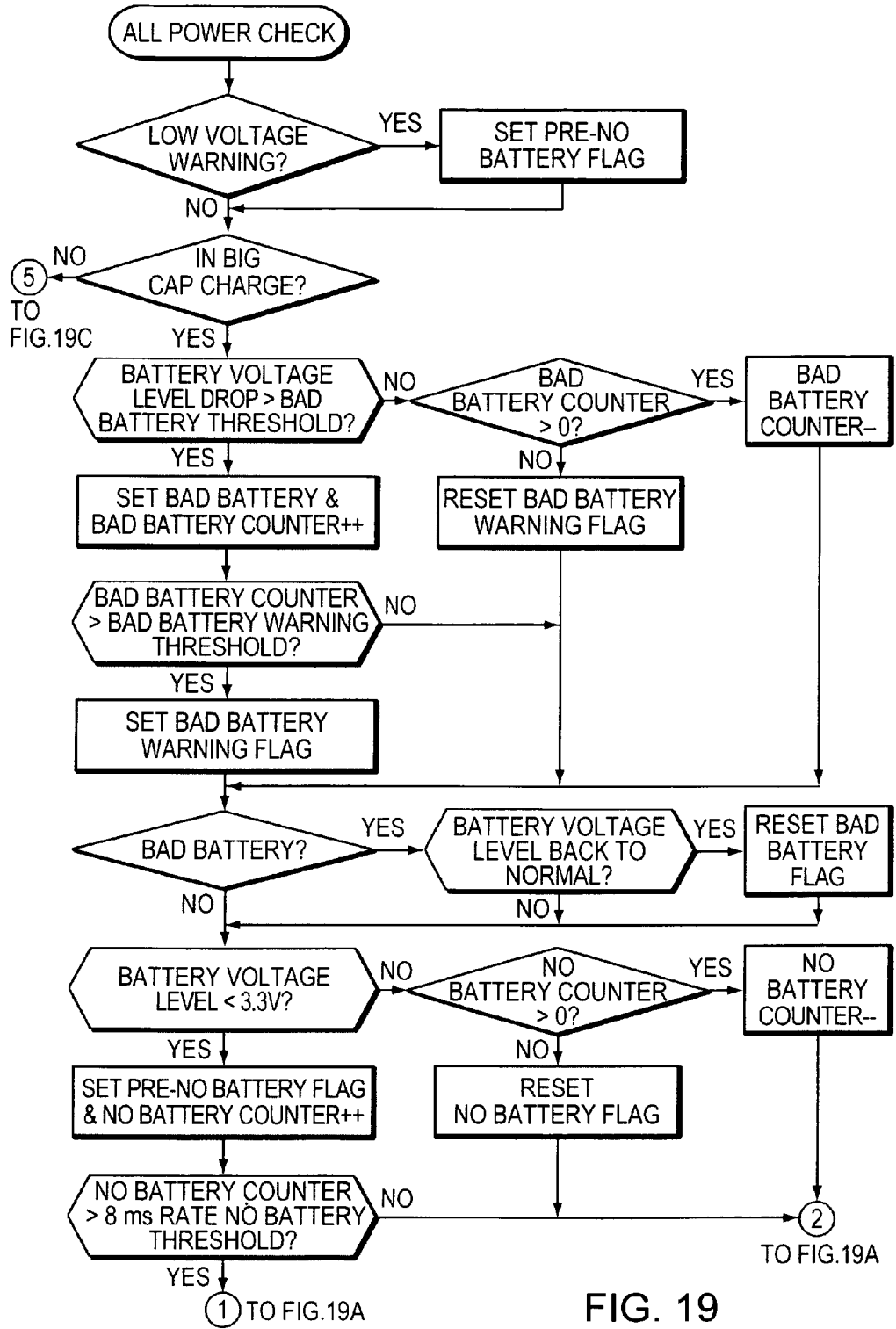
FIGS. 19, 19A, 19B, 19C, and 19D show another flow chart that illustrates power management for the faucet control.
Figure 19A:
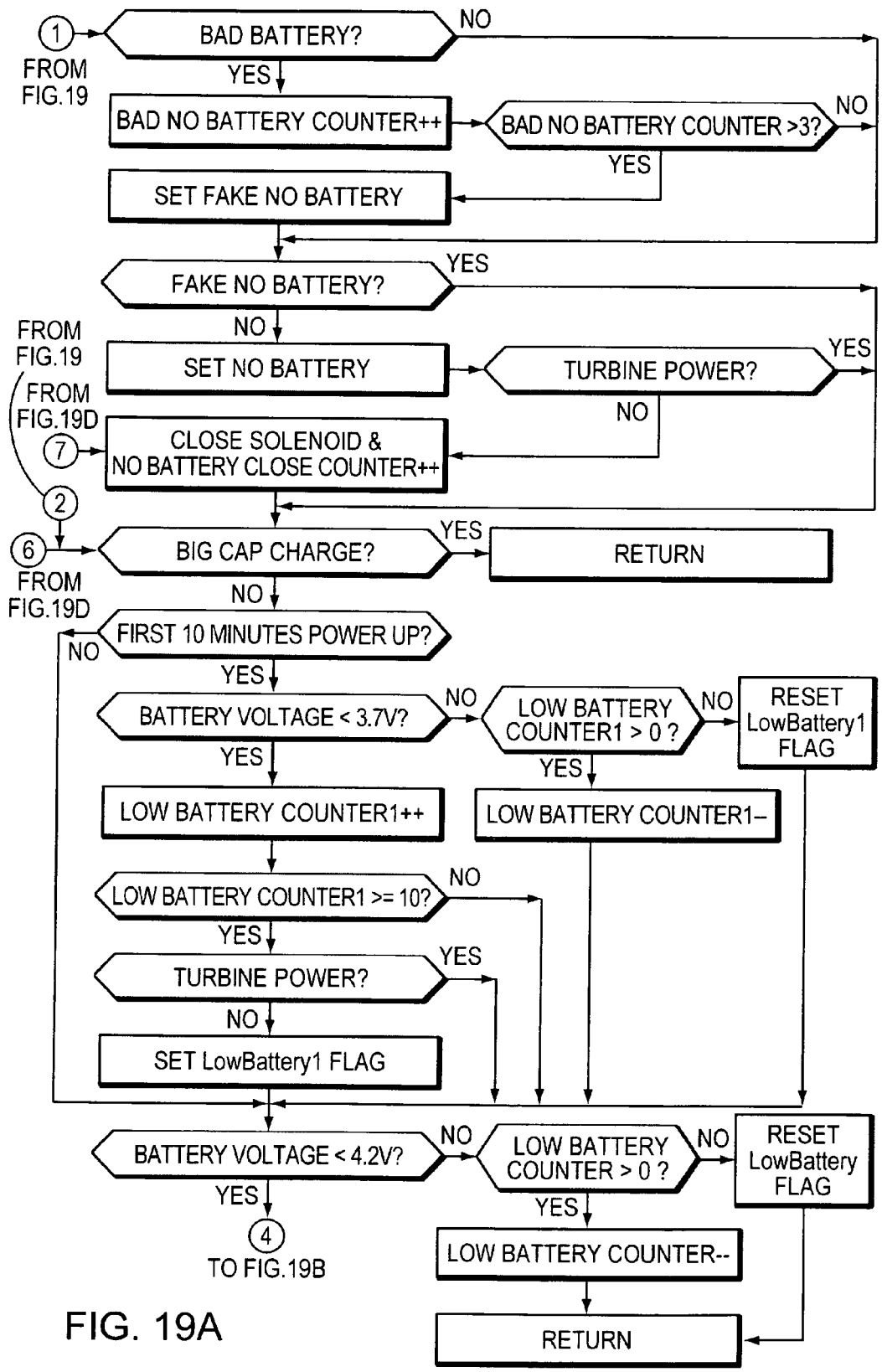
Figure 19B:
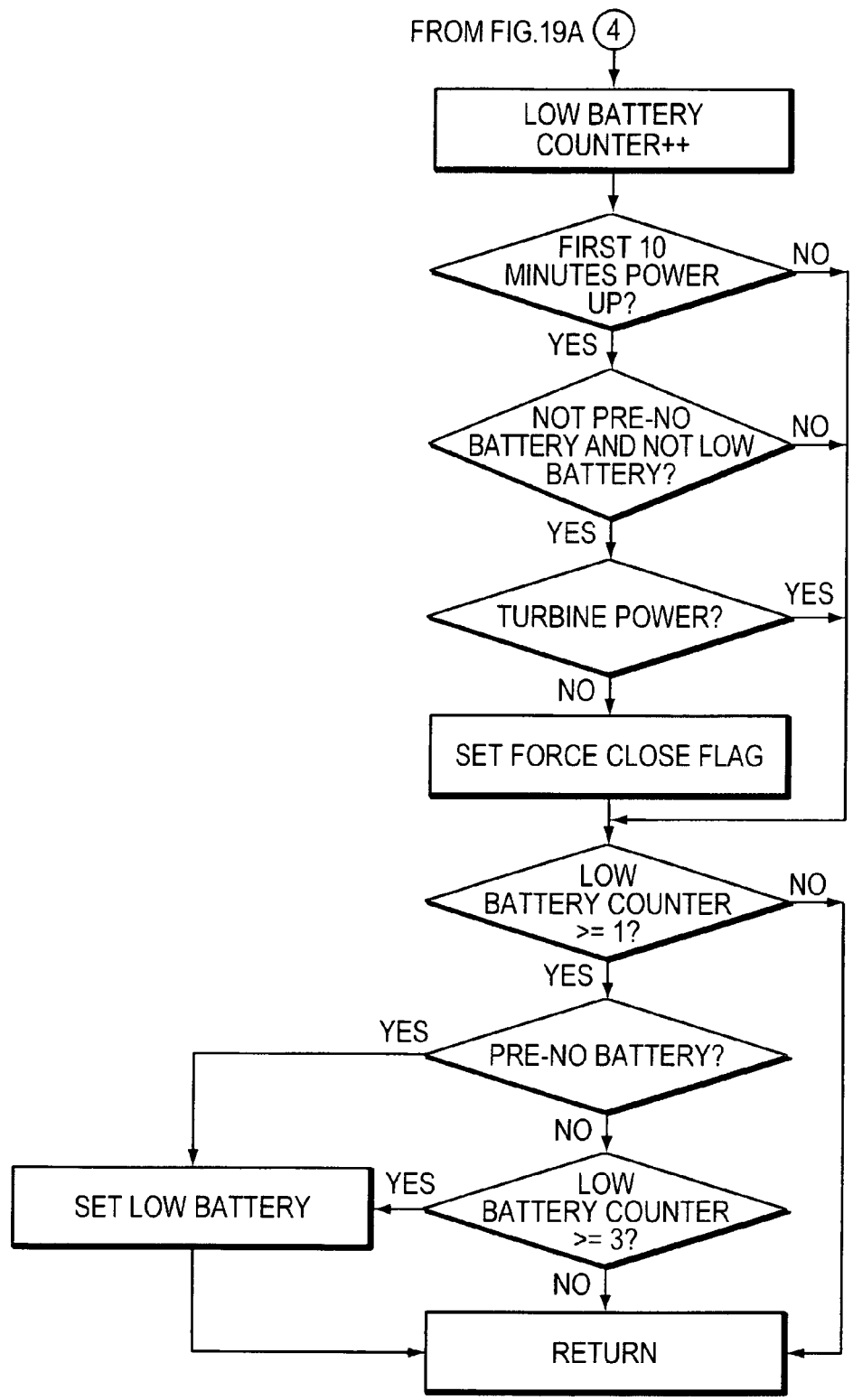
Figure 19C:
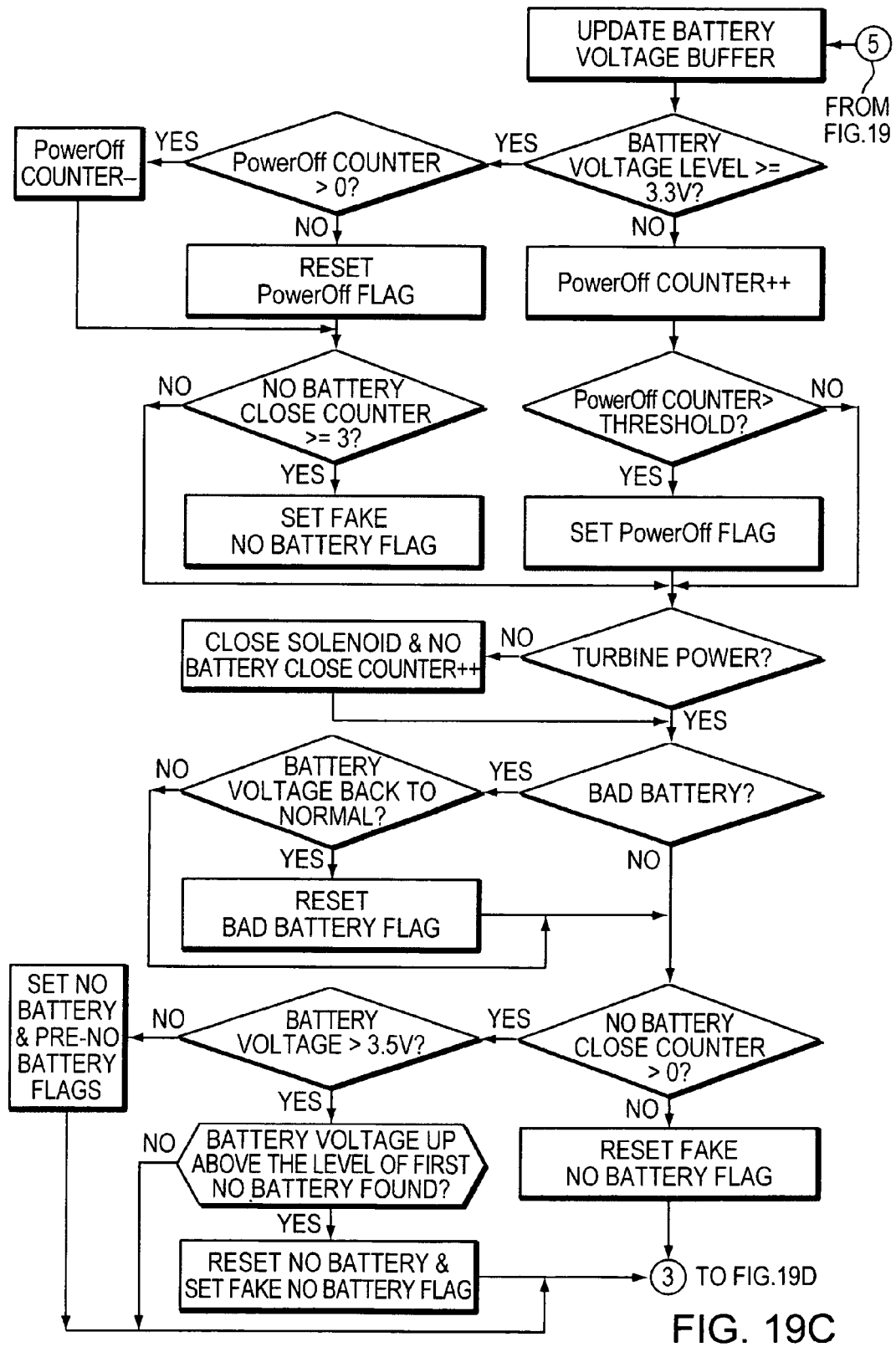
Figure 19D:
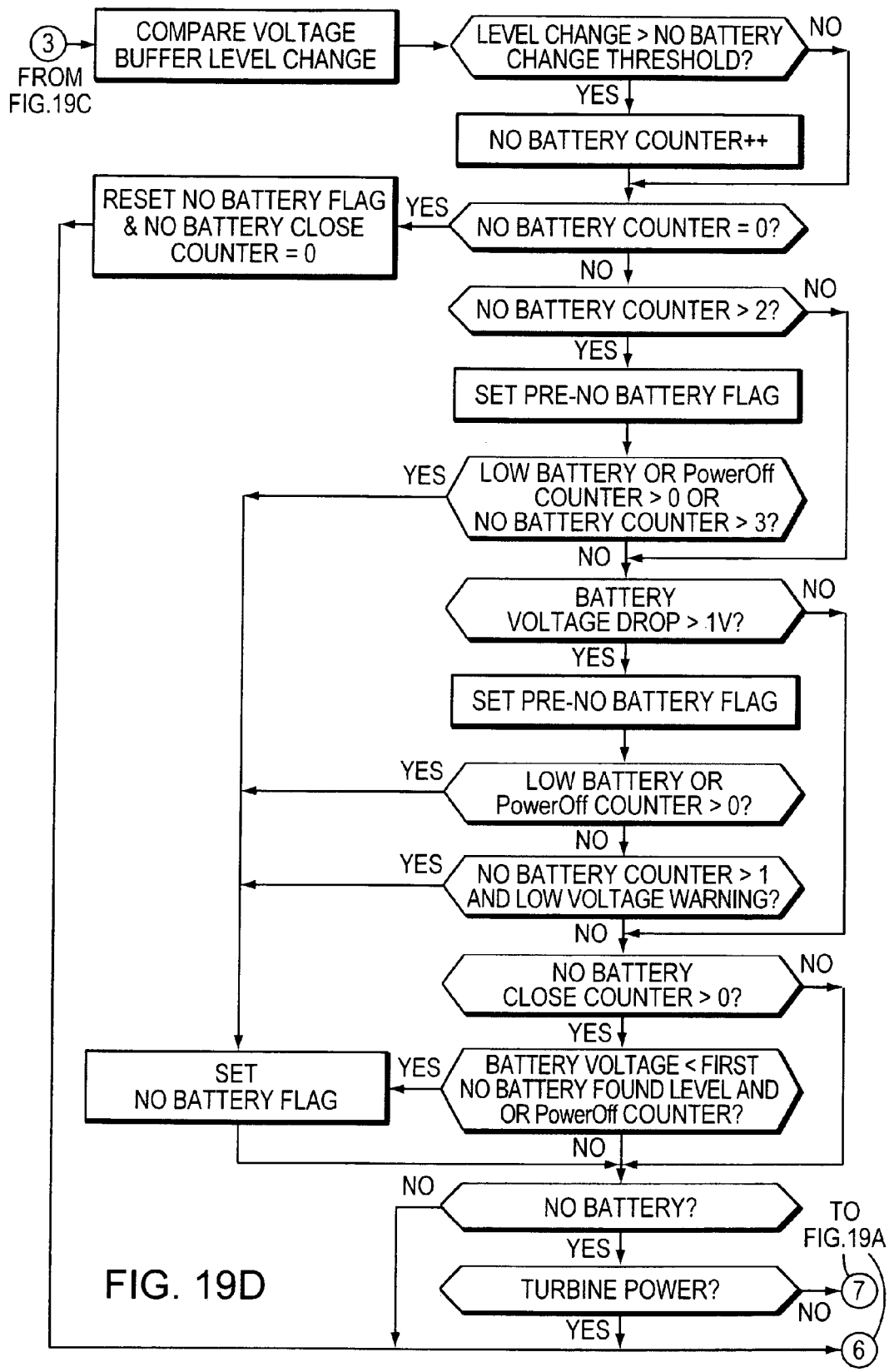

FIG. 18 is a flow chart that illustrates power management. The system periodically checks battery power, power from the turbine and optionally power provided by a photovoltaic cell. FIGS. 19, 19A, 19B, 19C, and 19D illustrate power management for the control circuitry.

Figure 20:
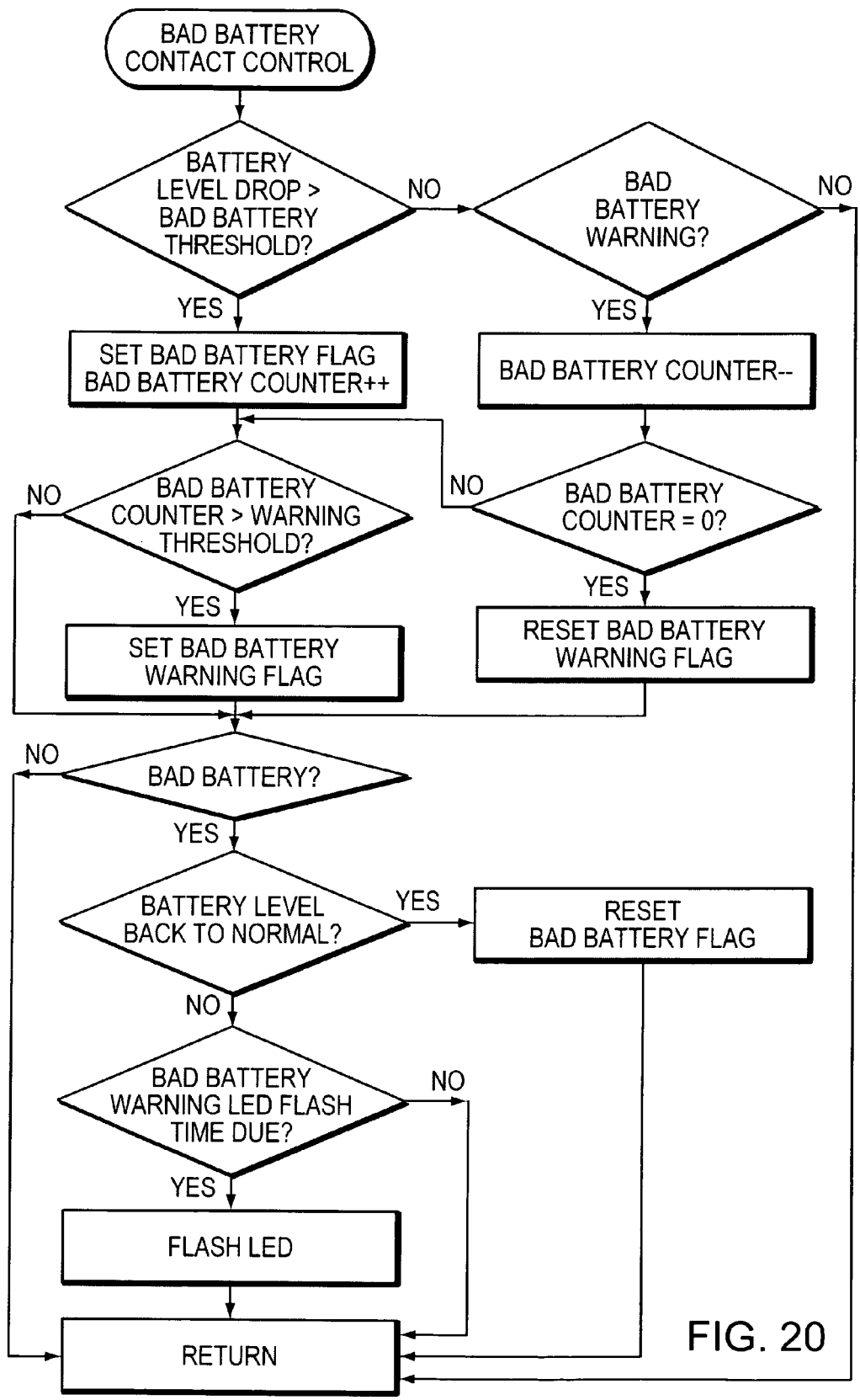
FIG. 20 is a flow chart that illustrates battery contact control for powering the control circuitry.

FIG. 20 is a flow chart that illustrates battery contact control for powering the control circuitry.

Figure 21A:
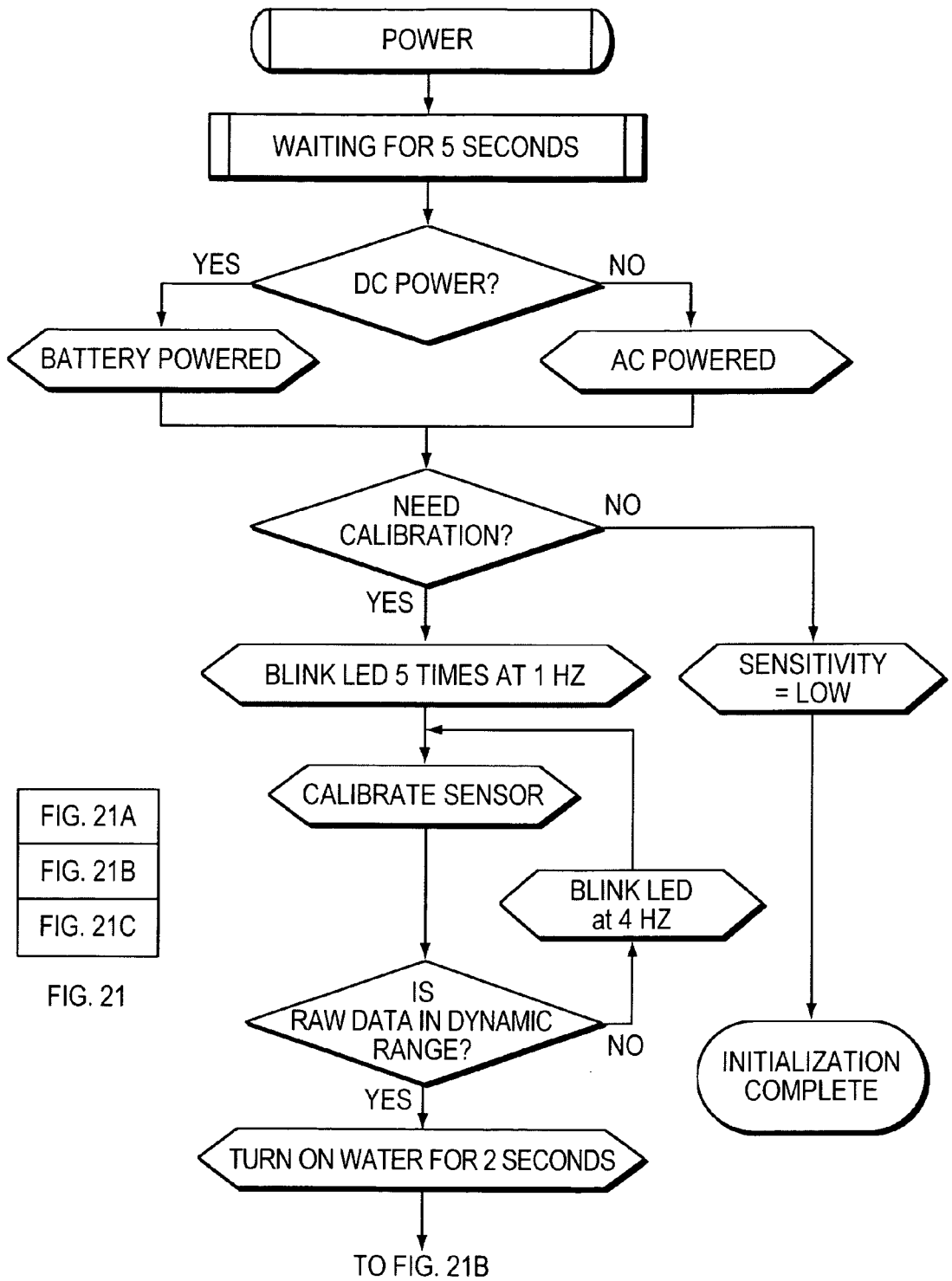
FIG. 21 includes FIGS. 21A, 21B and 21C illustrating a flow chart that illustrates the algorithm for sensing a target present at the faucet spout shown in FIG. 1 or FIG. 9.
Figure 21B:
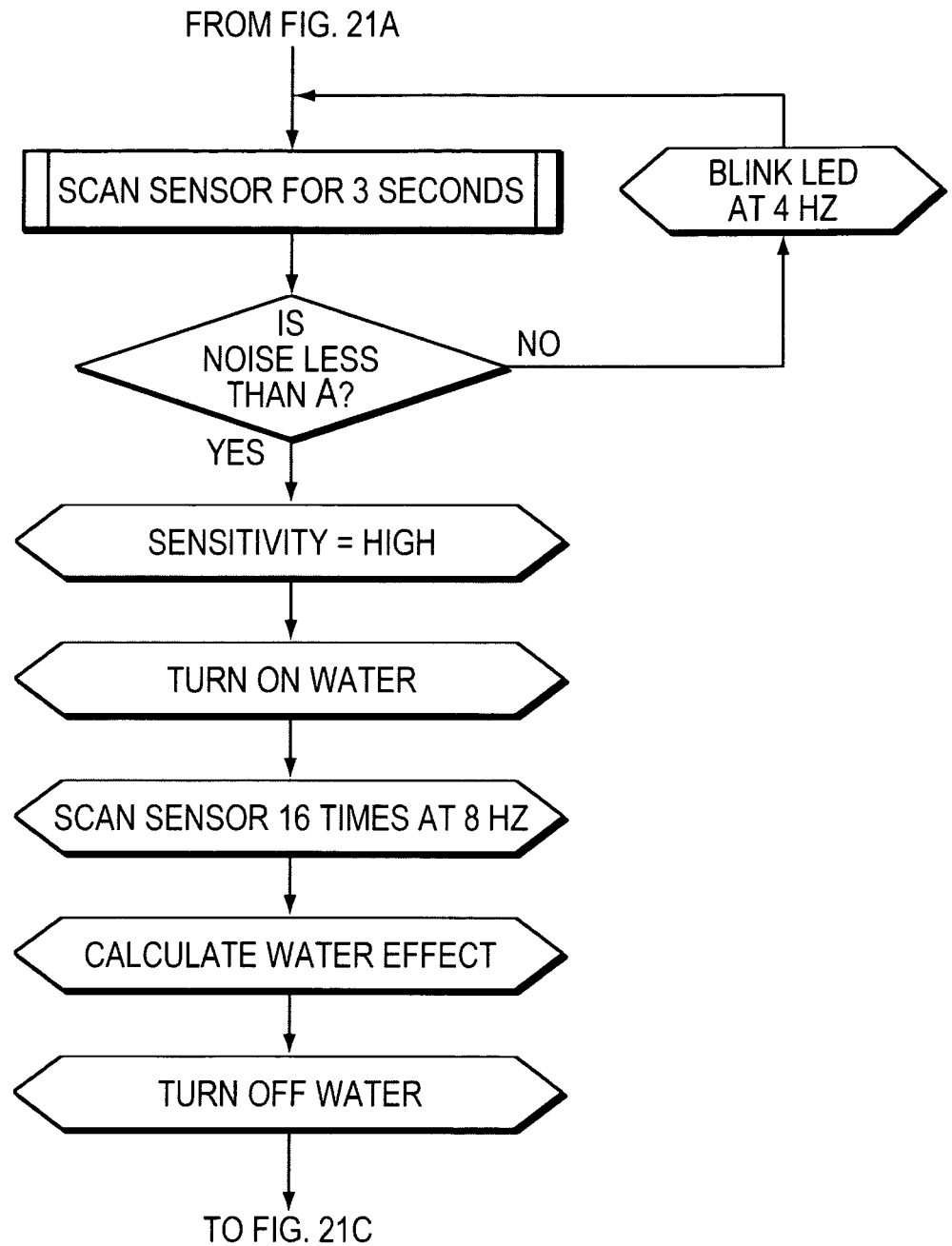

FIG. 21 is a flow chart that illustrates the algorithm for sensing a target present at the faucet spout shown in FIG. 1 or FIG. 9.

The system performs the capacitive sensing operation in order to control the faucet operation. Starting from power-up or any kind of reset, system performs self calibration and initialization first, and then it acts as a state machine. Upon waking up from its sleep, the system scans the capacitance sensor to get the current raw data, to update the baseline, and then the system performs associated tasks based on its current status. The processor will go to sleep again after the completion of current task.

The calibration process includes several processes: "Normalize raw data", "Environment Check", and "Determine Water Effect". The "Normalize Raw Data" adjusts raw data in dynamic range (a range near 11500). The "Environment Check" makes sure the noise level is in predefined range, if not, the system blinks LED and keeps monitoring noise level until it falls in the predefined range. If the system keeps in this stage, it is the indication that the system is not suitable for this environment, as shown in FIG. 21A. The "Determine Water Effect" turns on water to determine water effect and determines if this is a 1.5/0.5 GPM spout/head. It is only an initial value; system will automatically update this during its regular operation. When the calibration is completed, the system turns on water second times to indicate system is ready to use.

The system uses the total of 8 statuses: TARGETCLEAR, INVERIFY, TOUCHED, TARGETSET, OUTVERIFY, PROHIBITION, PAUSE, and CLEAN. The system will be in one and only one of these statuses at any given time.

In the TARGETCLEAR status, target signal is always cleared. The system updates the signal threshold, monitoring the noise level and determines signal threshold and the number of a signal to be verified as a target. If the difference of current data and baseline is greater than the signal threshold, and the data continuously increased more than certain value, the system enters INVERFY status and speedup the scan. In the INVERIFY status, the target signal will be set if the data is verified in this status. The system determines when it needs to set target signal. If the signal data is over Signal Threshold and continuously for predetermined times, than the system turns on target signal and enters TARGETSET status, and stores current raw data as part of reference used to determine when the target removing. If this is triggered 5 times in 30 seconds, the system enters the PAUSE status.

In the TOUCHED status, target signal will be cleared after it is been touched for 5 seconds. The system determines to clear target signal and clear target signal if it is touched for more than 5 seconds. The system determines what to do from touch to untouched. If touched more than 5 seconds, system enters in the CLEAN status. If touched less than 5 seconds, system goes back to the TARGETSET status.

In the TARGETSET status the target signal is always set. The system calibrates the water effect during first 2 seconds, and determines the water effect value, and then sets following parameters:

signal threshold for the water on time; and reference value for the water on to be used to determine if the target has been moved out. The system determine if it needs to enter the OUTVERIFY status.

The system enters OUTVERIFY status if any of the following occurs:

Run time out

Raw data does not change over a predefined range

Signal data is less than signal threshold

Raw data is fall below than the reference predefined just before the water is turned on.

In the OUTVERIFY status, the target signal will be cleared if the signal has been verified. The system tracks water run time and clears target signal if water time run out, and system enters in the PAUSE status. The system determines if the data is stable and clears the target signal when data is in predefined range continuously for 1.5 seconds, and then enters in status PROHIBITION. The system determines if the data falls below a reference value, clears target signal when data is in predefined range continuously for 1.5 seconds, and then enters in status PROHIBITION. The system determines if the data is below signal threshold, clear target signal when data is in predefined range continuously for 1 second, and then enters in status PROHIBITION.

In the PROHIBITION status, the target signal is always cleared. The system determines when to go out of this status. The system will enter in TARGETCLEARED status if it has been in this status for predefined minimum off time.

In the PAUSE status, target signal is always cleared. The system determines when to go out of this status. The system will enter in TARGETCLEARED status if it has been in this status for predefined time. In the CLEAN status, the target signal is always cleared. The system determines when to go out of this status. The system will enter in TARGETCLEARED status if it has been in this status for predefined time.

Referring to FIGS. 14 and 15, the capacitance detector processor 465 communicates with microcontroller processor 402 using the Heart Beep pulse from high to low every 5 seconds to indicate it is in good condition. In the Hold down, the system stops scanning when port 2.5 is low to save the power. In the request LED power, the system sets port 1.5 low to indicate it may need power to turn on LED.

Figure 21C:
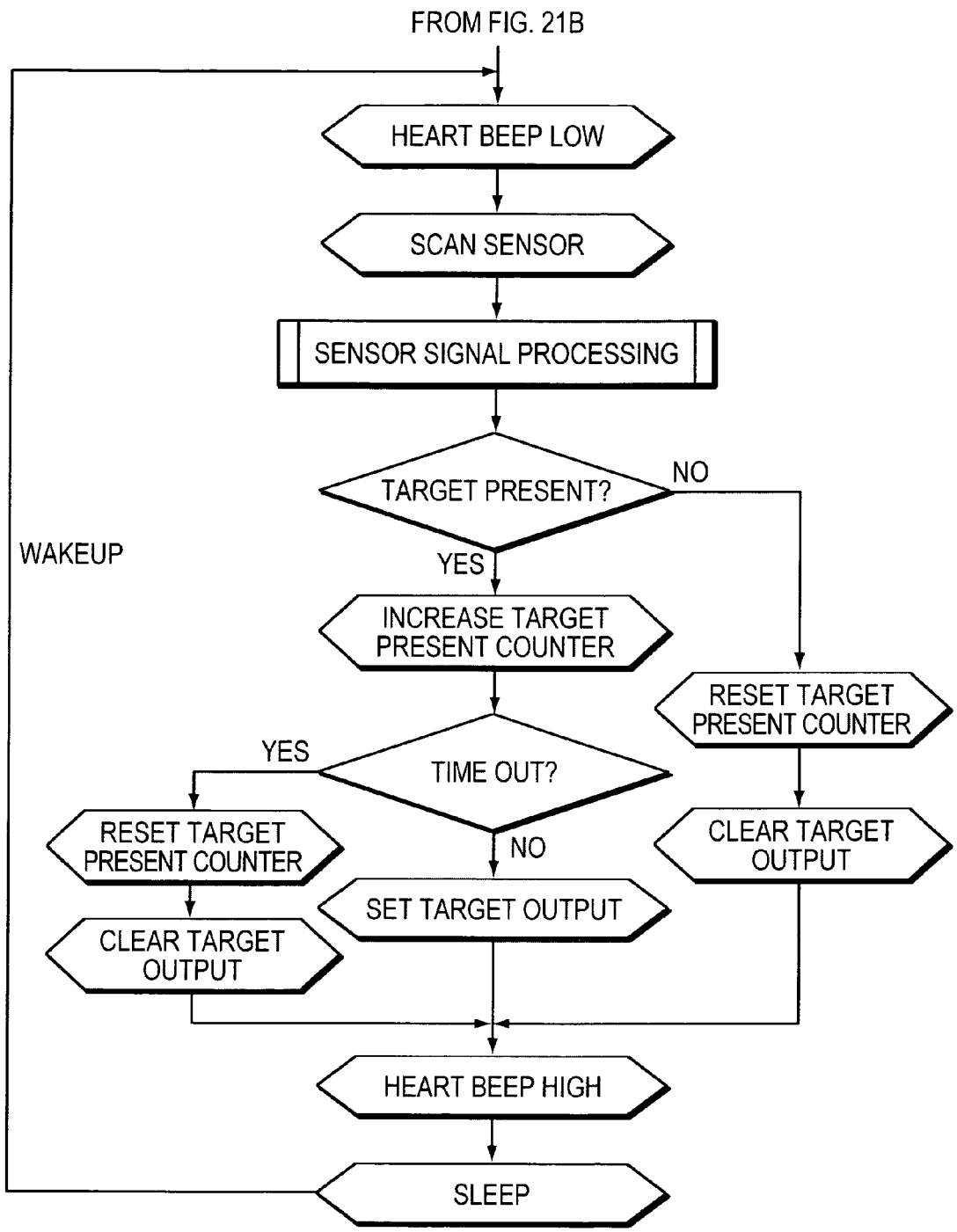
Figure 22:
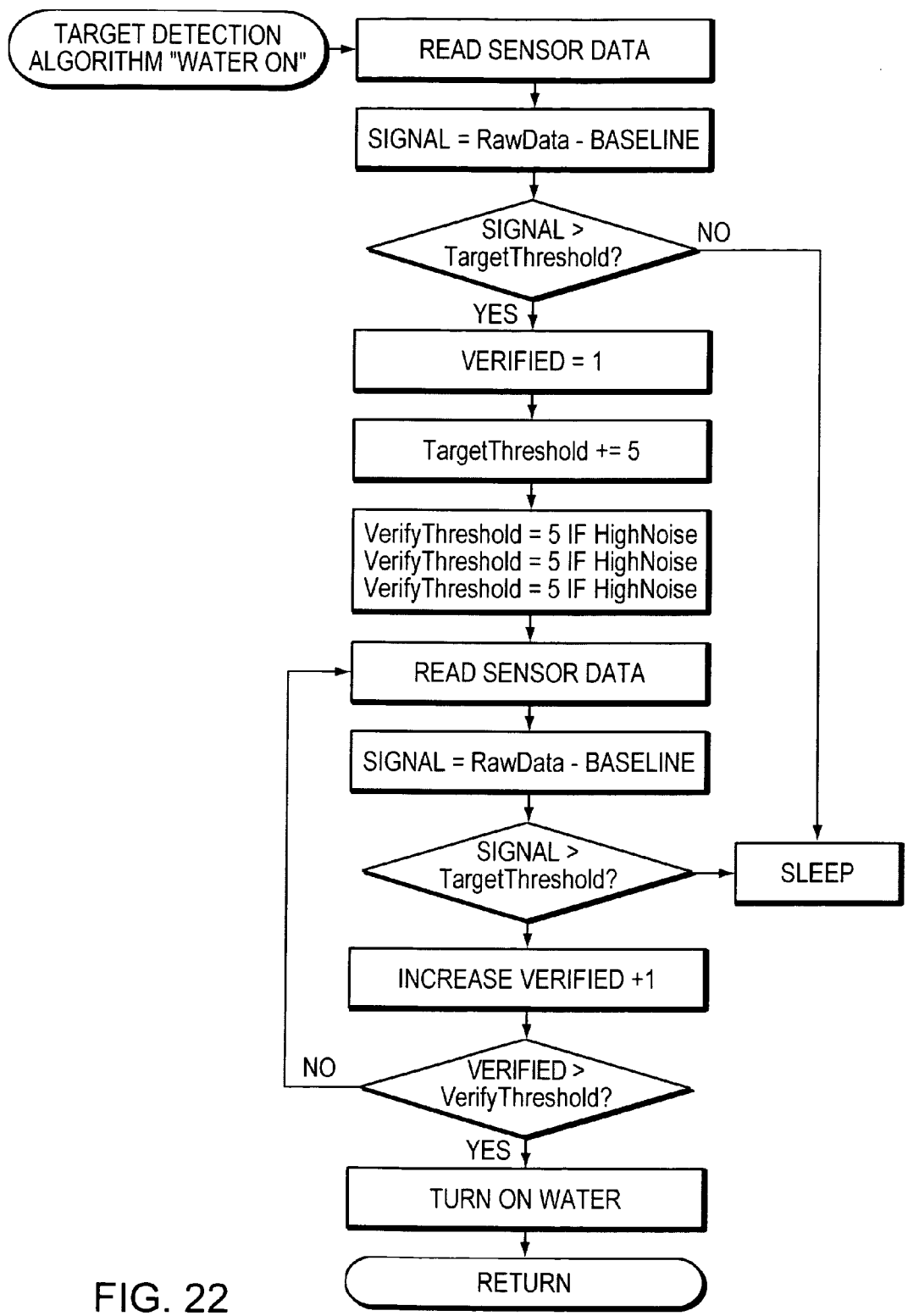
FIG. 22 is a flow chart that illustrates target sensing for turning water on in the flow chart of FIG. 21.
Figure 22A:
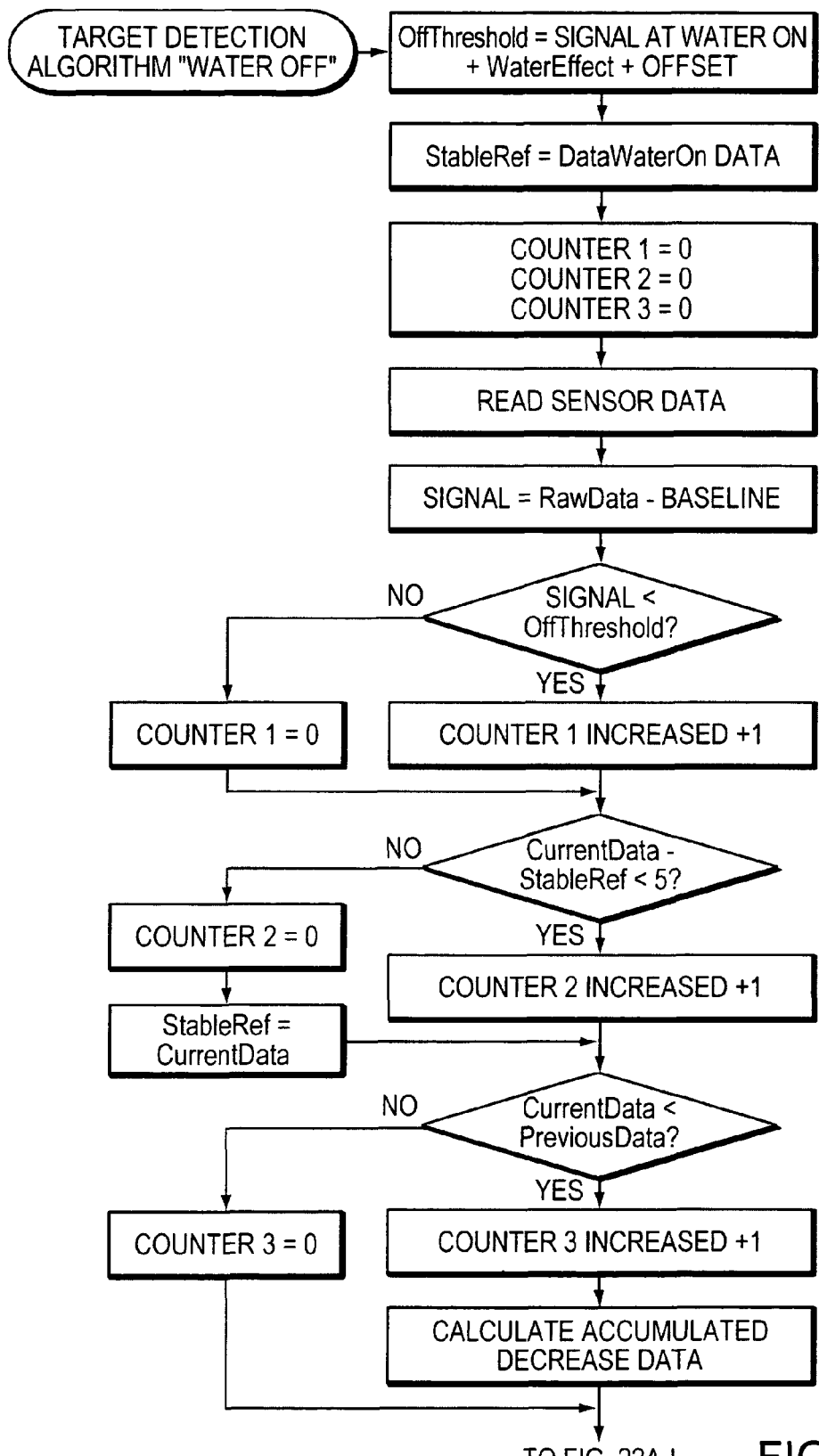

FIG. 22 is a flow chart that illustrates target sensing for turning water on and FIG. 22A is a flow chart that illustrates target sensing for turning water off in the flow chart in FIG. 21C. This algorithm is described for the proximity and touch capacitive sensor (such as made by Cypress Semiconductor). However, this algorithm is also applicable for the active IR sensor using a light source and a light detector detecting a reflected signal from a user. The target detection algorithm (and any algorithm described herein) may be imbedded in a designated chip or may be downloaded to the corresponding processor.

Referring to FIG. 22, the target detection algorithm for turning "water on" starts in the target clear status (water is off).

---

Scan sensor at 8 Hz to read sensor data
Signal = Current raw data − baseline
If signal > Threshold, Go to verify status
In verify status, Threshold increase by 5
In verify status, Threshold increase by 5
If signal > Threshold consecutively more than "Verify" times, turn on water.
Threshold and "Verify" times are dynamically updated as below:
For the past 5 seconds:
Noise level = Maximum raw data − minimum raw data
If noise level is low,
    threshold = High sensitive level
    Verify = 3
If noise level is Medium,
    threshold = medium sensitive level
    Verify = 4
If noise level is HIGH,
    threshold = low sensitive level
    Verify = 5
In "Verify" < Verify Threshold than scan sensor to read sensor data.

---

Referring to FIGS. 22A and 22A-I, the target detection algorithm for turning "water off" starts after water was turned on.

---

Once water is turned on, it will stay on for at least one second even target left right away.
Target threshold will be set as:
Threshold = Target signal at the time of trigger + water effect − 15
Three counters are used for determining the target leaving,
    Counter1 is to count the number of signal less than threshold
    Counter2 is to count the number of signal not change
    Counter3 is to count the number of signal decrease
If current signal is less than threshold, Counter1 increases by1, otherwise Counter2 reset to 0.
Stable reference initialized to the first signal data. If the difference between current signal and stable reference is less than predefined range, Counter2 increases by 1, otherwise Counter2 reset to 0, and the stable reference reset to current signal.
If current signal is less than previous signal, Counter3 increase by 1, and the decreased value add to total signal decreased, otherwise, ccounter3 reset to 0, and total decreased reset to 0.
If Counter1 greater than 8, or counter2 greater than 16, or counter3 is greater than 8 and total signal decreased is greater than 45, or counter3 is greater than 12. Turn off water, as shown in FIG. 22A-I
Threshold reset to 15 after water turning off.

---

The above-described sensing algorithm overcomes several problems associated with the capacitive proximity sensing. In the capacitance signal, the sensing area is uncertain, especially when water is flowing and the human hands are only part of capacitance source. The signal/noise ratio is not sufficiently big, and noise may cause false detections. The signal strength varies for different power supply sources (e.g., battery or power adaptor). To overcome these problems, the sensing algorithm automatically calibrates the baseline based on real application environments. The sensing algorithm keeps track of the noise signal level and adapts signal threshold accordingly. The sensing algorithm tracks signal trend not only strength to determine the presence of human hands. Furthermore, the sensing algorithm uses separate parameters for different power supply sources.

The faucet may use an alternative optical transceiver is described in U.S. Pat. No. 5,979,500 or U.S. Pat. No. 5,984,262, and is also described in co-pending U.S. application Ser. Nos. 10/012,252 and 10/012,226, all of which are incorporated by reference. The microcontroller may be microcontroller COP8SAB and COP8SAC made by National Semiconductor, or microcontroller IMP86c807M made by Toshiba. To save power and significantly extend battery operation, the wake-up period is much shorted than the sleep period. Depending on the controller's mode, the sleep time may be 100 msec, 300 msec, or 1 sec.

The electronic faucet also communicate with a user by a novel "burst interface" that provides signals to a user in form of water bursts emitted from the faucet. Alternatively, the electronic faucet may include novel an optical or acoustic interface. The electronic faucet is designed to prevent wasting of water when for example an object permanently located in a sink.

What is claimed is:
1. An automatic faucet comprising:
    a housing constructed to receive at least one water inlet conduit and having a spout for delivering water;
    a valve module including a valve controlled by an electromagnetic actuator for controlling the water flow from said spout;
    a sensor module constructed to provide sensor data influenced by a user;

a control module constructed to control opening and closing of said valve by providing signals to said electromagnetic actuator, and said control module, including a controller, constructed to receive said sensor data from said sensor module and execute a self-calibration and initialization algorithm and execute a sensing algorithm, wherein said self-calibration and initialization algorithm determines a noise signal level and a signal threshold for different power supply sources and said sensing algorithm tracks noise signal levels and dynamically adapts signal thresholds for the power supply source providing power, said sensing algorithm tracking signal trend to determine presence of a user.

2. The automatic faucet of claim 1, wherein said control module is constructed to execute said self-calibration and initialization algorithm by normalizing raw data to set a dynamic range, verifying that a noise level is in a predefined range, and determining water effect.

3. The automatic faucet of claim 1, wherein said sensor module includes a capacitive sensor.

4. The automatic faucet of claim 3, wherein said capacitive sensor includes a touch capacitive sensor.

5. The automatic faucet of claim 3, wherein said capacitive sensor includes a proximity capacitive sensor.

6. The automatic faucet of claim 1 further including a filter associated with said actuator.

7. The automatic faucet of claim 1 including a water turbine for providing power to said electronic control circuit.

8. The automatic faucet of claim 7 wherein said water turbine and said control module are designed to measure a water flow rate of said faucet.

9. The automatic faucet of claim 7 wherein said water turbine and said control module are designed to detect a fault condition of said faucet.

10. The automatic faucet of claim 9 including an indicator for indicating status of said faucet to a user.

11. The automatic faucet of claim 10 wherein said indicator includes an LED diode indicating said status.

12. The automatic faucet of claim 7 wherein said control module is constructed to execute a power management algorithm.

13. An automatic faucet comprising:

a housing constructed to receive at least one water inlet conduit and having a spout for delivering water;

a valve module including a valve controlled by an electromagnetic actuator for controlling the water flow from said spout;

a turbine module constructed to generate electrical power;

a sensor module constructed to provide sensor data influenced by a user;

a battery module constructed to provide electrical power; and a control module, including a controller, constructed to receive said sensor data from said sensor module and execute a sensing algorithm utilizing said sensor data said control module being constructed to control opening and closing of said valve by providing signals to said electromagnetic actuator, said control module being constructed to execute a power management algorithm for managing electrical power used by said automatic faucet including said electromagnetic actuator, said electrical power being generated by said water turbine and provided to and from said battery, said power management algorithm periodically checking turbine power, AC power and battery power for optimal operation and charging said battery, and said control module executing said sensing algorithm keeping track of the noise signal level and dynamically adapting signal thresholds for the power source providing electrical power and tracking the signal trend to determine the presence of said user.

14. The automatic faucet of claim 13 further including a capacitive sensor.

15. The automatic faucet of claim 13 further including an active infra-red sensor comprising and infrared emitter and detector.

16. The automatic faucet of claim 13, wherein said valve module and said control module are located in a control system unit mounted on a wall using a wall plate and located below a top surface of a sink, said control system unit including a body being constructed to attach to said wall plate by a twist action and being secured by placing a cover over said body of said control system.

17. The automatic faucet of claim 16, wherein said control system unit includes a quick connect fitting for connecting said water inlet conduit by a pull-push mechanism designed to secure said conduit to said control system unit for delivering water.

18. The automatic faucet of claim 17, wherein said control system unit includes a water filter associated with said actuator.

19. The automatic faucet of claim 16, wherein said control system unit includes a battery case constructed to secure batteries regardless of orientation of said case with respect to said control system unit thereby preventing wrong polarity installation.

20. The automatic faucet of claim 13 wherein said water turbine and said control module are designed to measure a water flow rate of said faucet by said control module executing an algorithm for metering water delivered from said spout by reading AC signal frequencies generated in said turbine module.

21. The automatic faucet of claim 13 wherein said water turbine and said control module are designed to detect a fault condition of said faucet.

22. The automatic faucet of claim 13 including an indicator for indicating status to a user.

23. The automatic faucet of claim 22 wherein said indicator includes an LED diode.

24. An automatic faucet including:

a water turbine located in a water flow discharged from the faucet, the water turbine comprising a rotor including an impellor coupled to rotor blades being located within a water path and located on a rotation shaft, a magnet, a stator and an electrical coil constructed and arranged to generate electrical power, said magnet being slipped over said impellor and secured by a plastic pin; and an insertable nozzle constructed and arranged to deliver water to said rotor blades and optimized for a water flow rate discharged from the faucet.

25. The automatic faucet including the water turbine of claim 24 further constructed and arranged to detect a minute amount of water leaving the faucet.

26. The automatic faucet including the water turbine of claim 24 further constructed and arranged to detect a flow rate of water leaving the faucet by reading AC signal frequencies generated.

27. The automatic faucet including the water turbine of claim 24, wherein said faucet is actuated by an automatic sensor and being further constructed and arranged to detect a malfunction of elements inside the faucet based on signal from said water turbine.

28. The automatic faucet of claim 27 including an indicator for indicating status of said faucet to a user.

29. The automatic faucet of claim 28 wherein said indicator includes an LED diode indicating said status.

30. The automatic faucet including the water turbine of claim 24, wherein said electrical coil is stationary with respect to said stator.

* * * * *